(12) United States Patent
Kurata

(10) Patent No.: US 7,821,540 B2
(45) Date of Patent: Oct. 26, 2010

(54) IMAGER-CREATED IMAGE SIGNAL-DISTORTION COMPENSATION METHOD, IMAGER-CREATED IMAGE SIGNAL-DISTORTION COMPENSATION APPARATUS, IMAGE TAKING METHOD AND IMAGE TAKING APPARATUS

(75) Inventor: Tohru Kurata, Saitama (JP)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 11/676,404

(22) Filed: Feb. 19, 2007

(65) Prior Publication Data

US 2007/0195172 A1  Aug. 23, 2007

(30) Foreign Application Priority Data

Feb. 20, 2006  (JP) ............................ P2006-042108

(51) Int. Cl.
  H04N 5/228 (2006.01)
  H04N 5/262 (2006.01)
(52) U.S. Cl. .............................. 348/208.6; 348/208.99; 348/240.99; 348/240.1; 348/240.2; 348/240.3
(58) Field of Classification Search .............. 348/208.6, 348/240.99, 240.1, 240.2, 240.3, 208.99
  See application file for complete search history.

(56) References Cited

U.S. PATENT DOCUMENTS

| | | | |
|---|---|---|---|
| 6,010,537 A * | 1/2000 | Konno et al. ................. | 359/389 |
| 6,172,707 B1 | 1/2001 | Ouchi et al. | |
| 6,396,538 B1 * | 5/2002 | Kobayashi et al. ...... | 348/240.99 |
| 7,227,699 B2 * | 6/2007 | Hamano et al. ............. | 359/687 |
| 7,312,934 B2 * | 12/2007 | Iwasawa ..................... | 359/764 |
| 2006/0033817 A1 | 2/2006 | Ishikawa et al. | |

FOREIGN PATENT DOCUMENTS

| | | |
|---|---|---|
| EP | 0 541 092 | 5/1993 |
| EP | 1 578 116 | 9/2005 |
| JP | 04-180371 | 6/1992 |
| JP | 06-086149 | 3/1994 |
| JP | 07-283999 | 10/1995 |
| JP | 10-233958 | 9/1999 |
| JP | 3384459 | 12/2002 |
| WO | 93/19430 | 9/1993 |

OTHER PUBLICATIONS

Japanese Office Action for corresponding JP2006-042108 issued on Mar. 30, 2010.

* cited by examiner

*Primary Examiner*—David L Ometz
*Assistant Examiner*—Quang V Le
(74) *Attorney, Agent, or Firm*—K&L Gates LLP

(57) ABSTRACT

Disclosed herein is a method of compensating an imager-created image for a distortion. The method includes: a movement-vector detection process of receiving data of the imager-created image and detecting a movement vector; an optical-zoom portion vector computation process of computing an optical-zoom portion vector corresponding to an image movement; an optical-zoom portion vector subtraction process of subtracting the optical-zoom portion vector from the movement vector detected; a global hand-movement displacement vector computation process of computing a global hand-movement displacement vector for the imager-created image from the movement vector in the case of no optical zoom operation and computing a global hand-movement displacement vector for the imager-created image from a difference vector output in the case of an optical zoom operation; and a hand-movement compensation process of compensating the imager-created image for a distortion caused by a hand movement on the basis of the global hand-movement displacement vector.

16 Claims, 44 Drawing Sheets

MOVEMENT-VECTOR DEVICE

OPTICAL-ZOOM PORTION VECTOR COMPUTATION

INTER-VECTOR DIFFERENCE COMPUTATION

HAND-MOVEMENT DISPLACEMENT-VECTOR COMPONENT

OPTICAL ZOOM WITH NO HAND MOVEMENT

SHIFT BY A DISTANCE CORRESPONDING TO THE HAND-MOVEMENT DISPLACEMENT VECTOR AND CUT OUT $$dx = \frac{\sum(Sxy \cdot Kx)}{4\sum Sxy - 6\sum(Sxy \cdot Kx^2)} \quad \cdots \text{(Eq. A)}$$

$$dy = \frac{\sum(Sxy \cdot Ky)}{4\sum Sxy - 6\sum(Sxy \cdot Ky^2)} \quad \cdots \text{(Eq. B)}$$

WHERE:

FOR x = -1, Kx = -1     FOR y = -1, Ky = -1
FOR x = 0, Kx = 0       FOR y = 0, Ky = 0
FOR x = 1, Kx = 1       FOR y = 1, Ky = 1

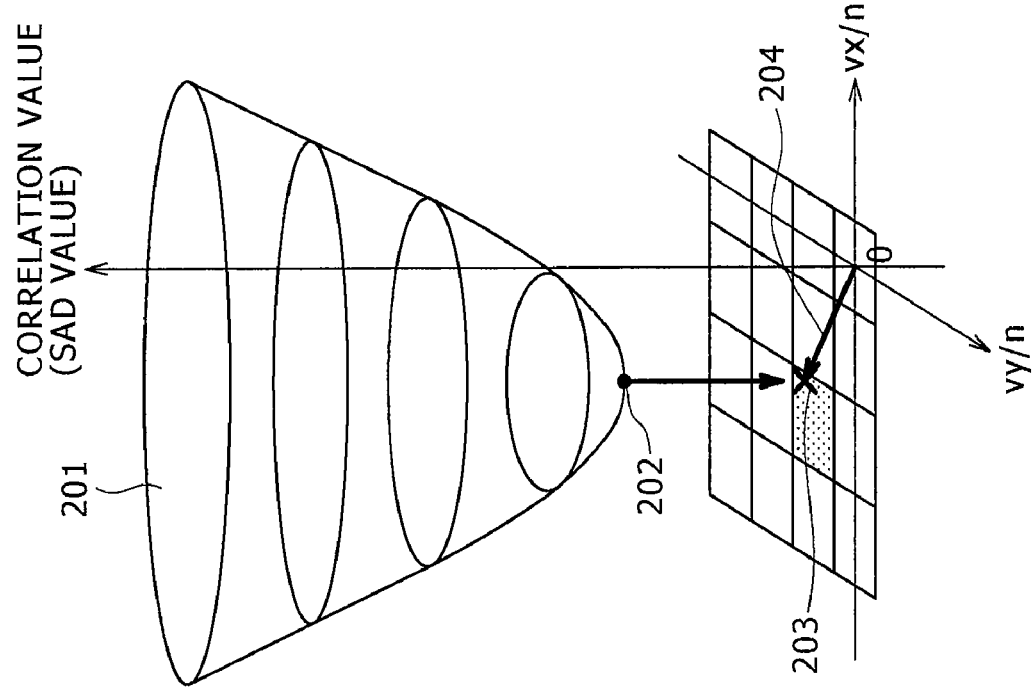
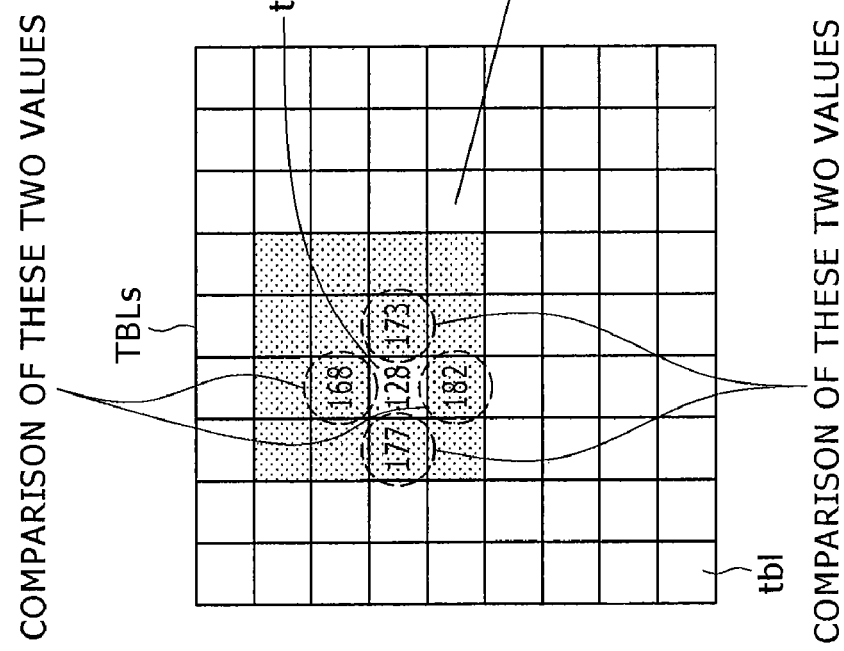

$$dx = \frac{8 \sum (Sxy \cdot Kx)}{25 \sum Sxy - 20 \sum (Sxy \cdot Kx^2)} + \Delta x \quad \cdots \text{(Eq. C)}$$

$$dx = \frac{8 \sum (Sxy \cdot Ky)}{25 \sum Sxy - 20 \sum (Sxy \cdot Ky^2)} + \Delta y \quad \cdots \text{(Eq. D)}$$

FIG. 27

SEGMENT Ra $$u = \frac{2S_3 - 11S_2 + 16S_1 - 7S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)} \quad \ldots \text{(Eq. E)}$$

SEGMENT Rb $$u = \frac{S_3 - 4S_2 + 5S_1 - 2S_0 + \sqrt{(S_3 - 5S_2 + 5S_1 - S_0)^2 + (S_2 - S_0)(S_1 - S_3)}}{3(S_3 - 3S_2 + 3S_1 - S_0)} \quad \ldots \text{(Eq. F)}$$

SEGMENT Rc $$u = \frac{-4S_3 + 7S_2 - 2S_1 - S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)} \quad \ldots \text{(Eq. G)}$$

IMAGER-CREATED IMAGE SIGNAL-DISTORTION COMPENSATION METHOD, IMAGER-CREATED IMAGE SIGNAL-DISTORTION COMPENSATION APPARATUS, IMAGE TAKING METHOD AND IMAGE TAKING APPARATUS

CROSS REFERENCES TO RELATED APPLICATIONS

The present application claims priority to Japanese Patent Application JP 2006-042108 filed in the Japanese Patent Office on Feb. 20, 2006, the entire contents of which being incorporated herein by reference.

BACKGROUND

The present application relates to a method of compensating an imager-created image of a photographing object for a distortion caused by a hand movement or the like at a time to take the image of the photographing object with an optical zoom operation carried out and an image compensation apparatus adopting the method of compensating such a taken image as well as relates to an image taking method and an image taking apparatus. The imager-created image is an image created on an image taking device employed in the image compensation apparatus or the image taking apparatus as an imager.

If a moving picture is taken by making use of an electronic image taking apparatus, which stores an electronic imager-created image of a photographing object in an image taking device employed in the electronic image taking apparatus and reads out the image later from the image taking device also referred to hereafter as an imager, due to the so-called hand movement, the image taking device employed in the image taking apparatus held by the hands of the photographer may physically move to result in a change in position at a relatively high velocity in the horizontal and/or vertical directions of the image of the photographing object so that the change in position appears in the imager-created image as an image distortion such as an image trembling. Examples of such an electronic image taking apparatus are a video camera and a digital still camera.

That is to say, without a hand movement, a location at which the imager-created image is formed on the image taking face of the image taking device is a fixed location. Thus, if a plurality of frame images is arranged in the time-axis direction, the frame images overlap each other at exactly the same location as shown in FIG. 48A. If a hand moves, however, the location at which the imager-created image is formed on the image taking face of the image taking device is not a fixed position. Thus, if a plurality of frame images is arranged in the time-axis direction, the frame images swing from location to location as shown in FIG. 48B.

If a zoom lens is employed in a telescope, in particular, the phenomenon caused by a hand movement as described above occurs in a striking manner most likely. The occurrence of such a hand-movement phenomenon raises a problem that a still observation object inevitably looks like a moving object so that the image of the object is difficult to see. In addition, a hand movement also causes a phenomenon in which an imager-created image of the photographing object is generated in a defocused state.

On top of that, in an attempt to obtain an imager-created image output from an image-taking process by superposing a plurality of frame images on each other in an operation to take a picture of a still face of a photographing object, as described above, the imager created image of the photographing object is distorted due to a defocused state.

As techniques to compensate an image for a distortion caused by a hand movement, there have been proposed an optical hand-movement compensation method making use of a sensor for detecting a hand movement and a sensorless hand-movement compensation method by which a digital signal process is carried out on the imager-created image in order to detect a hand movement and compensate the image for a distortion caused by the hand movement.

The method adopted by a consumer apparatus currently available in the market as a method for compensating a still picture for a distortion caused by a hand movement is the aforementioned optical hand-movement compensation method making use of a gyro sensor (or an acceleration sensor) for measuring a hand-movement displacement vector. The measured hand-movement displacement vector is fed back to a mechanism in high-speed control to prevent an image projected on an image sensor such as the CCD (Charge Coupled Device) or the CMOS (Complementary Metal Oxide Semiconductor) imager from being affected by the hand movement.

As the mechanism cited above, there has been proposed a mechanism including a lens, a prism and the imager (or an integrated module including the imager). In the following description, the lens, the prism and the imager are referred to as a lens shift, a prism shift and an imager shift respectively.

In accordance with the sensorless hand-movement compensation method, on the other hand, as disclosed in documents such as Patent Documents 1 and 2, a movement vector of an imager-created image for a screen unit is detected from data of the imager-created image read out from an image taking device used as an imager and, on the basis of the movement vector, the read position of the imager-created image stored in the image taking device is shifted in order to compensate the data for a distortion caused by a hand movement. In this specification, Japanese Patent No. 3,303,312 is referred to as Patent Document 1 whereas Japanese Patent Laid-Open No. Hei 6-86149 is referred to as Patent Document 2.

Patent Document 3 and some other documents have each proposed a technique for compensating a still picture for a distortion caused by a hand movement without making use of a sensor. In this specification, Japanese Patent Laid-Open No. Hei 7-283,999 is referred to as Patent Document 3. A technique proposed in Patent Document 3 adopts an algorithm, in accordance with which, some still pictures are taken consecutively during such a short exposure period that the hand is not moving during the period, and hand-movement displacement vectors between the still pictures are found. Then, in accordance with the hand-movement displacement vectors, the still pictures taken consecutively are added to each other (or averaged) while being shifted in parallel (and rotating in the roll-axis direction) in order to find a final high-quality still picture with no effects of a hand movement and no low-illumination noises.

In general, a video camera has an optical zoom operation unit such as a zoom switch in a configuration allowing the photographer to carry out an optical zoom operation by operating the optical zoom operation unit in order to execute optical zoom control while photographing a moving picture.

In this case, the size of an imager-created image being subjected to an optical zoom operation to, for example, enlarge the image gradually increases with the lapse of time from a start position, which coincides with the center of the image, as shown in FIG. 49.

If the hand of the photographer moves in a photographing operation accompanied by this optical zoom operation, however, the start position from which the size of the image is increasing is inevitably shifted from the center of the image as shown in FIG. 50 so that it is feared that the image is distorted.

If the image can be compensated for the distortion occurring in an optical zoom operation, the effect of the distortion can be lessened. In a process to compensate the image for the distortion by making use of a gyro sensor like the one described before, however, the optical lens and the prism or the image taking device are controlled to move in a direction perpendicular to the optical axis of the incoming light while the zoom control moves the optical lens in a direction parallel to the optical axis. Thus, the control becomes very complicated. As a result, the process to optically compensate an image for a distortion caused by a hand movement was stopped during an optical zoom operation in the past.

In addition, in the case of the sensorless hand-movement compensation method, an image movement vector component caused by an optical zoom operation is added to a hand-movement displacement vector detected from data read out from the image taking device as the data of an imager-created image so that, even if the image is compensated for a distortion on the basis of the detected hand-movement displacement vector, the distortion caused by a hand movement remains in the image. For this reason, also in the case of the sensorless hand-movement compensation method, the process to optically compensate an image for a distortion caused by a hand movement is stopped during an optical zoom operation.

As described above, the image taking apparatus in the related art does not compensate an image for a distortion generated in an optical zoom operation. Thus, if the hand moves in an optical zoom operation, a distortion generated in an optical zoom operation due to a hand movement like the one shown in FIG. 50 remains in the image. The distortion caused by a hand movement in an optical zoom operation is seen in a relatively less striking manner in the case of a small monitor screen. As the degree of image fineness has been rising and the user enjoys more a picture appearing on a large screen in recent years, however, a distortion caused by a hand movement in an optical zoom operation can no longer be ignored.

SUMMARY

The present application in an embodiment provides a method and an apparatus that are capable of removing a distortion caused by a hand movement in an optical zoom operation in order to obtain a zoomed picture without a distortion.

In an embodiment, there is provided a method to compensate an imager-created image for a distortion. The method includes: a movement-vector detection process of receiving data of the imager-created image from an image taking device and detecting a movement vector for each screen of the imager-created image; an optical-zoom portion vector computation process of computing an optical-zoom portion vector corresponding to an image movement occurring on the imager-created image as a result of an optical zoom operation; an optical-zoom portion vector subtraction process of subtracting the optical-zoom portion vector computed in the optical-zoom portion vector computation process from the movement vector detected in the movement-vector detection process; a global hand-movement displacement vector computation process of computing a global hand-movement displacement vector for the imager-created image from the movement vector detected in the movement-vector detection process in the case of no optical zoom operation and computing a global hand-movement displacement vector for the imager-created image from a difference vector output from the optical-zoom portion vector subtraction process as a result of the vector subtraction in the case of an optical zoom operation; and a hand-movement compensation process of compensating the imager-created image for a distortion caused by a hand movement on the basis of the global hand-movement displacement vector computed in the global hand-movement displacement vector computation process.

In accordance with the method according to an embodiment, when an optical zoom operation is carried out, the optical-zoom portion vector computation process is performed to compute an optical-zoom portion vector corresponding to an image movement occurring on the imager-created image as a result of an optical zoom operation. Then, the optical-zoom portion vector subtraction process is carried out to subtract the optical-zoom portion vector computed in the optical-zoom portion vector computation process from the movement vector detected in the movement-vector detection process from data of an imager-created data.

That is to say, when an optical zoom operation is carried out, the optical-zoom portion vector computed in the optical-zoom portion vector computation process is removed from the movement vector detected in the movement-vector detection process in the optical-zoom portion vector subtraction process. Then, the global hand-movement displacement vector computation process is carried out to compute a global hand-movement displacement vector for the imager-created image from a movement vector output from the vector subtraction process as a result of the vector subtraction. Finally, the hand-movement compensation process is carried out to compensate the imager-created image for a distortion caused by a hand movement on the basis of the global hand-movement displacement vector computed in the global hand-movement displacement vector computation process.

In accordance with an embodiment, a distortion caused by a hand movement made in an optical zoom operation is eliminated to result in a zoomed image with no image distortion.

Additional features and advantages are described herein, and will be apparent from, the following Detailed Description and the figures.

BRIEF DESCRIPTION OF THE FIGURES

FIGS. 21A and 21B are each an explanatory diagram to be referred to in description of a process to detect an accurate movement vector in accordance with the first typical implementation of the movement-vector detection method according to the embodiment;

FIG. 27 is an explanatory diagram to be referred to in description of a process to detect an accurate movement vector in accordance with the second typical implementation of the movement-vector detection method according to the embodiment;

DETAILED DESCRIPTION

The following description with reference to the figures details embodiments implementing an apparatus for compensating an imager-created image for distortions in accordance with the present application and a method adopted by the apparatus as a method for compensating the imager-created image for distortions.

Figure 2:
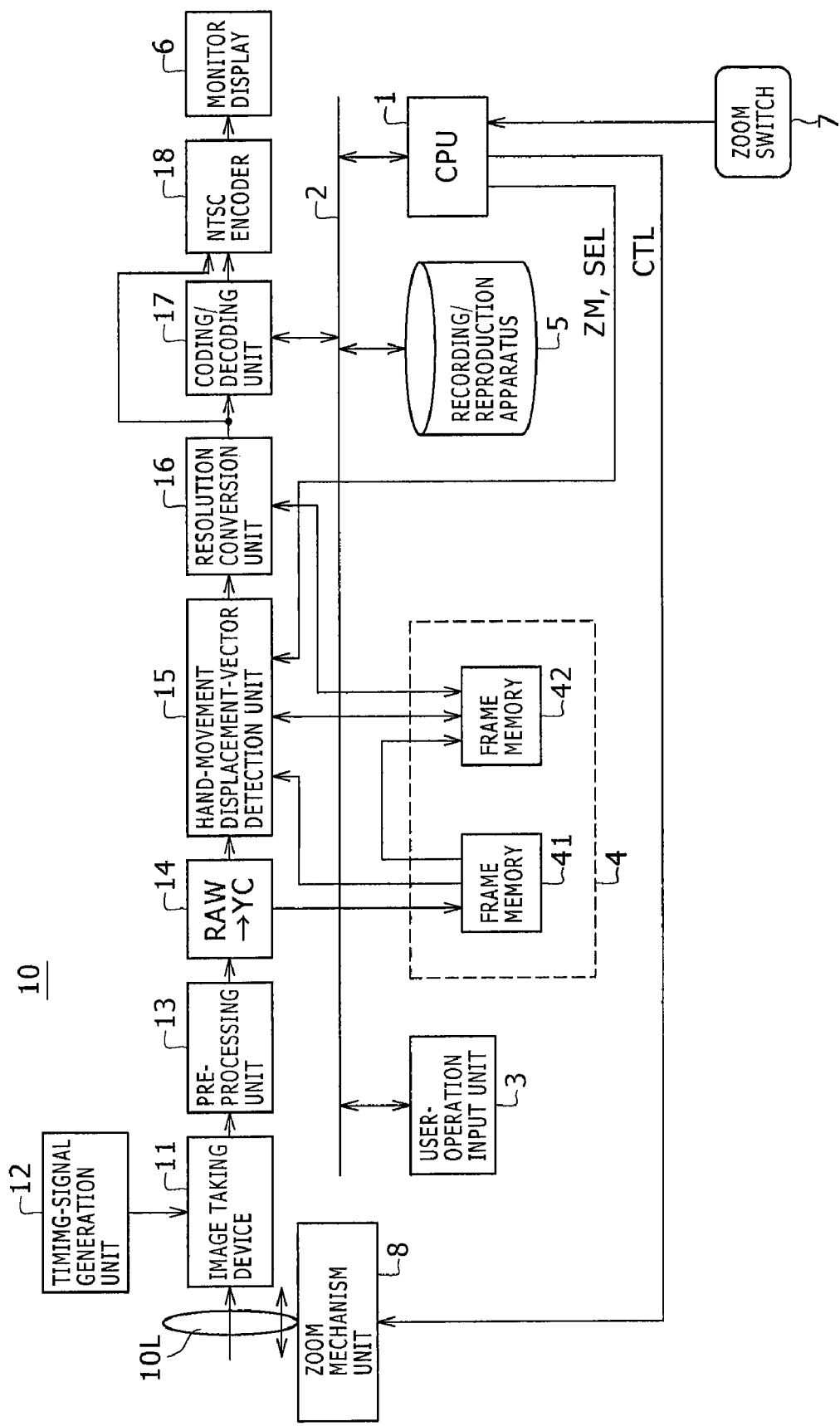
FIG. 2 is a block diagram showing a typical configuration of the image taking apparatus adopting a method to compensate an imager-created image for a distortion in accordance with the first embodiment.

Implementing the Apparatus for Compensating an Imager-Created Image for Distortions FIG. 2 is a block diagram showing a typical entire configuration of an image taking apparatus also functioning as the apparatus for compensating an imager-created image for distortions in accordance with a first embodiment.

As shown in FIG. 2, the image taking apparatus according to the embodiment includes an imager-created image signal processing system 10, a CPU (Central Processing Unit) 1, a user-operation input unit 3, an image memory unit 4 and a recording/reproduction apparatus 5, which are connected to each other by a system bus 2. It is to be noted that the CPU 1 described in this patent specification includes a ROM (Read Only Memory) for storing various kinds of software to be executed by the CPU 1 as processing programs and a RAM (Random Access Memory) used by the CPU 1 as a work area.

An optical zoom operation unit to be operated by the user acting as a photographer is provided at a predetermined location on a case enclosing the image taking apparatus according to the embodiment. A zoom switch 7 is a typical optical zoom operation unit. The zoom switch 7 is typically a button switch of the seesaw type. When the user operates the zoom switch 7, information on an operation carried out by the user is supplied to the CPU 1.

Figure 3:
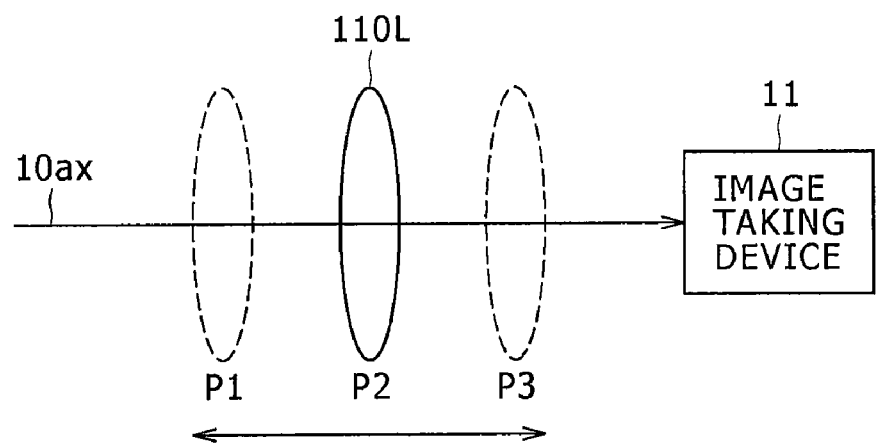
FIG. 3 is an explanatory diagram to be referred to in description of optical zoom control executed in the image taking apparatus.

According to this embodiment, a camera optical system 10L including a lens 110L for taking a picture is provided with a zoom mechanism unit 8 having an actuator. In this embodiment, the zoom mechanism unit 8 has a mechanism for changing the position of the lens 110L employed in the camera optical system 10L in the direction of the optical axis 10ax of an incoming light beam as shown in FIG. 3. In FIG. 3, notations P1, P2 and P3 each denote a zoom position. Thus, a taken picture is a picture corresponding to one of the zoom positions.

The zoom mechanism unit 8 receives a zoom control signal CTL generated by the CPU 1 as a signal representing information on an operation carried out by the user on the zoom switch 7. In accordance with the zoom control signal CTL, the zoom mechanism unit 8 controls the position of the lens 110L employed in the camera optical system 10L in the so-called zoom control.

That is to say, when the user operates the zoom switch 7 in a zoom-up direction, the zoom mechanism unit 8 is controlled by the zoom control signal CTL generated by the CPU 1 to set an image-taking lens system on a long-focal-distance side (or a telephotographing side). When the user operates the zoom switch 7 in a zoom-down direction, on the other hand, the zoom mechanism unit 8 is controlled by the zoom control signal CTL generated by the CPU 1 to set the image-taking lens system on a short-focal-distance side.

The typical image taking apparatus shown in FIG. 2 receives a command to start an image taking/recording process from the user through the user-operation input unit 3 and carries out the process to record data of an imager-created image onto a recording medium mounted on the recording/reproduction apparatus 5 in accordance with the command as will be described later. By the same token, the typical image taking apparatus shown in FIG. 2 receives a command to start an image reproduction process from the user through the user-operation input unit 3 and carries out the process to reproduce data of an imager-created image from a recording medium mounted on the recording/reproduction apparatus 5 in accordance with the command.

As shown in FIG. 2, a light beam coming from an object of photographing by way of a camera optical system 10L including the image taking lens 110L is radiated to the image taking device 11, being converted into an imager-converted image. Typically, the image taking device 11 is a CCD imager or a CMOS imager.

In this typical image taking apparatus, when the user enters a command to start an image taking/recording process, data of an imager-created image is sampled from the image taking device 11 with timings according to a timing signal generated by the timing-signal generation unit 12 to produce a digital image taking signal, which is a RAW signal of a Bayer array including the three primary colors, i.e., the red (R), green (G) and blue (B) colors.

The digital image taking signal output by the image taking device 11 is supplied to the pre-processing unit 13 for carrying out preprocessing such as a defect compensation process and a γcompensation process. The preprocessing unit 13 outputs a result of the preprocessing to the data conversion unit 14. The data conversion unit 14 converts the analog imager-created image signal supplied thereto into a digital imager-created image signal (YC data) including a luminance signal component Y and chrominance signal component Cb/Cr, supplying the digital imager-created image signal to the image memory unit 4 through the system bus 2.

In the embodiment shown in FIG. 2, the image memory unit 4 includes two frame memories 41 and 42. First of all, the digital imager-created image signal received from the data conversion unit 14 is stored in the frame memory 41. Then, after the lapse of time corresponding to one frame, the digital imager-created image signal stored in the frame memory 41 is transferred to the frame memory 42 and a new digital imager-created image signal received from the data conversion unit 14 is stored in the frame memory 41. Thus, a frame represented by the digital imager-created image signal stored in the frame memory 42 is an immediately preceding frame, which precedes a frame represented by the digital imager-created image signal stored in the frame memory 41 by one frame.

In this embodiment, the hand-movement displacement-vector detection unit 15 is a unit for detecting a movement vector of the imager-created image from the data of the imager-created image. In this case, the movement vector is a hand-movement displacement vector, which is a vector representing a displacement caused by a hand movement. When an optical zoom operation is carried out during a photographing operation, in particular, as will be described later, the hand-movement displacement-vector detection unit 15 also removes an optical zoom portion vector from a detected movement vector to result in a hand-movement displacement vector representing a displacement caused by a hand movement. The optical zoom portion vector is a vector representing a movement component caused by the optical zoom operation as component of a movement of the imager-created image. Thus, in order to find a hand-movement displacement vector, the hand-movement displacement-vector detection unit 15 is supplied zoom information ZM by the CPU 1 as will be described later. The zoom information ZM is information on a zoom operation carried out by the user on the zoom switch 7.

As a method to detect a movement vector from data of an imager-created image, for example, a block matching technique of finding a correlation between two screens as described later is adopted. In accordance with the block matching technique, the hand-movement displacement-vector detection unit 15 makes accesses to the two frame memories 41 and 42 through the system bus 2 in order to read out data of imager-created images from the frame memories 41 and 42. The hand-movement displacement-vector detection unit 15 then carries out a process to detect a movement vector between the imager-created images. In this movement-vector detection process, the frame of the imager-created image stored in the frame memory 41 is taken as an observed frame to be used as a reference frame while the frame of the imager-created image stored in the frame memory 42 is an original frame serving as the target frame.

Then, the hand-movement displacement-vector detection unit 15 supplies the detected movement vector obtained as a result of the movement-vector detection process to the resolution conversion unit 16 provided at a later stage as a control signal.

In accordance with the movement vector received from the hand-movement displacement-vector detection unit 15, the resolution conversion unit 16 carries out a process to cut out image data of the delayed frame stored in the frame memory 42 and convert the frame into a frame having a necessary resolution and a necessary size. By cutting out image data of the frame stored in the frame memory 42 in accordance with an image distortion compensation, the image obtained as a result of the conversion process is an image free of hand-movement distortions which have been removed in pixel units. As described earlier, the movement vector received from the hand-movement displacement-vector detection unit 15 is a hand-movement displacement vector, which is also referred to hereafter as a global hand-movement displacement vector.

The image data produced by the resolution conversion unit 16 as image data not including distortion caused by a hand movement is supplied to the NTSC (National Television System Committee) encoder 18 for converting the image data into a standard color video signal conforming to an NTSC system. The NTSC encoder 18 then supplies the standard color video signal to the monitoring display 6 serving as an electronic view finder for displaying the imager-created image on a screen for the purpose of monitoring.

Concurrently with the process to display the imager-created image on the screen of the monitoring display 6 for the purpose of monitoring, the resolution conversion unit 16 also supplies the image data not including distortions caused by a hand movement to the coding/decoding unit 17 for carrying out a coding process such as modulation recording. The coding/decoding unit 17 then supplies image data obtained as a result of the coding process to the recording/reproduction apparatus 5 for recording the image data onto a recording medium. Examples of the recording medium are an optical disc such as a DVD (Digital Versatile Disc) and a hard disc.

When the user enters an operation command to the image taking apparatus via the user-operation input unit 3 as a command to start a process to reproduce recorded taken-image data, the data is reproduced from the recording medium of the recording/reproduction apparatus 5 and supplied to the coding/decoding unit 17. This time, the coding/decoding unit 17 carries out a decoding/reproduction process on the taken-image data. The coding/decoding unit 17 then supplies image data obtained as a result of the decoding/reproduction process to the monitoring display 6 by way of the NTSC encoder 18 for displaying the reproduced image on a screen. It is to be noted that the NTSC encoder 18 is also capable of supplying a video signal output thereby to an external signal recipient by way of an video output terminal even though this feature is not shown in FIG. 2.

Configuration of the Hand-Movement Displacement-Vector Detection Unit 15

Figure 1:
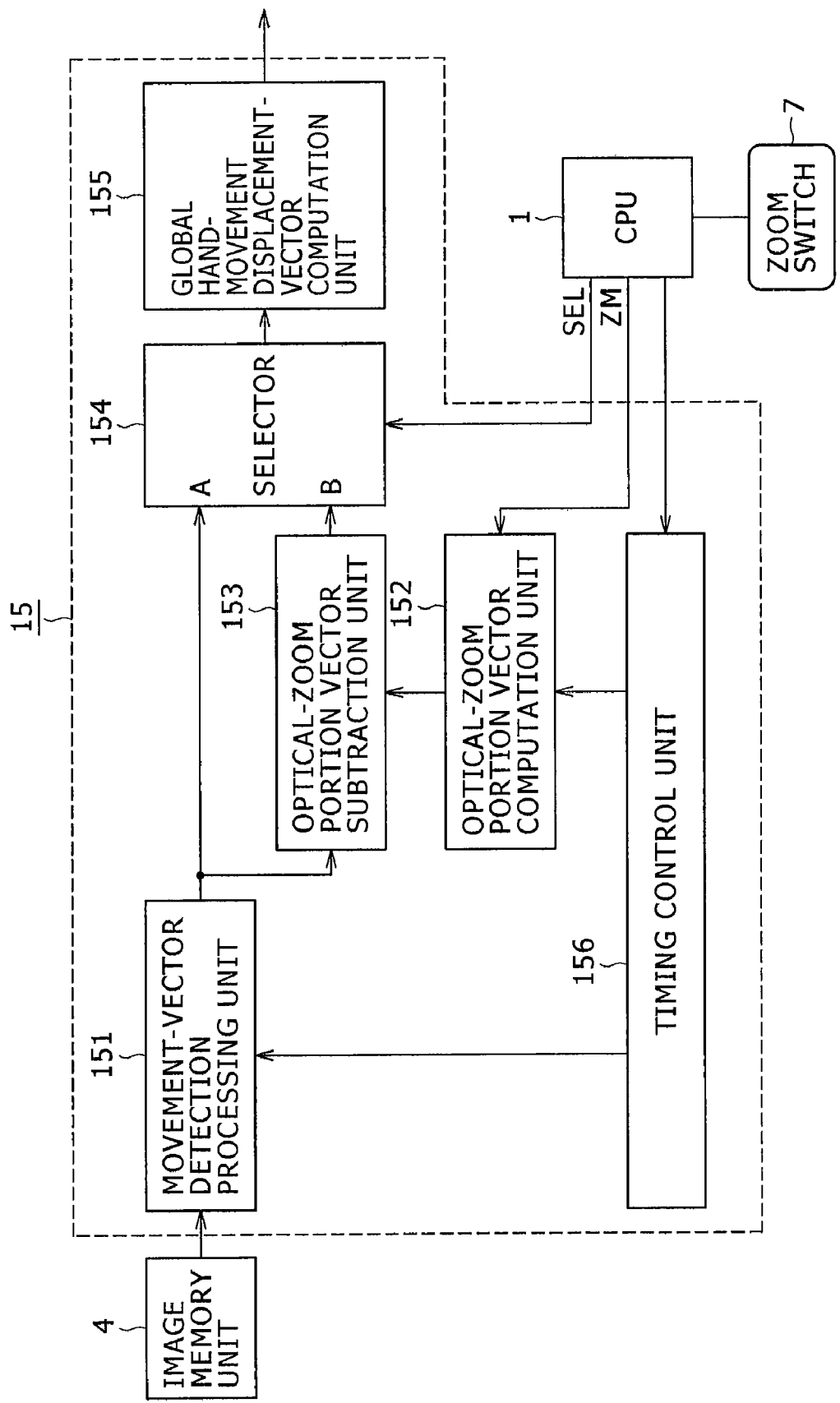
FIG. 1 is a block diagram showing a typical configuration of a hand-movement displacement-vector detection unit employed in an image taking apparatus adopting a method for compensating an imager-created image for a distortion in accordance with a first embodiment.

FIG. 1 is a block diagram showing a configuration of the hand-movement displacement-vector detection unit 15 according to an embodiment. As shown in the figure, the hand-movement displacement-vector detection unit 15 according to this embodiment includes a movement-vector detection processing unit 151, an optical-zoom portion vector computation unit 152, an optical-zoom portion vector subtraction unit 153, a selector 154, a global hand-movement displacement-vector computation unit 155 and a timing control unit 156.

The timing control unit 156 is a unit for generating timing control signals and supplying the timing control signals to the other units employed in the hand-movement displacement-vector detection unit 15 in accordance with control executed by the CPU 1.

The movement-vector detection processing unit 151 operates on the basis of a timing control signal received from the timing control unit 156 and detects a movement vector for an imager-created image from image data read out from the image memory unit 4 as image data of 2 screens.

Figure 5A:
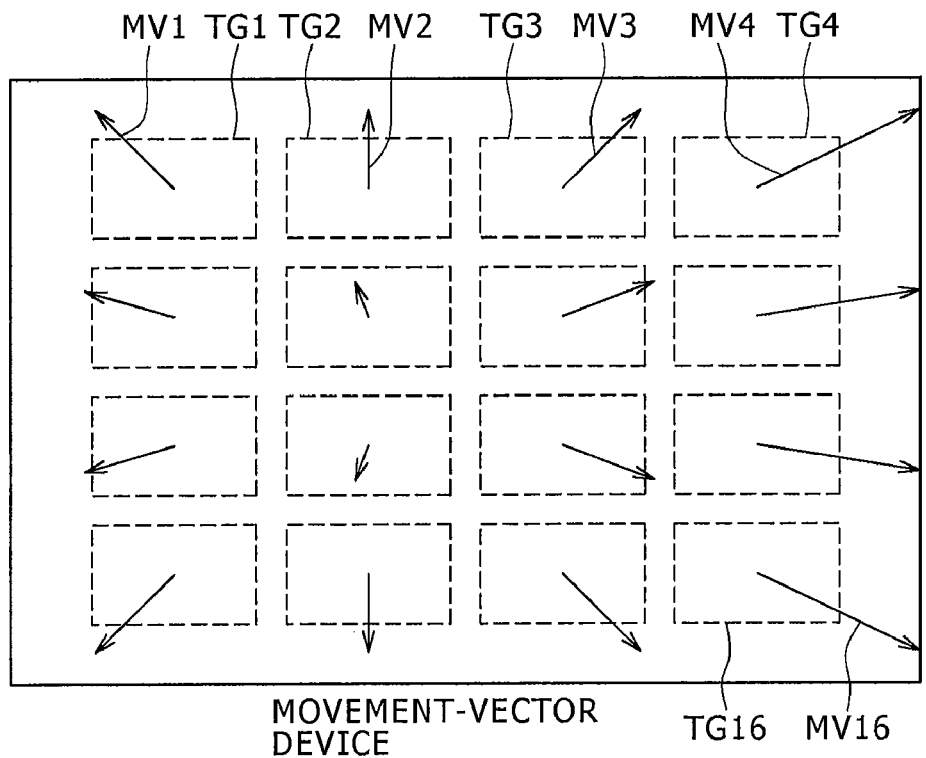
FIGS. 5A and 5B are each an explanatory diagram to be referred to in description of an embodiment implementing a method to compensate an imager-created image for a distortion in accordance with an embodiment.

In accordance with this embodiment, a plurality of target areas TG (also referred to hereafter as picture divisions) are set in one screen FL as will be described in detail later. In the case of a typical implementation according to this embodiment, 16 target areas TG are set in one screen FL, being laid out to form four columns arranged in the horizontal direction and four rows arranged in the switch direction. Thus, as shown in FIG. 5A, the movement-vector detection processing unit 151 detects a movement vector MVi for each of the target areas TGi, where notation i denotes an integer in the range 1, 2, - - - and 16 in the case of this typical implementation.

The movement-vector detection processing unit 151 supplies the detected movement vectors to an input terminal A of the selector 154 and the optical-zoom portion vector subtraction unit 153 in accordance with control based on a timing control signal received from the timing control unit 156. The input terminal A is one of two input terminals employed by the selector 154.

When the user operates the zoom switch 7 in order to carry out a zoom operation, the optical-zoom portion vector computation unit 152 computes an optical-zoom portion vector by making use of zoom information ZM received from the CPU 1 in accordance with control based on a timing control signal received from the timing control unit 156.

Figure 5B:
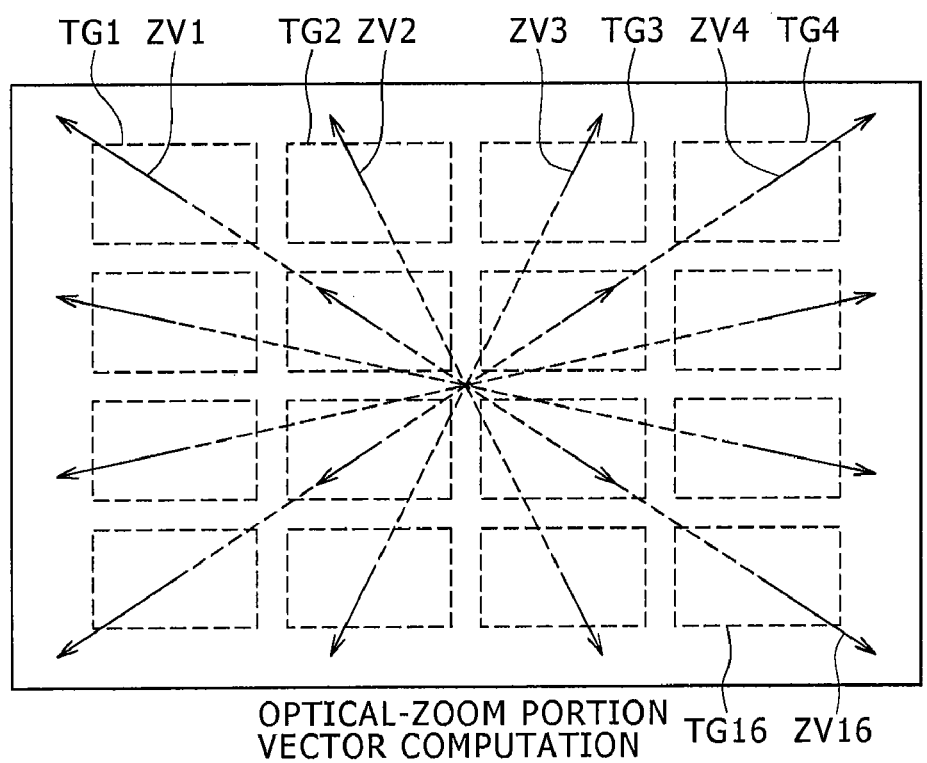

In the case of this typical implementation, as shown in FIG. 5B, the optical-zoom portion vector computation unit 152 detects an optical-zoom portion vector ZVi for each of the target areas TGi, for each of which the movement-vector detection processing unit 151 detects a movement vector MVi as described earlier, where notation i denotes an integer in the range 1, 2, - - - and 16. The optical-zoom portion vector computation unit 152 then supplies the detected optical-zoom portion vectors ZVi to the optical-zoom portion vector subtraction unit 153.

Figure 4:
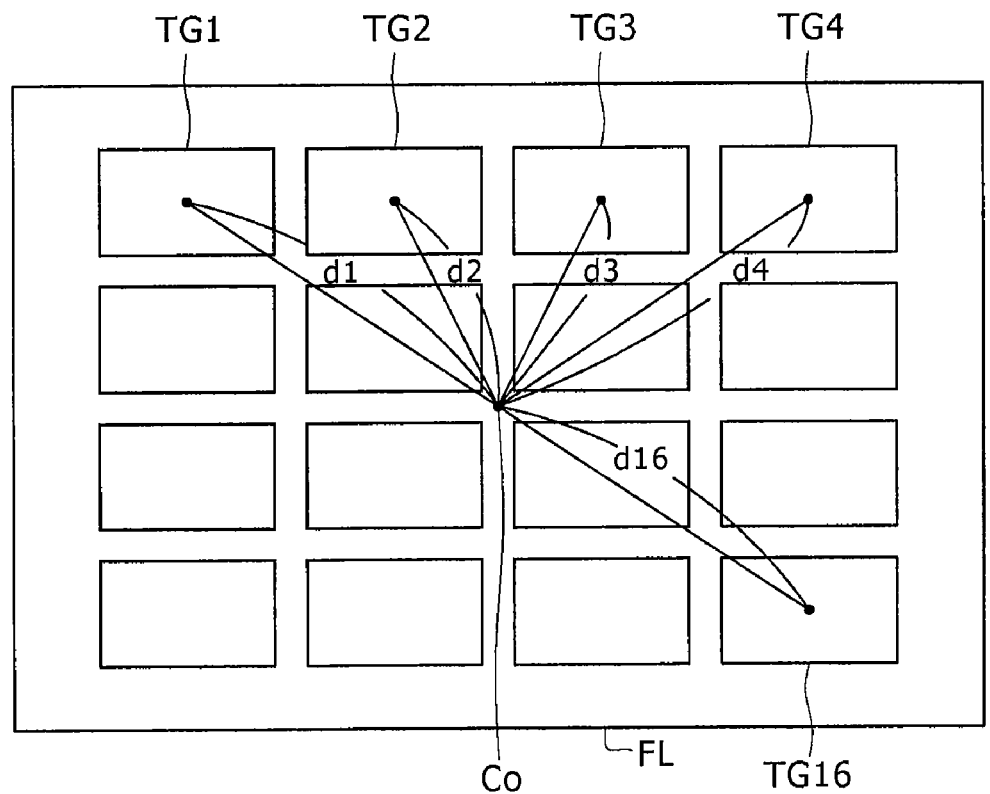
FIG. 4 is an explanatory diagram to be referred to in description of an embodiment implementing a method to compensate an imager-created image for a distortion in accordance with an embodiment.

The magnitude of an optical-zoom portion vector ZVi can be found for any specific one of the target areas TGi from a time period t, a zoom velocity v and a distance di where notation i denotes an integer in the range 1, 2, - - - and 16 in the case of this typical implementation. The time period t is the length of time lapsing since the start of an optical zoom operation carried out by the user on the zoom switch 7. As shown in FIG. 4, the distance di is a distance between the center position of the specific target area TGi and the center position Co of the screen FL.

The zoom velocity v is a value found by dividing the distance by which the image taking lens 110L between two consecutive one-frame image segments in a direction parallel to the optical axis 10ax shown as an arrow in FIG. 3 by the time corresponding to one frame. The zoom velocity v is a value determined for each screen. In general, the zoom velocity v increases in proportion to the time period t, which is defined as the length of time lapsing since the start of a zoom operation carried out by the user on the zoom switch 7 as described above.

The magnitude of an optical-zoom portion vector ZVi detected for any specific one of the target areas TGi is a quantity proportional to the distance between the center position of the specific target area TGi and the center position Co of the screen FL.

That is to say, if the time period t, which is the length of time lapsing since the start of a zoom operation carried out by the user on the zoom switch 7, is known, the zoom velocity v can be found. Then, if the zoom velocity v is known, the magnitude of an optical-zoom portion vector ZVi detected for each of the target areas TGi can be found.

It is to be noted that the direction of an optical-zoom portion vector ZVi detected for any specific one of the target areas TGi is the direction from the center position Co of the screen FL to the center position of the specific target area TGi as shown in FIG. 5B.

When the user operates the zoom switch 7 in order to carry out a zoom operation, the CPU 1 generates a zoom control signal CTL and supplies the signal to the zoom mechanism unit 8. At the same time, the CPU 1 also provides the optical-zoom portion vector computation unit 152 with the aforementioned zoom information ZM including the zoom velocity v and the time period t, which is the length of time lapsing since the start of the zoom operation carried out by the user on the zoom switch 7.

The optical-zoom portion vector computation unit 152 detects an optical-zoom portion vector ZVi for each of the target areas TGi by making use of the zoom information ZM received from the CPU 1 and supplies the detected optical-zoom portion vectors ZVi to the optical-zoom portion vector subtraction unit 153 as described earlier.

Figure 6A:
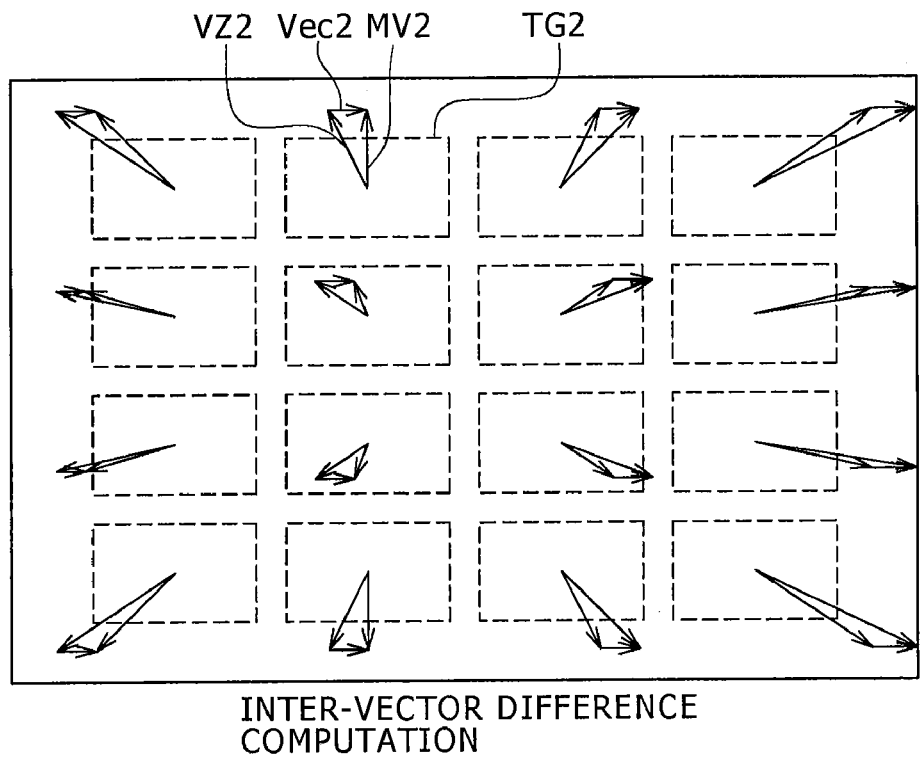
FIGS. 6A and 6B are each an explanatory diagram to be referred to in description of an embodiment implementing a method to compensate an imager-created image for a distortion in accordance with an embodiment.
Figure 6B:
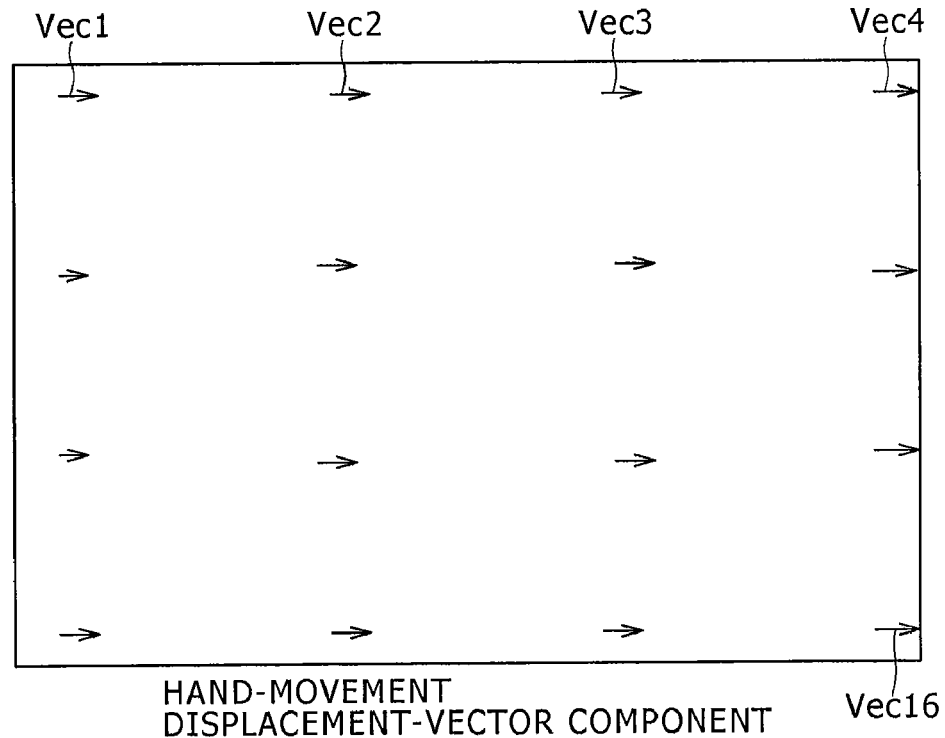

The optical-zoom portion vector subtraction unit 153 is a unit for finding a vector Veci for each particular one of the target areas TGi as shown in FIG. 6A as a difference between a movement vector MVi found by the movement-vector detection processing unit 151 for the particular target area TGi as shown in FIG. 5A and an optical-zoom portion vector ZVi found by the optical-zoom portion vector computation unit 152 for the particular target area TGi as shown in FIG. 5B where notation i denotes an integer in the range 1, 2, - - - and 16 in the case of this typical implementation. The optical-zoom portion vector subtraction unit 153 supplies the difference vectors Veci shown in FIG. 6B to the other terminal B of the selector 154.

When the user operates the zoom switch 7 in order to carry out a zoom operation, the CPU 1 supplies a select control signal SEL for driving the selector 154 to select the input terminal B and, hence, output the difference vectors Veci received from the optical-zoom portion vector subtraction unit 153. Otherwise, the CPU 1 supplies a select control signal SEL for driving the selector 154 to select the input terminal A and, hence, output the movement vectors MVi received from the movement-vector detection processing unit 151. The selector 154 is a unit for selecting the difference vectors Veci or the movement vectors MVi in accordance with the select control signal SEL and supplying the selected vectors to the global hand-movement displacement-vector computation unit 155.

Thus, when the user does not operates the zoom switch 7 to carry out a zoom operation, the global hand-movement displacement-vector computation unit 155 receives a plurality of movement vectors MVi from the movement-vector detection processing unit 151 through the selector 154 and carries out a statistical process on the movement vectors MVi while considering transitions each indicated by one of the movement vectors on a frame observed in the past in order to produce a global hand-movement displacement vector Gvec for the currently observed frame. The global hand-movement displacement-vector computation unit 155 then supplies the Gvec confirmed in this way to the resolution conversion unit 16.

When the user operates the zoom switch 7 in order to carry out a zoom operation as a part of a photographing operation, on the other hand, the global hand-movement displacement-vector computation unit 155 receives a plurality of difference vectors Veci from the optical-zoom portion vector subtraction unit 153 through the selector 154 and carries out a statistical process on the difference vectors Veci as well as inference of difference vectors Veci obtained for a frame observed in the past in order to produce a global hand-movement displacement vector Gvec for the currently observed frame. The global hand-movement displacement-vector computation unit 155 then supplies the Gvec confirmed in this way to the resolution conversion unit 16.

As described earlier, in accordance with the global hand-movement displacement vectors Gvec received from the hand-movement displacement-vector detection unit 15, the resolution conversion unit 16 carries out a process to cut out image data of the delayed frame stored in the frame memory 42 and convert the frame into a frame having a necessary resolution and a necessary size.

Figure 7:
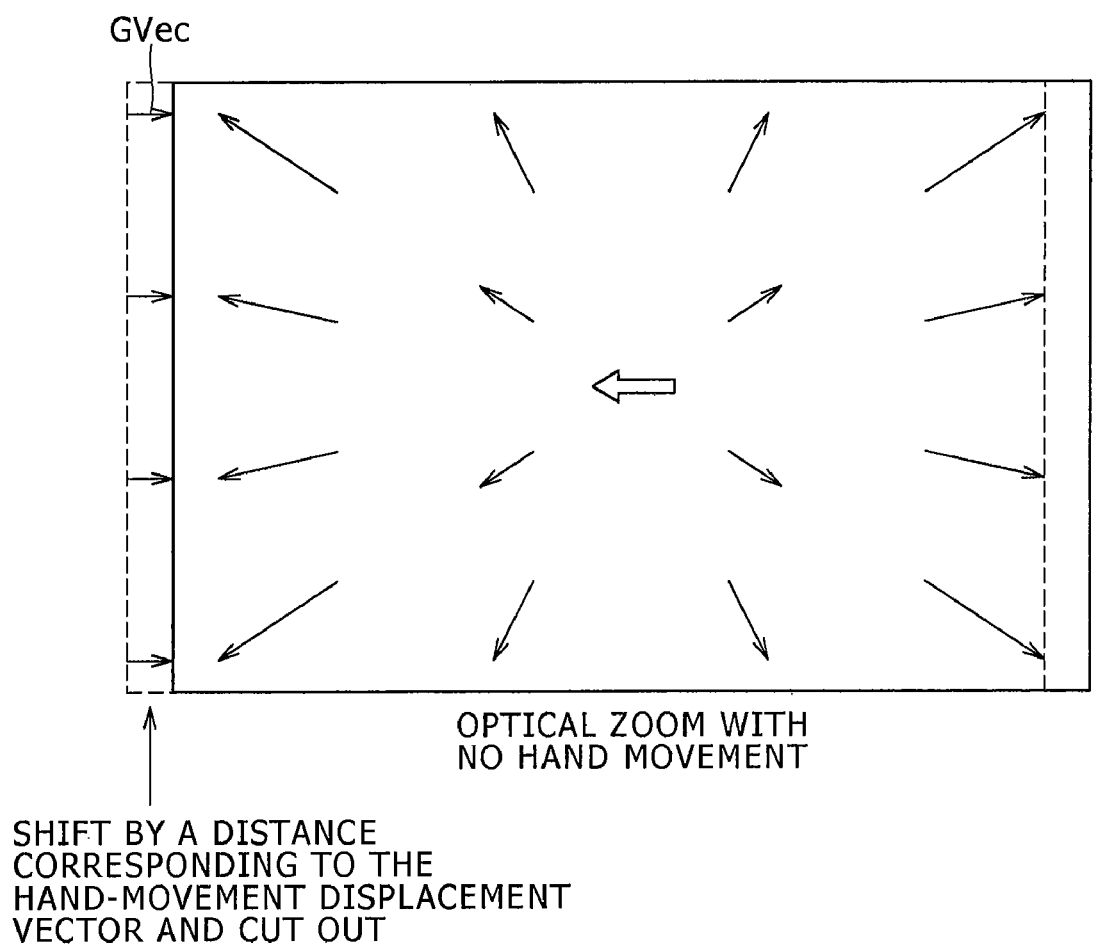
FIG. 7 is an explanatory diagram to be referred to in description of an embodiment implementing a method to compensate an imager-created image for a distortion in accordance with an embodiment.

Thus, even when the user operates the zoom switch 7 in order to carry out a zoom operation as a part of a photographing operation, effects of a hand movement can be eliminated from the imager-created image to result in a zoomed imager-created image as shown in FIG. 7.

Detection of a the Global Hand-Movement Displacement Vectors Gvec in the Hand-Movement Displacement-Vector Detection Unit 15

In this embodiment, a process to compensate an image for a distortion caused by a hand movement by adoption of an optical technique is not carried out at all. Instead, a sensorless process to compensate an image for a distortion caused by a hand movement is carried out. The movement-vector detection processing unit 151 employed in the hand-movement displacement-vector detection unit 15 adopts a block matching technique of finding a correlation between two screens as a method for detecting a movement vector MV of an imager-created image. Adopting the block matching technique doesn't need mechanical components such as a gyro (or an angular velocity) sensor, the image taking apparatus adopted the techniques is advantageous for reduction in size and weight.

As described above, FIGS. 8 and 9 are diagrams each referred to in description of the outline of the block-matching technique in the related art. FIG. 10 shows a flowchart representing typical processing adopting the block-matching technique in the related art.

In accordance with the block-matching technique in the related art, an imager-created image output by the image taking apparatus is taken as a currently observed screen (or a currently observed frame) also referred to hereafter as a reference screen (or a reference frame), or taken as an original screen (an original frame), which is an imager-created image leading ahead of the reference frame by a period corresponding to one screen (or one frame). In the following description, an original screen (an original frame) is also referred to as a target screen (or a target frame). The movement vector MV is a vector representing a positional change from the original screen serving as the target screen to the observed screen serving as the reference screen and is a vector unique to the target screen and the reference screen. The movement vector between the target screen and the reference screen is actually computed as a smallest correlation among correlations between a rectangular target block set in the target screen as a block having a predetermined size and a plurality of rectangular reference blocks each set in the reference screen as a block having the same size as the size of the target block.

It is to be noted that, strictly speaking, a screen means an image having data of one frame or one field. In this specification, however, a screen implies an image having data of one frame for the sake of convenience. That is why the technical terms 'frame' and 'screen' are used interchangeably to mean the same thing in this specification. Thus, a currently observed screen (or a currently observed frame) is also referred to hereafter as a reference screen (or a reference frame), whereas an original screen (an original frame) is also referred to as a target screen (or a target frame).

For example, the image data of a reference frame is the image data of the frame produced currently by the image taking apparatus or, as an alternative, the image data of the frame produced currently by the image taking apparatus is stored in a frame memory and the image data of a reference frame is the image data of a frame lagging behind the frame produced currently by the image taking apparatus by a period corresponding to one frame. That is to say, the image data of the reference frame is image data, which is being currently output by the image-taking unit as the image data of the current frame or has been stored in a frame memory for the lapse of a delay time corresponding to occurrence of one frame since the appearance of the current frame. On the other hand, the image data of the original frame is image data, which has been output by the image-taking unit and stored in a frame memory for the lapse of a delay time corresponding to occurrence of two consecutive frames since the appearance of the current frame, as the image of an immediately preceding frame.

As described above, FIGS. 8 and 9 are diagrams each referred to in description of the outline of the block-matching technique in the related art. FIG. 10 shows a flowchart representing typical processing adopting the block-matching technique in the related art.

Figure 8:
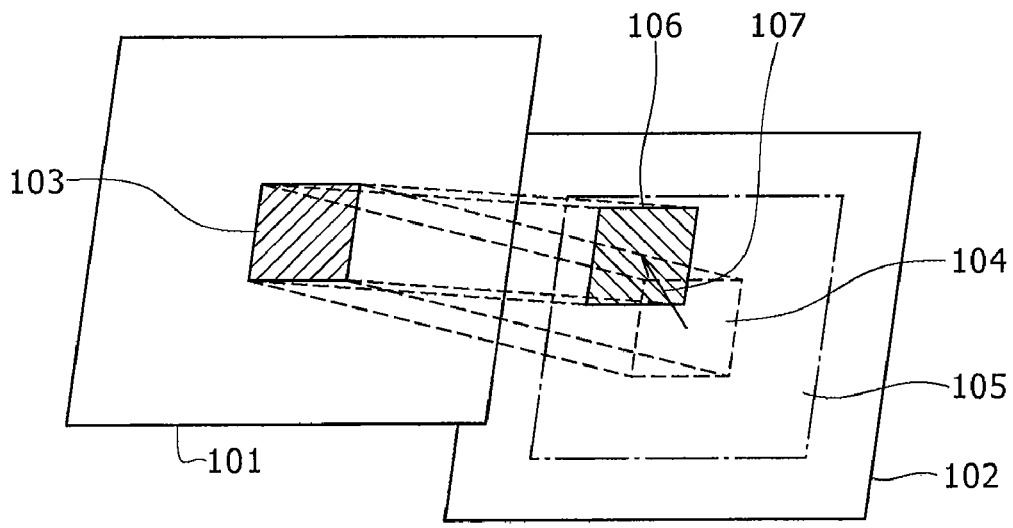
FIG. 8 is an explanatory diagram to be referred to in description of a process to detect a movement vector by adoption of a block matching technique.

In accordance with the block-matching technique in the related art, as shown in FIG. 8, at any arbitrary predetermined position on the original frame 101 also referred to as a target frame 101, a target block 103 is set. The target block 103 is a rectangular area having a predetermined size. The target block 103 has a plurality of pixels arranged in the horizontal direction to form a line and a plurality of such lines arranged in the vertical direction.

On the other hand, at the same position (or the same coordinates) on a reference frame 102 as the position (or the coordinates) of the target block 103. In FIG. 8, the target-block projected image block 104 is drawn as a block enclosed by a dashed line. Then, a search range 105 is set with its center coinciding with the target-block projected image block 104. In FIG. 8, the search range 105 is drawn as a block enclosed by an alternate long and short dash line. In addition, a reference block 106 is assumed to be a block to be moved from position to position over the search range 105 as will be described below.

Then, the position of the reference block 106 on the reference frame 102 is changed over the search range 105 in an endeavor to search the search range 105 for a position showing a strongest correlation between the image data included in the reference block 106 at the position and the image data included in the target block 103, that is, for a position at which the correlation between the moving reference block 106 and the target block 103 becomes strongest. A position showing the strongest correlation between the reference block 106 and the target block 103 is detected as the strongest-correlation position of the reference block 106 or the actual position of the target block 103 on the reference frame 102. The magnitude of the shift of the detected strongest-correlation position of the reference block 106 or the actual position of the target block 103 on the reference frame 102 from the position of the target-block projected image block 104 is detected as a movement vector 110, which includes a movement direction.

In the process to search the search range 105 for a position showing a strongest correlation between the image data included in the moving reference block 106 at the position and the image data included in the target block 103, the position of the reference block 106 on the reference frame 102 is changed over the search range 105 typically in the vertical and horizontal directions by a distance corresponding to one pixel or a plurality of pixels at one time. Thus, a plurality of reference block positions are each set in the search range 105 in advance as a position to which the reference block 106 is to be moved during the search process.

The strongest correlation between the reference block 106 moving from position to position over the search range 105 and the target block 103 is basically computed on the basis of pixels of the reference block 106 at every present position thereof and corresponding pixels of the target block 103. The movement vector 110 cited above is detected as a reference vector representing the magnitude and direction of a distance from the position of the target-block projected image block 104 to the strongest-correlation position of the reference block 106 by making use of a table to be described later as a table for storing results of the process to find the strongest correlation between the moving reference block 106 and the target block 103 by adoption of a typical method whereby the correlation is expressed as a SAD (Sum of Absolute Differences) value. The SAD value is a sum of the absolute values of differences in luminance value between all pixels in the reference block 106 and all corresponding pixels in the target block 103. The strongest correlation is represented by a minimum SAD for the strongest correlation position indicated by the movement vector 110 from the position of the target-block projected image block 104.

In accordance with the block-matching technique, a plurality of positions to which the reference block 106 is to be moved over the search range 105 are set in advance, the positions are searched for a specific one showing the strongest correlation between the reference block 106 and the target block 103 or a specific one having the minimum SAD value between the reference block 106 and the target block 103, and a reference vector 107 including a shift direction is used as a vector representing a shift from the position of the target block 103 on the original frame 101 or the position of the target-block projected image block 104 on the reference frame 102 to the specific position showing the strongest correlation between the reference block 106 and the target block 103 or the specific position having the minimum SAD value between the reference block 106 and the target block 103 as shown in FIG. 8. The reference vector 107 pointing to the reference block 106 thus has a value determined by the strongest-correlation position of the reference block 106 on the reference frame 102 and, in the case of the block-matching technique, the strongest-correlation position of the reference block 106 is a position showing a minimum SAD value.

Figure 9:
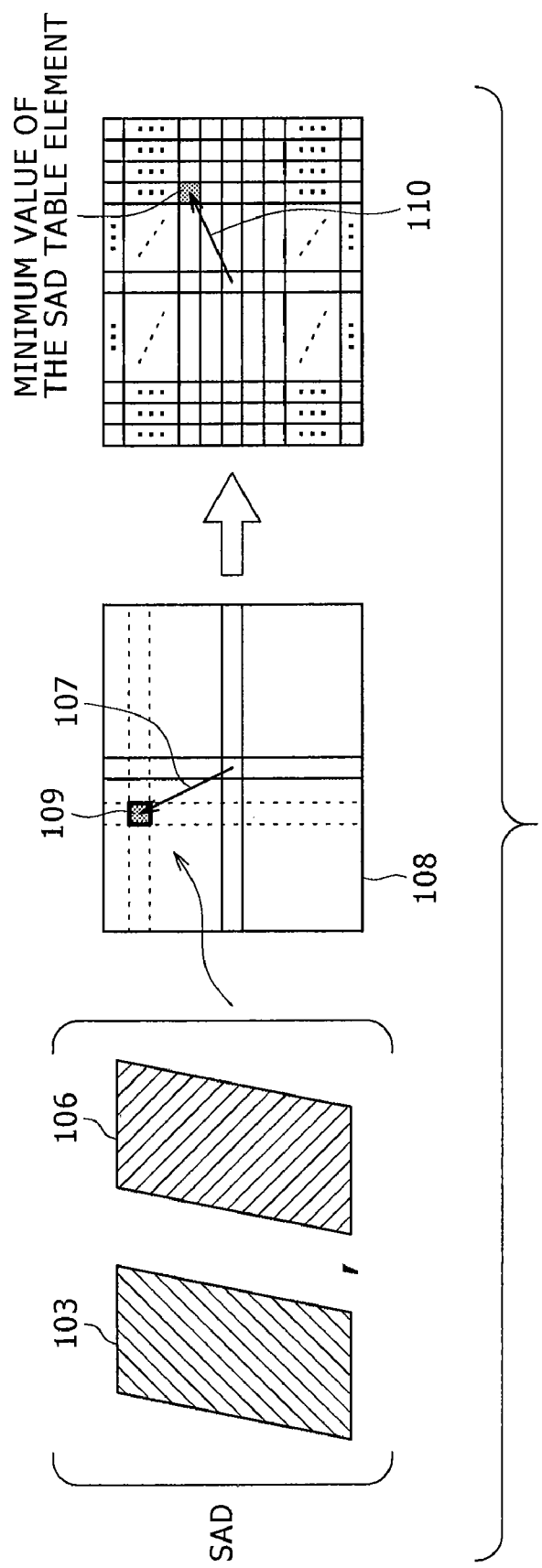
FIG. 9 is an explanatory diagram to be referred to in description of a process to detect a movement vector by adoption of the block matching technique.
Figure 10:
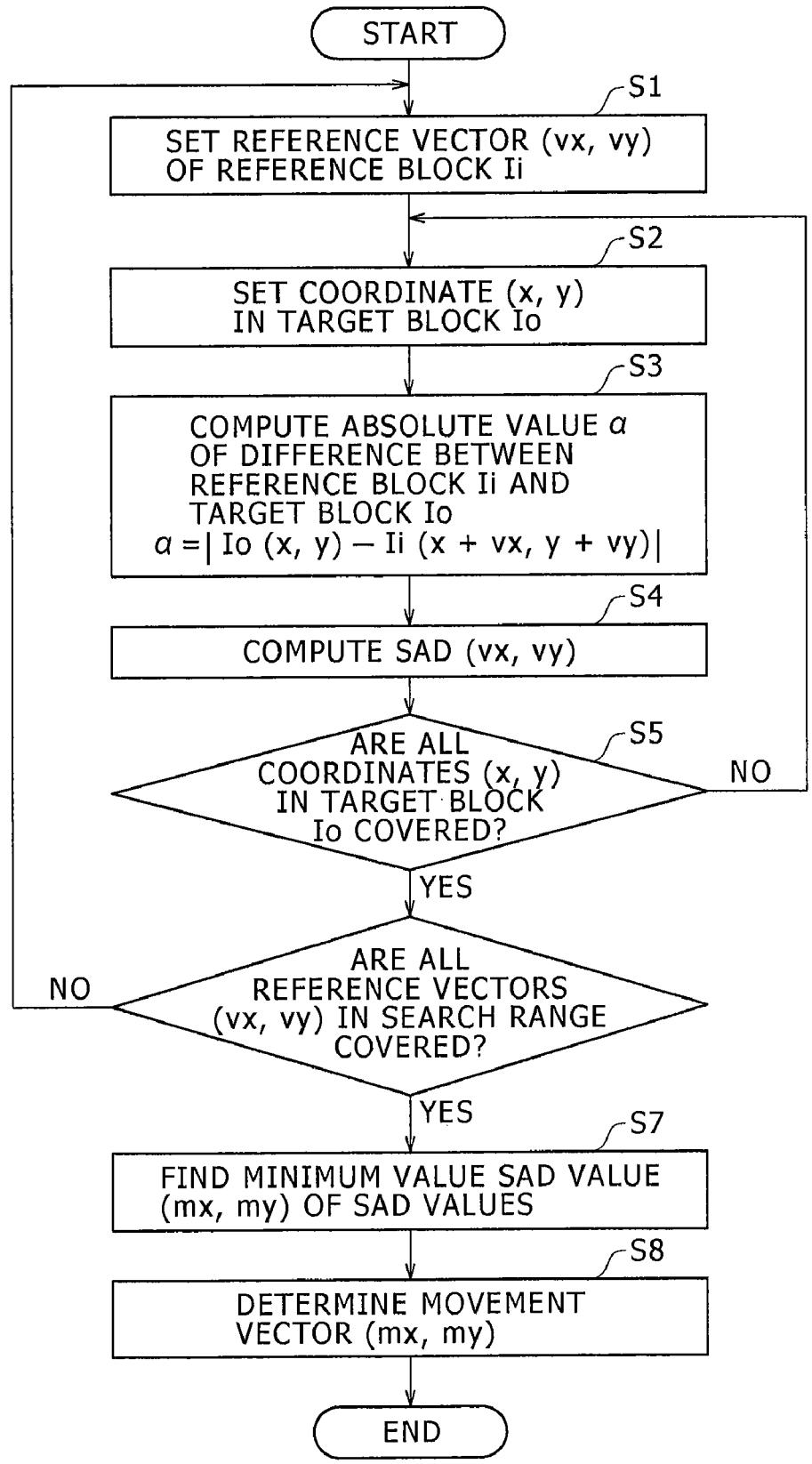
FIG. 10 shows a flowchart to be referred to in explanation of a process to detect a movement vector by adoption of the block matching technique.

In accordance with the block-matching technique, for each of a plurality of positions to which the reference block 106 is to be moved over the search range 105, a computed SAD value between the reference block 106 and the target block 103 is generally recorded as a table element 109 in a correlation-value table 108 stored in a memory by being associated with a reference vector 107 pointing to the position of the reference block 106 as shown in FIG. 9. In order to make the explanation simple, in the following description, a SAD value between the reference block 106 and the target block 103 is also referred to as a reference block SAD value. The reference vector 107 pointing to the position of the reference block 106 having the minimum SAD value is the movement vector 110 cited before. Thus, the movement vector 110, which is associated with the reference block 106 having the minimum SAD value can be found from the correlation-value table 108 by searching all the reference block SAD values stored in the memory for the minimum reference block SAD value.

As described above, for each of a plurality of positions to which the reference block 106 is to be moved over the search range 105, a reference block SAD value between the reference block 106 and the target block 103 is recorded as a table element 109 in a correlation-value table 108 also referred to hereafter as a SAD table 108 by being associated with a reference vector 107. The reference-block SAD value represents a correlation between the reference block 106 and the target block 103. Since the reference-block SAD value representing a correlation between the reference block 106 and the target block 103 is the sum of the absolute values of differences in luminance value between all pixels in the reference block 106 and all corresponding pixels in the target block 103, the correlation-value table 108 used for recording every sum of the absolute values of such differences is also referred to as a SAD table 108.

As shown in FIG. 9, each element 109 of the correlation-value table 108 is a correlation value of the reference block 106 at a position corresponding to the address of the element, or a reference-block SAD value for the position. In the following description, a SAD value and a correlation value are used interchangeably to imply the same quantity.

It is to be noted that, in the above description, the position of the target block 103 or the reference block 106 is the position of a specific portion of the target block 103 or the reference block 106 respectively. An example of the specific portion is the center of the target block 103 or the reference block 106. Also as described above, the reference vector 107 including a shift direction is a vector representing the quantity of a shift from the position of the target block 103 on the original frame 101 or the position of the target-block projected image block 104 on the reference frame 102 to the position showing the strongest correlation between the reference block 106 and the target block 103 or the position having the minimum SAD value between the reference block 106 and the target block 103. In the example shown in FIG. 8, the target block 103 is located at the center of the frame.

The reference vector 107 pointing to the reference block 106 and including a shift direction is a vector representing the quantity of a shift from the position of the target block 103 on the original frame 101 or the position of the target-block projected image block 104 on the reference frame 102 to the position showing the strongest correlation between the reference block 106 and the target block 103 or the position having the minimum SAD value between the reference block 106 and the target block 103. Thus, if the position showing the strongest correlation between the reference block 106 and the target block 103 or the position having the minimum SAD value between the reference block 106 and the target block 103 is identified, the value of the reference vector 107 is also identified. That is to say, if the address of the element of the correlation-value table 108 in the memory is identified, the value of the reference vector 107 is also identified.

The block-matching processing in the related art described above is explained in more detail by referring to the flowchart shown in FIG. 10 as follows.

The flowchart begins with a step S1 at which a reference block Ii is specified at a position having coordinates of (vx, vy) in the search range 105. An operation to specify a reference block Ii in the search range 105 is equivalent to an operation to specify a reference vector 107 corresponding to the reference block Ii. In the typical processing represented by the flowchart shown in FIG. 10, the coordinates of (vx, vy) are the coordinates of the position pointed to by the specified reference vector 107 with coordinates of (0, 0) taken as the coordinates of an origin position. The coordinates of (0, 0) are the coordinates of the position of the target block 103 on the original frame 101 or the coordinates of the position of the target-block projected image block 104 on the reference frame 102. The coordinate vx represents the horizontal-direction shift of the position pointed to by the specified reference vector 107 from the origin position whereas the coordinate vy represents the vertical-direction shift of the position pointed to by the specified reference vector 107 from the origin position having the coordinates of (0, 0).

The shift quantities (vx, vy) are each a quantity expressed in terms of pixel units. For example, an expression vx=+1 expresses a position shifted in the horizontal direction to the right from the origin position (0, 0) by a distance equivalent to one pixel. On the other hand, an expression vx=−1 expresses a position shifted in the horizontal direction to the left from the origin position (0, 0) by a distance equivalent to one pixel. In addition, an expression vy=+1 expresses a position shifted in the vertical downward direction from the origin position (0, 0) by a distance equivalent to one pixel. On the other hand, an expression vy=−1 expresses a position shifted in the vertical upward direction from the origin position (0, 0) by a distance equivalent to one pixel.

As described above, the coordinates (vx, vy) are the coordinates of a position pointed to by a reference vector 107 as a position relative to the origin position (0, 0). In the following description, the position pointed to by the reference vector 107 as a position relative to the origin position (0, 0) is referred to simply as a position pointed to by the reference vector 107 in order to make the explanation easy to understand. Each position pointed to by a reference vector 107 is said to be a position corresponding to the reference vector 107. That is to say, quantities (vx, vy), where notations vx and vy are each an integer, represent the reference vector 107 itself. Thus, in the following description, a reference vector 107 pointing to a position (vx, vy), which is a position having the coordinates of (vx, vy), is expressed as a reference vector (vx, vy).

As described earlier, the center position of the search range 105 is taken as the center position of the target-block projected image block 104 or the origin position (0, 0). The reference block 106 is moved from position to position over the search range 105 in the horizontal directions by distances in the range ±Rx defining the horizontal limits of the search range 105 and the vertical directions by distances in the range ±Ry defining the vertical limits of the search range 105. In this case, the quantities (vx, vy) satisfy the following relation:

$$-Rx \geq vx \geq +Rx \text{ and } -Ry \geq vy \geq +Ry$$

At the next step S2, a point (or a pixel) with coordinates (x, y) is specified as a point in the target block Io. Let us have notation Io (x, y) denote a pixel value at the specified point (x, y) and notation Ii (x+vx, y+vy) denotes a pixel value at a point (x+vx, y+vy) in the reference block Ii set at the block position (vx, vy) at the step S1. In the following description, the point (x+vx, y+vy) in the reference block Ii is said to be a point corresponding the point (x, y) in the target block Io. Then, at the next step S3, the absolute value α of the difference between the pixel value Io (x, y) and the pixel value Ii (x+vx, y+vy) is computed in accordance with Eq. (1) as follows:

$$\alpha = |Io(x,y) - Ii(x+vx, y+vy)| \qquad (1)$$

The above difference absolute value α is to be computed for all points (x, y) in the target block Io and all their corresponding points (x+vx, y+vy) in the reference block Ii, and a SAD value representing the sum of the difference absolute values α computed for the target block Io and the reference block Ii is stored at the address of a table element associated with the reference vector (vx, vy) pointing to the current location of the reference block Ii. That is to say, the SAD value is stored as a reference-value table element 109 associated with the reference block Ii as an element of the correlation-value table 108. In order to compute such a SAD value, at the next step S4, the difference absolute value α found at the step S3 is cumulatively added to a temporary SAD value already stored as a reference-value table element 109 associated with the reference block Ii pointed to by the reference vector (vx, vy) as a SAD value computed so far. The final SAD value SAD (vx, vy) is obtained as a result of a process to cumulatively sum up all difference absolute values α, which are computed for all points (x, y) in the target block Io and all their corresponding points (x+vx, y+vy) in the reference block Ii as described above. Thus, the final SAD value SAD (vx, vy) can be expressed by Eq. (2) as follows:

$$SAD(vx, vy) = \Sigma \alpha = \Sigma |Io(x,y) - Ii(x+vx, y+vy)| \qquad (2)$$

Then, the flow of the block-matching processing in the related art goes on to the next step S5 to produce a result of determination as to whether or not the processes of the steps S3 and S4 have been carried out for all points (x, y) in the target block Io and all their corresponding points (x+vx, y+vy) in the reference block Ii. If the result of the determination indicates that the processes of the steps S3 and S4 have not been carried out yet for all points (x, y) in the target block Io and all their corresponding points (x+vx, y+vy) in the reference block Ii, the flow of the block-matching processing in the related art goes back to the step S2 at which another point with coordinates (x, y) is specified as another point in the target block Io. Then, the processes of the steps S3 and S4 following the step S2 are repeated.

If the determination result produced at the step S5 indicates that the processes of the steps S3 and S4 have been carried out for all points (x, y) in the target block Io and all their corresponding points (x+vx, y+vy) in the reference block Ii, that is, if the final SAD value SAD (vx, vy) for the reference vector (vx, vy) has been found, on the other hand, the flow of the block-matching processing in the related art goes on to a step S6 to produce a result of determination as to whether or not the processes of the steps S2 to S5 have been carried out for all reference-block locations in the search range 105, that is, for all reference vectors (vx, vy).

If the determination result produced at the step S6 indicates that the processes of the steps S2 to S5 have not been carried out yet for all reference blocks in the search range 105, that is, for all reference vectors (vx, vy), the flow of the block-matching processing in the related art goes back to the step S1 at which another reference block Ii pointed to by another reference vector (vx, vy) is set at another block position (vx, vy) in the search range 105. Then, the processes of the step S1 and the subsequent steps are repeated.

If the determination result produced at the step S6 indicates that the processes of the steps S2 to S5 have been carried out for all reference-block positions in the search range 105 or for all reference vectors (vx, vy), that is, all elements of the correlation-value table 108 have been filled with final SAD values (vx, vy), on the other hand, the flow of the block-matching processing in the related art goes on to a step S7 at which the smallest value among all the final SAD values (vx, vy) stored in all the elements of the correlation-value table 108 is detected as a minimum value representing the strongest correlation between the target block 103 and the reference block 106. Then, at the next step S8, a reference vector (vx, vy) pointing to the address of an element included in the correlation-value table 108 as the element used for storing the smallest final SAD value (vx, vy) is recognized as the movement vector 110 described earlier. Let us have notation SAD (mx, my) denote the smallest final SAD value (vx, vy) whereas notation vector (mx, my) denote the reference vector (vx, vy) pointing to the address of an element 109 included in the correlation-value table 108 as the element used for storing the SAD (mx, my) or denote the movement vector 110.

As described above, the block-matching processing in the related art for a target block 103 is carried out to determine a movement vector (mx, my) for the target block 103.

In accordance with the sensorless method for detecting a hand-movement displacement vector (also referred to hereafter as a movement vector) by making use of a block matching technique as described above, in principle, a hand-movement displacement vector can be detected at a pixel precision level. In addition, since the method for detecting a hand-movement displacement vector does not need mechanical components such as a sensor and a lens shift, the method is very excellent from the cost point of view.

In an extension of a technology depending on the block-matching technique in the related art, nevertheless, the number of elements composing the correlation-value table 108 (or the SAD table 108) described earlier increases in proportion to the number of pixels on one screen. It is thus very difficult to implement a process to detect a movement vector for a still picture appearing on the contemporary display screen with a size of more than five million pixels by making use of a circuit having a realistic scale.

On a background of suffering a bitter failure in an attempt made to eliminate a circuit for detecting a hand-movement displacement vector for an NTSC (National Television System Committee) moving picture appearing on a display screen with a size not exceeding 170 thousand pixels while trying a variety of efforts in manufacturers of image taking apparatus in the past, a narrow hand-movement search range can be used in a process to detect a hand-movement displacement vector for an NTSC moving picture produced at a rate of 60 fps (frames per second), but in the case of a still picture, a rate of 3 fps is taken as a prerequisite so that the hand-movement search range becoming an extremely large serves as one of causes, which make the existing problem even more difficult to solve. This is because the number of elements composing the correlation-value table 108 increases in proportion to the number of pixels on one screen as well as the size of the hand-movement search range.

Patent Document 3 and some other documents have each proposed a technique for compensating a still picture for a distortion caused by a hand movement without making use of a sensor. A technique proposed in Patent Document 3 adopts an algorithm, in accordance with which, some still pictures are taken consecutively during such a short exposure period that the hand is not moving during the period, and hand-movement displacement vectors between the still pictures are found. Then, in accordance with the hand-movement displacement vectors, the still pictures taken consecutively are added to each other (or averaged) while being shifted in parallel (and rotating in the roll-axis direction) in order to find a final high-quality still picture with no effects of a hand movement and no low-illumination noises.

Japanese Patent Laid-Open No. 2005-38396 taken as Patent Document 4 proposes a realistic technology at a level that can be implemented. The technology disclosed in Patent Document 4 includes a unit configured to find a movement vector for a picture size obtained as a result of a conversion process to contract an original picture and a unit configured to allow a common SAD table to be shared by a plurality of blocks. The technique to contract an original picture and allow a common SAD table to be shared by a plurality of blocks is a very good method to implement reduction of the size of the correlation-value table 108 and also used in other fields such as detection of a movement vector in an MPEG (Moving Picture Expert Group) picture compression system and detection of a scene change.

However, the algorithm disclosed in Patent Document 4 has a problem that it takes time to carry out the conversion process to contract an original picture and make an access to a memory used in the process as a memory having a large size. An example of the memory is a DRAM (Dynamic RAM (Random Access Memory)). The time to make an access to the memory particularly becomes very long due to the fact that the algorithm makes use of a unit configured to make accesses to the correlation-value table 108 (or the SAD table 108), which is shared by a plurality of blocks, on a time-sharing basis. The very long time to make an access to the memory also unavoidably increases the time to carry out the processing based on the algorithm. Since the process to compensate an image taking apparatus for distortions caused by a hand movement is desired to be carried out in a real-time manner in order to shorten a system delay time, the long time it takes to carry out the processing based on the algorithm particularly raises a problem.

In addition, in order to carry out the conversion process to contract an original picture, it is necessary to carry out pre-processing prior to the conversion process by making use of a low-pass filter for getting rids of aliasing and low-illumination noises. Since the characteristic of the low-pass filter changes in accordance with the contraction factor of the conversion process and, in particular, in the case of a vertical-direction low-pass filter, a multi-tap digital filter is used, however, a number of line memories and processing logic circuits are requisite, raising a problem of an increasing circuit size.

On the other hand, algorithms each making use of no block-matching technique have also been proposed in documents such as Patent Document 2 and Japanese Patent Laid-Open No. 2004-343483 used as Patent Document 5. The proposed algorithms each employ a unit configured to detect a plurality of points each considered to be a characteristic point for some reasons on two consecutive frame images and associate the two consecutive frame images with each other on the basis of the detected characteristic points in order to find a global vector, which is a hand-movement displacement vector for the whole face of each of the frame images. As an alternative, characteristic points of one of the two consecutive frame images are detected and a block-matching process is carried out with respect to the other frame image only for areas each surrounding one of the detected characteristic point.

The algorithms disclosed in Patent Documents 2 and 5 each reduce the size of the processing circuit and are each a very effective, hence, being ideal. However, the effectiveness of the algorithms much depends on how much the number of identified characteristic points truly serving as characteristics of the entire faces of both the frame images and characteristics common to the two consecutive frame images can be reduced with a high degree of efficiency. The block-matching technique is considered to be a little ahead of the algorithms disclosed in Patent Documents 2 and 5 in robustness as long as all things in the universe are each taken as the photographing object of a consumer image taking apparatus.

As described earlier, in the image taking apparatus such as a digital camera, efforts are made to increase the pixel density of an imager more and more in the future in anticipation of a demand for better performance. In such a condition, implementation of a process to compensate the image taking apparatus for distortions caused by a hand movement occurring in an operation to take a still picture by adoption of a sensorless technique making use of no gyro (or angular velocity) sensor is very meaningful.

In order to implement such a process, as described before, a promising method is taken as a method to identify a hand-movement displacement movement vector in a sensorless way by adoption of the block-matching technique and compensate the image taking apparatus for distortions caused by a hand movement by making use of the identified vector. In the present state, however, the solution of adopting the block-matching technique has a problem that a proposal meeting all demands for a small processing-circuit size, a high processing speed and excellent robustness has not been made.

The block-matching technique has the biggest problem caused by the increased size of the correlation-value table. As already described earlier, at the present time where the image generated in a digital camera is demanded to have a size of at least five million pixels as a precondition, the size of the correlation-value table unavoidably increases in proportion to the number of pixels composing the image and, on top of that, a rate of about 3 fps is taken in the case of a still picture. Thus, a hand-movement search range with a size of about ten times the size of the hand-movement search range for a moving picture generated at a rate of 60 fps is requisite for a still picture. The increased size of the hand-movement search range is equivalent to the increased size of the correlation-value table, and the increased size of the correlation-value table is regarded as the biggest problem raised by the block-matching technique.

A result of evaluation given by a number of users obviously indicates that, on the assumption that the entire area of a frame is 100, the size of the hand-movement search area is about ±10%. In the case of a high-performance image taking apparatus, the number of pixels composing the image is already assumed to be 12 million and, with the presently proposed technology adopted as it is, the size of the necessary SAD table is estimated to be about 80 megabits. In addition, if an attempt is made to satisfy a realistic processing speed, an SRAM (Static RAM (Random Access Memory)) is demanded as a memory used for storing information contained in the correlation-value table. In spite of the fact that the semiconductor process rule is said to be making progress, this size of about 80 megabits is far away from a realistic level, being greater than a realistic value by about three digits.

Addressing the problems described above, inventors of the present application have provided an image-processing method allowing the size of a SAD table used in a process to identify a movement vector between two consecutive frames by adoption of the block-matching technique to be substantially reduced and provided an image-processing apparatus adopting the image-processing method.

In addition, among the proposed methods in the related art in the field of block matching, with regard to a technique disclosed in Patent Document 4 as a technique to reduce the size of the correlation-value table by carrying out an image conversion process to contract the image, the inventors pointed out the following two problems. One of the problems is an increased processing time and a raised memory size, which are caused by the image conversion process to contract the image. The other problem is an increased processing-circuit size caused by implementation of a proper robustness filter for avoiding aliasing in execution of the image conversion process to contract the image. It is desirable to solve these problems.

Outline of a New Block-Matching Technique Adopted the Movement-Vector Detection Processing Unit 151

Figure 11:
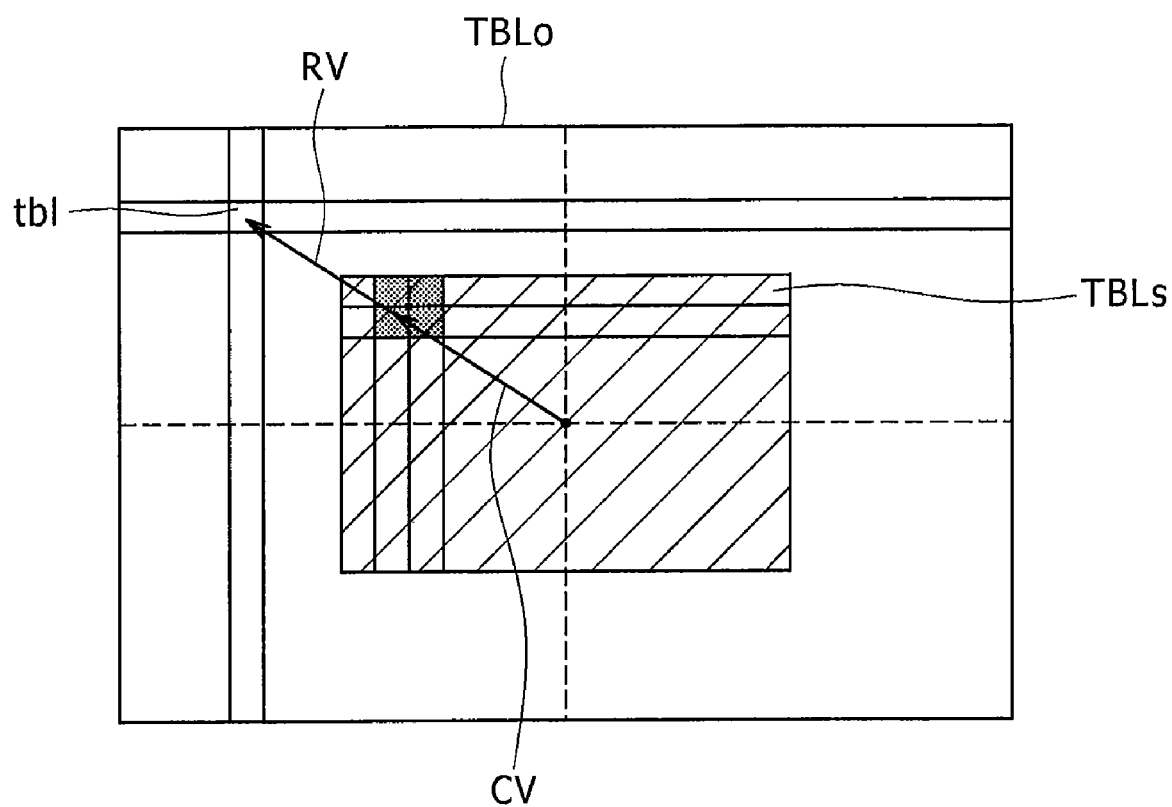
FIG. 11 is an explanatory diagram to be referred to in describing an outline of a process to detect a movement vector in accordance with an embodiment.

In an embodiment, the block-matching technique described above is adopted to detect a movement vector between two consecutive frames. In the case of this embodiment, however, SAD values each found between a target block and a reference block are each stored as a table element in the correlation-value table not by associating the SAD value with a reference vector RV pointing to a reference block, for which the SAD value has been found. Instead, as shown in FIG. 11, every reference vector RV originally provided for the original SAD table TBLo is contracted into a contracted reference vector CV for a shrunk SAD table TBLs with a size much smaller than the size of the original SAD table TBLo. Then, a SAD value originally stored in a table element included in the original SAD table TBLo as a table element pointed to by a reference vector RV associated with the SAD value is now split into component SAD values, which are then stored in a plurality of table elements included in the shrunk SAD table TBLs as table elements associated with the contracted reference vector CV. As shown in the figure, the table elements associated with the contracted reference vector CV are located in the neighborhood of a position pointed to by the contracted reference vector CV. Each of the table elements associated with a contracted reference vector CV is also associated with another contracted reference vector CV. Thus, each of the table elements is associated with a plurality of contracted reference vectors CV and used for storing the sum of component SAD values each obtained by splitting a SAD value found for a reference vector RV, which is contracted into one of the contracted reference vectors CV.

As described above, the shrunk SAD table TBLs has a size much smaller than the size of the original SAD table TBLo.

Figure 12A:
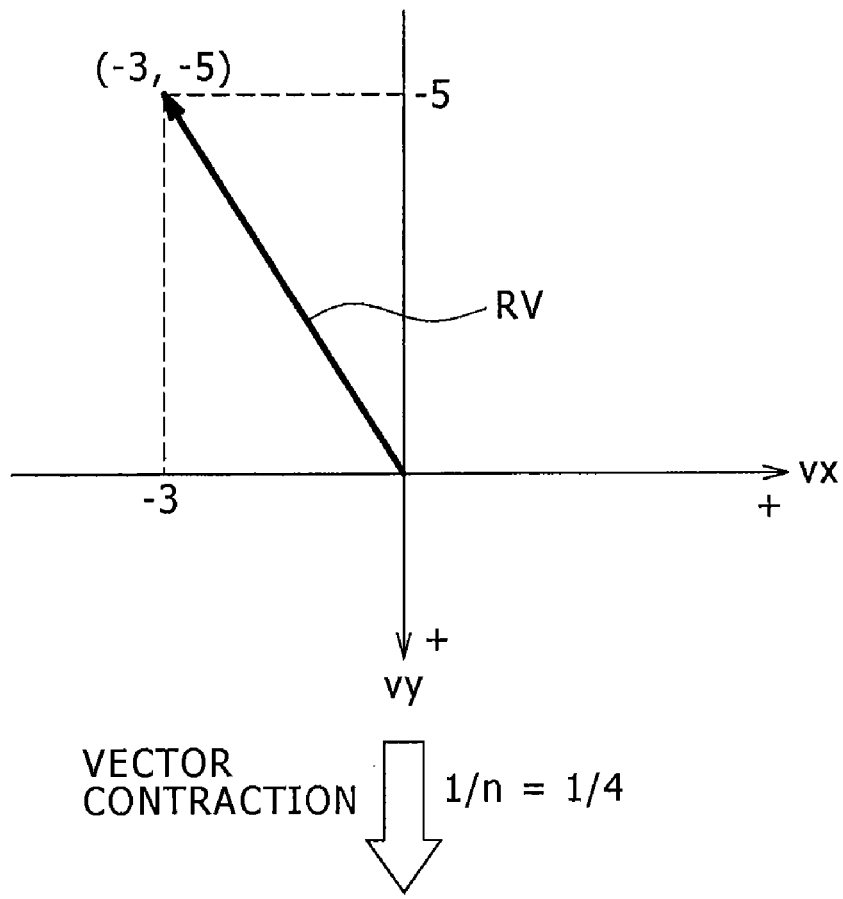
FIGS. 12A and 12B are each an explanatory diagram to be referred to in describing an outline of a process to detect a movement vector in accordance with an embodiment.
Figure 12B:
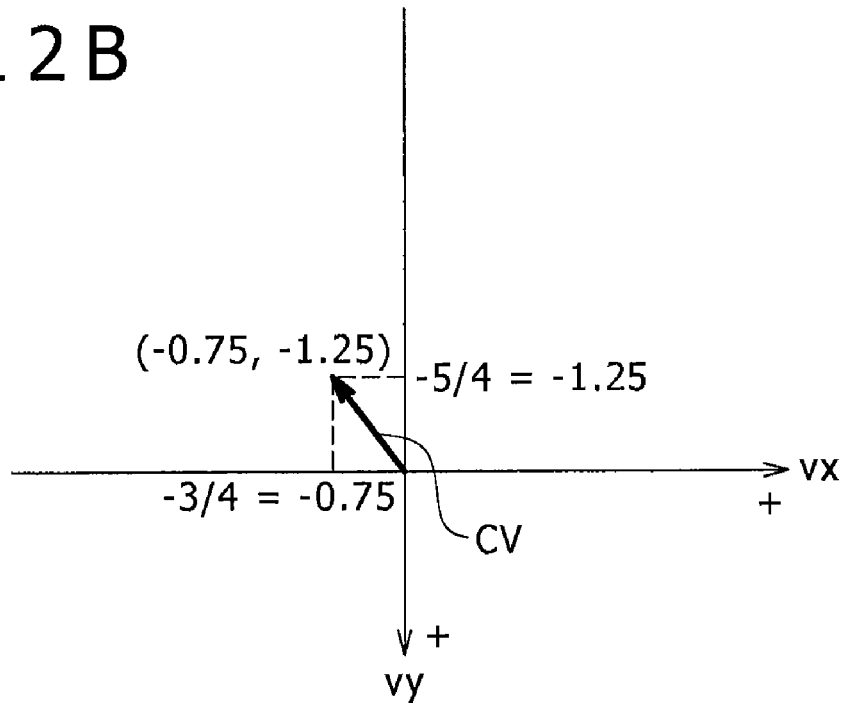
Figure 13:
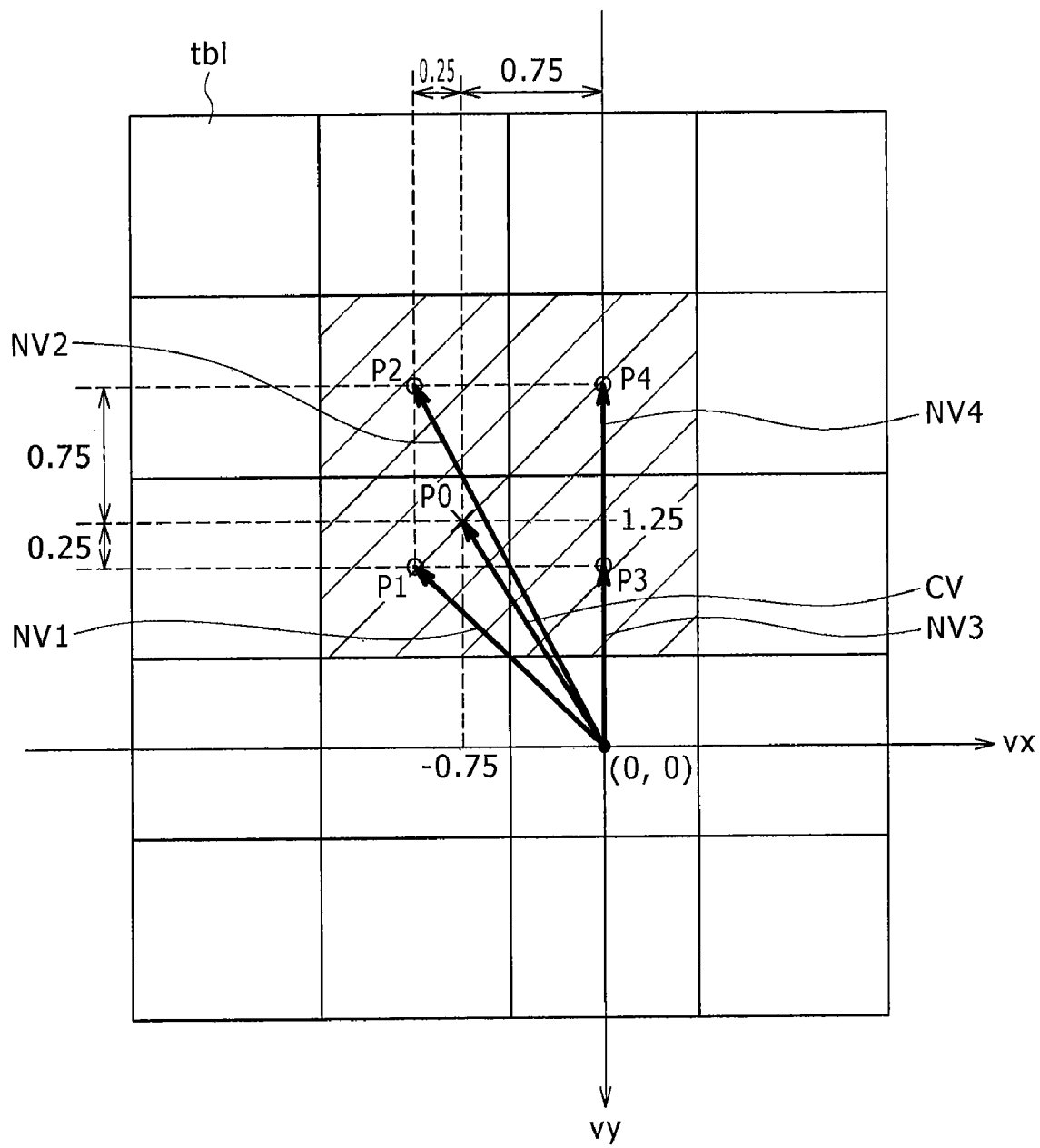
FIG. 13 is an explanatory diagram to be referred to in describing an outline of a process to detect a movement vector in accordance with an embodiment.

FIGS. 11 to 13 are each an explanatory diagram to be referred to in describing an outline of the new block-matching technique adopted by this embodiment. FIG. 11 is a diagram showing a relation between the SAD table TBLo in the related art and the shrunk SAD table TBLs generated in the new block-matching technique adopted by this embodiment.

Also in the case of this embodiment, much like the method in the related art explained earlier by referring to FIG. 8, a search range is set in the reference frame as a range centered at the center position of the target-block projected image block 104 corresponding to the target block 103 in the original frame, which is the target frame 101. Then, in the search range, a plurality of reference blocks 106 described earlier are set and a SAD value between the luminance values of pixels in each of the reference blocks 106 and the luminance values of the corresponding pixels in the target block 103 is computed. As described before, the SAD value is a sum of the absolute values of differences in luminance value between all pixels in the reference block 106 and all corresponding pixels in the target block 103.

In accordance with the block-matching method in the related art, as shown in FIG. 11, a computed SAD value is stored in the correlation-value table TBLo as a table element tbl located at an address pointed to by a reference vector RV of a reference block, for which the SAD value has been computed.

Thus, in the case of the block-matching technique in the related art, a reference vector RV representing the magnitude of a shift from the target block on the target frame to a reference block on the reference frame is associated with a SAD value stored as a table element tbl for the reference block in the correlation-value table TBLo on a 1-with-1 basis. That is to say, the number of table elements composing the SAD table TBLo in the related art is equal to the number of reference vectors RV that can be set in the search range.

In the case of the block-matching technique according to this embodiment, on the other hand, as shown in FIGS. 11, 12A and 12B, each reference vector RV pointing to a reference block being processed is contracted at a contraction factor of 1/n, where notation n denotes an integer, into a contracted reference vector CV as described earlier.

In the following description, in order to make the explanation easy to understand, the horizontal-direction contraction factor is assumed to be equal to the vertical-direction contraction factor. However, the horizontal-direction contraction factor and the vertical-direction contraction factor can also be set independently of each other at values different from each other. In addition, as will be described later, the horizontal-direction contraction factor and the vertical-direction contraction factor are rather set independently of each other at any arbitrary fractions (such as 1/m and 1/n, where notations m and n each denote an integer) in order to provide a higher degree of flexibility as well as a higher degree of convenience.

Also in the case of this embodiment, much like the image-processing method in the related art, the position of the target-block projected image block corresponding to the target block is taken as the origin position (0, 0) at the center of the search range. The horizontal-direction and vertical-direction components (vx, vy) of a reference vector RV are each an integer representing horizontal-direction and vertical-direction magnitudes measured from the origin position (0, 0). In the following description, a reference vector RV having horizontal-direction and vertical-direction components (vx, vy) is referred to as a reference vector RV (vx, vy).

A reference vector RV (vx, vy) is contracted at a contraction factor of 1/n into a contracted reference vector CV (vx/n, vy/n). Thus, even though the horizontal-direction and vertical-direction components (vx, vy) of the pre-contraction original reference vector RV (vx, vy) are each an integer, the horizontal-direction and vertical-direction components (vx/n, vy/n) of the contracted reference vector CV (vx/n, vy/n) are not necessarily integers. That is to say, they may each be a value including a fraction part in some cases. Thus, if a SAD value computed for a pre-contraction original reference vector RV is merely stored as an element included in the shrunk SAD table as an element associated with a contracted reference vector having integer vx/n and vy/n values closest to the non-integer vx/n and vy/n values of the contracted reference vector CV in this embodiment, an error will be generated. In addition, while the number of elements in the shrunk SAD table is smaller than the number of elements in the original SAD table, the number of contracted reference vectors CVs is equal to the number of pre-contraction original reference vectors RVs. Thus, contracted reference vectors CVs are not associated with elements in the shrunk SAD table on a 1-with-1 basis.

A neighborhood reference vector NV (vx/n, vy/n) of a contracted reference vector CV (vx/n, vy/n) is defined as a contracted reference vector having an integer vx/n value closest to the non-integer vx/n value of the contracted reference vector CV (vx/n, vy/n) and an integer vy/n value closest to the non-integer vy/n value of the contracted reference vector CV (vx/n, vy/n). A plurality of neighborhood reference vectors NV exist in the neighborhood of every contracted reference vector CV. Since contracted reference vectors CVs are not associated with elements in the shrunk correlation-value table on a 1-with-1 basis as described above, in this embodiment, a SAD value computed for the pre-contraction original reference vector RV of a contracted reference vector CV is not stored in an element of the shrunk correlation-value table as it is. Instead, the SAD value computed for the pre-contraction original reference vector of a contracted reference vector CV is split by adoption of a linear weighted distribution technique into as many component SAD values as neighborhood reference vectors NV located in the neighborhood of the contracted reference vector CV. Then, each of the component SAD values is stored cumulatively in the shrunk correlation-value table as a table element associated with one of the neighborhood reference vectors NV.

As described above, a contracted reference vector CV (vx/n, vy/n) having non-integer vx/n and vy/n values is not associated with a table element of the shrunk correlation-value table. However, neighborhood reference vectors NV (vx/n, vy/n) each having integer vx/n and vy/n values are associated with table elements of the shrunk correlation-value table on a 1-with-1 basis. Thus, in this embodiment, a component SAD value computed by adoption of the linear weighted distribution technique for a neighborhood reference vector NV is stored in the table element associated with the neighborhood reference vector NV cumulatively. To be more specific, the SAD value is stored in the table element by cumulatively adding the value to an already stored SAD value computed for another pre-contraction original reference vector. The linear weighted distribution technique is a method based on the distances between a position pointed to by a contracted reference vector CV and positions pointed to by neighborhood reference vectors NV located in the neighborhood of the contracted reference vector CV.

Each of the table elements included in the shrunk correlation-value table as elements each associated with a contracted reference vector CV is also associated with another contracted reference vector CV. Thus, each of the table elements is associated with a plurality of contracted reference vectors CV and used for storing the sum of component SAD values obtained by splitting SAD values found for reference vectors RV, which are contracted into the contracted reference vectors CV respectively. The sum of component SAD values is stored in a table element by cumulatively adding the component SAD values.

It is to be noted that, if the values (vx/n, vy/n) of a contracted reference vector CV (vx/n, vy/n) are each an integer, the contracted reference vector CV (vx/n, vy/n) itself is associated with an element of the shrunk correlation-value table on a 1-with-1 basis. Thus, in the table element associated with the contracted reference vector CV (vx/n, vy/n), the SAD value corresponding to the reference vector RV (vx, vy) itself can be stored. In addition, in the case of such a contracted reference vector CV (vx/n, vy/n), it is not necessary to determine a plurality of neighborhood reference vectors NV for the contracted reference vector CV (vx/n, vy/n).

Next, the processing described above is explained by giving an example as follows. As described before, the target-block projected image block corresponding to the target block is placed at the origin position (0, 0). In this case, let us assume that a reference vector RV (−3, −5) shown in FIG. 12A is contracted in both the horizontal and vertical directions at a contraction factor of 1/n (=¼) to result in a contracted reference vector CV (−0.75, −1.25) shown in FIG. 12B.

The values of the resulting contracted reference vector CV each include a fraction part, indicating that it is necessary to determine a plurality of neighborhood reference vectors NV for the contracted reference vector CV as described above. This is because elements of the shrunk correlation-value table are associated with contracted reference vectors CV (vx/n, vy/n), where values vx/n and vy/n each include a fraction part, not on a 1-with-1 basis, but associated with neighborhood reference vectors NV on a 1-with-1 basis instead.

In an example shown in FIG. 13, four neighborhood reference vectors NV1 (−1, −1), NV2 (−1, −2), NV3 (0, −1) and NV4 (0, −2) are determined for the above contracted reference vector CV (−0.75, −1.25). As is obvious from the example shown in FIG. 13, a plurality of such neighborhood reference vectors are selected that the values of each of the neighborhood reference vectors are integers closest to the values of the contracted reference vector.

Then, in the case of this embodiment, component correlation values for the four neighborhood reference vectors NV1, NV2, NV3 and NV4 are computed by application of the linear weighted distribution technique cited above to a correlation value found for the reference vector RV serving as the origin of the contracted reference vector CV. Then, the component correlation value for the neighborhood reference vector NV1 is stored cumulatively in a table element included in the shrunk correlation-value table as an element associated with the neighborhood reference vector NV1. By the same token, the component correlation values for the neighborhood reference vectors NV2, NV3 and NV4 are stored cumulatively in table elements included in the shrunk correlation-value table as elements associated with the neighborhood reference vectors NV2, NV3 and NV4 respectively.

In the example shown in FIG. 13, the four neighborhood reference vectors NV1, NV2, NV3 and NV4 are vectors pointing from the origin point (0, 0) to positions P1, P2, P3 and P4 respectively, which are each shown as a circle. On the other hand, the contracted reference vector CV is a vector pointing from the origin point (0, 0) to a point P0 shown as notation X.

Weights to be used in a process to find component correlation values for neighborhood reference vectors NV by adoption of the linear weighted distribution technique cited above are determined on the basis of the distances between a position pointed to by a contracted reference vector CV and positions pointed to by neighborhood reference vectors NV located in the neighborhood of the contracted reference vector CV. In the case of the example shown in FIG. 13, weights to be used in a process to find the component correlation values for the four neighborhood reference vectors NV1, NV2, NV3 and NV4 are determined as follows. As described above, the contracted reference vector CV points to the point P0 (−0.75, −1.25) whereas the neighborhood reference vectors NV1, NV2, NV3 and NV4 point to the positions P1 (−1, −1), P2 (−1, −2), P3 (0, −1) and P4 (0, −2) respectively. Thus, (the distance between the positions P0 and P1): (the distance between the positions P0 and P2): (the distance between the positions P0 and P3): (the distance between the positions P0 and P4)=1:3:3:9. Since weights are proportional to distances, typical weights of $9/16$, $3/16$, $3/16$ and $1/16$ are assigned to the four neighborhood reference vectors NV1, NV2, NV3 and NV4 respectively.

Let us assume that the correlation value computed for the pre-contraction original reference vector RV serving as the origin of the contracted reference vector CV is Sα. In this case, component correlation values SADp1, SADp2, SADp3, SADp4 for the four neighborhood reference vectors NV1, NV2, NV3 and NV4 pointing to the positions P1, P3, P3 and P4 respectively are found as follows:

$$SADp1 = S\alpha \times 9/16$$

$$SADp2 = S\alpha \times 3/16$$

$$SADp3 = S\alpha \times 3/16$$

$$SADp4 = S\alpha \times 1/16$$

Final component correlation values of the component correlation values SADp1, SADp2, SADp3 and SADp4 for the four neighborhood reference vectors NV1, NV2, NV3 and NV4 are computed by cumulatively adding currently calculated values to their respective temporary sums and stored in table elements included in the shrunk correlation-value table as elements provided for the four neighborhood reference vectors NV1, NV2, NV3 and NV4 pointing to the positions P0, P1, P2, P3 and P4 respectively.

In this embodiment, the process to contract a reference vector into a contracted reference vector, the process to determine neighborhood reference vectors of the contracted reference vector and the process to compute a component SAD for each of elements included the shrunk correlation-value table as elements associated with the neighborhood reference vectors are carried out for all reference vectors each pointing to a reference block set in the search range.

As described above in this embodiment, the process to contract each reference vector RV into a contracted reference vector CV is carried out at a contraction factor of 1/n to accompany a process of contracting the correlation-value table TBLo. The correlation-value table TBLo has the original size and includes elements associated with reference vectors RVs on a 1-with-1 basis, at the same contraction factor of 1/n in both the horizontal and vertical directions in order to generate a shrunk correlation-value table TBLs with a shrunk size. Then, a component SAD value is computed for each element of the shrunk correlation-value table TBLs by splitting a SAD value computed for a reference block pointed to by a reference vector RV serving as the origin of a contracted reference vector CV associated with the element. For more information, the reader is suggested to refer to FIG. 11.

Thus, in the case of this embodiment, the number of elements composing the shrunk correlation-value table TBLs is $(1/n^2)$ times the number of elements composing the original correlation-value table TBLo. That is to say, the size of the correlation-value table can be reduced substantially.

In accordance with the above description of the embodiment, for each element of the shrunk correlation-value table TBLs, four neighborhood reference vectors NV in the neighborhood of a contracted reference vector CV are selected and, then, component correlation values for the selected neighborhood reference vectors NV are found from a correlation value computed for a processed reference block pointed to by a reference vector RV serving as the origin of the contracted reference vector CV. A component correlation value for a neighborhood reference vector NV located in the neighborhood of a contracted reference vector CV is found in a process based on the so-called linear weighted distribution technique to split a correlation value computed for the a reference block pointed to by the reference vector RV serving as the origin of the contracted reference vector CV. It is to be noted, however, that the method of selecting neighborhood reference vectors NV in the neighborhood of a contracted reference vector CV and the linear weighted distribution technique of finding a component correlation value for every element of the shrunk correlation-value table TBLs are by no means limited to those adopted by the embodiment.

For example, as an alternative, for each element of the shrunk correlation-value table TBLs, nine or sixteen neighborhood reference vectors NV in the neighborhood of a contracted reference vector CV are selected, then, component correlation values for the selected neighborhood reference vectors NV are found from a correlation value computed for a processed reference block pointed to by a reference vector RV serving as the origin of the contracted reference vector CV. In this case, however, a component correlation value for a neighborhood reference vector NV located in the neighborhood of a contracted reference vector CV is found in a process based on the so-called cubic interpolation technique to split a correlation value computed for the a reference block pointed to by the reference vector RV serving as the origin of the contracted reference vector CV. By carrying out these processes, the precision of the component correlation value is improved. If a stronger emphasis is to be laid upon a real-time requirement and reduction of the processing-circuit count, however, the process of finding component correlation values of four neighborhood reference vectors NV is more effective.

Also in the case of this embodiment, a component correlation value is stored as an element of the shrunk correlation-value table, which is a shrunk SAD table, in a cumulative addition process carried out in the same way as the block-matching technique in the related art whereby a correlation value is stored as an element of the original correlation-value table for each of locations included in the search range as locations to which the reference block is to be moved.

However, in the case of the block-matching technique in the related art, reference vectors are associated with the addresses of the elements composing the correlation-value table on a 1-with-1 basis so that a correlation value is computed for each reference block corresponding to a reference vector and merely stored in the correlation-value table as an element associated with the reference vector. In the case of the technique according to this embodiment, on the other hand, reference vectors are associated with the addresses of the elements composing the shrunk correlation-value table (or the shrunk SAD table) not on a 1-with-1 basis. Thus, a correlation value computed for a reference block is spilt into a plurality of component reference values, which are each then cumulatively stored in the shrunk correlation-value table as an element corresponding to one of neighborhood reference vectors associated with the component reference values. Much like every element of the correlation-value table, the memory locations each used for storing a computed component reference value are each also initialized to 0 at an initial time.

As described before, a correlation value stored in the correlation-value table according to the block-matching technique in the related art as an element of the correlation-value table is a SAD value. Then, in the case of the block-matching technique in the related art, the correlation-value table is searched for a table element used for storing a minimum SAD value indicating a strongest correlation between the target block on the target frame and a reference block on the reference frame. Then, a reference vector pointing to address of the table element used for storing the minimum SAD value is taken as a movement vector representing a movement from the position of the target frame to the position of the reference frame.

In the case of the embodiment, on the other hand, a correlation value stored in the shrunk correlation-value table according to the embodiment as an element of the shrunk correlation-value table is a component correlation value, which is also a SAD value. Then, the shrunk correlation-value table is searched for a table element used for storing a minimum SAD value indicating a strongest correlation between the target block on the target frame and a plurality of reference blocks included in the reference frame as blocks pointed to by their respective neighborhood reference vectors. A movement vector from respective neighborhood reference vectors has to be identified because a neighborhood reference vector itself may not be identified as a movement vector as it is due to the fact that each of the neighborhood reference vectors may not necessarily be an accurate movement vector.

As a most reasonable technique to identify a movement vector from neighborhood reference vectors each associated with a table element of the shrunk correlation-value table, the shrunk correlation-value table is restored to the original correlation-value table by multiplying the size of the shrunk correlation-value table by an integer n (which is the reciprocal of the contraction factor of 1/n). Then, an element included in the original correlation-value table as an element corresponding to the detected element of the shrunk correlation-value table is identified. Finally, a movement vector pointing to the selected element of the original correlation-value table is determined. However, this technique can be adopted for an image processing apparatus tolerating errors to a certain degree.

In order to detect a movement vector with a higher degree of accuracy, however, it is necessary to carry out one of typical interpolation processes described below on element values stored in the shrunk correlation-value table. By carrying out one of the typical interpolation processes, an accurate movement vector can be detected with the original degree of precision.

<First Typical Interpolation Process to Detect a Movement Vector with a Higher Degree of Accuracy>

A first typical interpolation process to detect a movement vector with a higher degree of accuracy adopts a technique whereby a plurality of correlation values stored in elements of the shrunk correlation-value table are approximately represented by a quadratic surface. This technique is a technique obtained by applying the method described in Patent Document 1 cited before to a shrunk correlation-value table.

In this embodiment, since a SAD value is used as a correlation value, the smaller the correlation value, the stronger the correlation indicated by the correlation value. Thus, in this embodiment, the shrunk correlation-value table is searched for a specific table element used for storing a minimum correlation value indicating a strongest correlation between the target block on the target frame and a plurality of reference blocks included in the reference frame as blocks pointed to by their respective neighborhood reference vectors. A table element of the shrunk correlation-value table can be searched for at table-address precision, which is the precision of the integer level. In addition, a plurality of neighborhood table elements in a table area centered at the specific table element already detected at the precision of the integer level as an area in the shrunk correlation-value table are also each identified also at the precision of the integer level. Then, by adoption of the method of least squares, a quadratic surface is found as a surface representing the correlation values stored in the shrunk correlation-value table as the specific table element and the neighborhood table elements detected in the table area. Subsequently, the minimum value of the quadratic surface representing the correlation values is determined and the position of the correlation value determined as the minimum value is identified as a position shifted from the origin position (0, 0). The identified position of a correlation value determined as the minimum value corresponds to a location included in the search area on the reference frame as the location of a reference block exhibiting the strongest correlation with the target block. The identified position is a position included in the shrunk correlation-value table (or the shrunk SAD table) as a position at an address having precision of the fraction level. Finally, a contracted reference vector pointing to the identified position is detected as a vector pointing to the position identified at the precision of the fraction level.

Figure 14A:
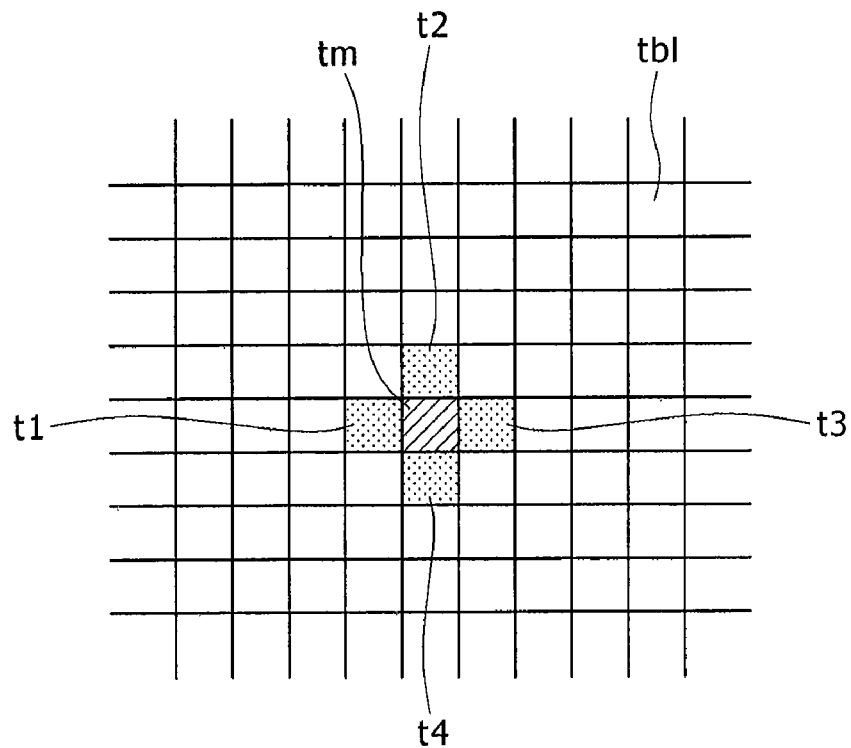
FIGS. 14A and 14B are each an explanatory diagram to be referred to in description of a typical process to detect an accurate movement vector by adoption of an image processing method according to an embodiment.
Figure 14B:
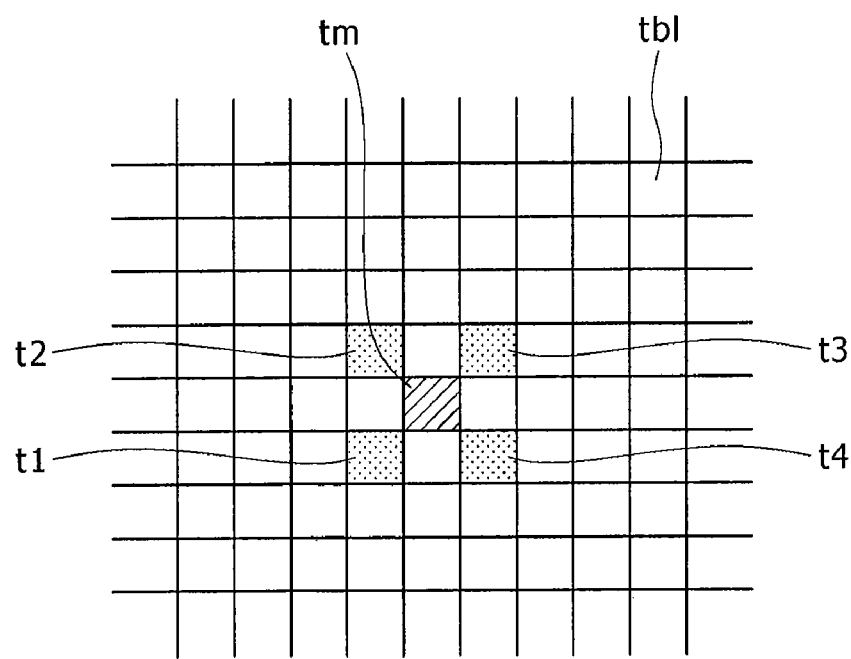

An example of the process to set a quadratic surface is shown in FIG. 14A or 14B. In either of the examples, notation tm denotes the specific table element in the shrunk correlation-value table as an element, which is identified at the precision of the integer level as a table element representing the minimum correlation value. On the other hand, notations t1, t2, t3 and t4 each denote a table element also identified at the precision of the integer level in the table area centered at the specific table element tm. At least four table elements sandwiching the specific table element tm in two directions are demanded.

Figure 15:
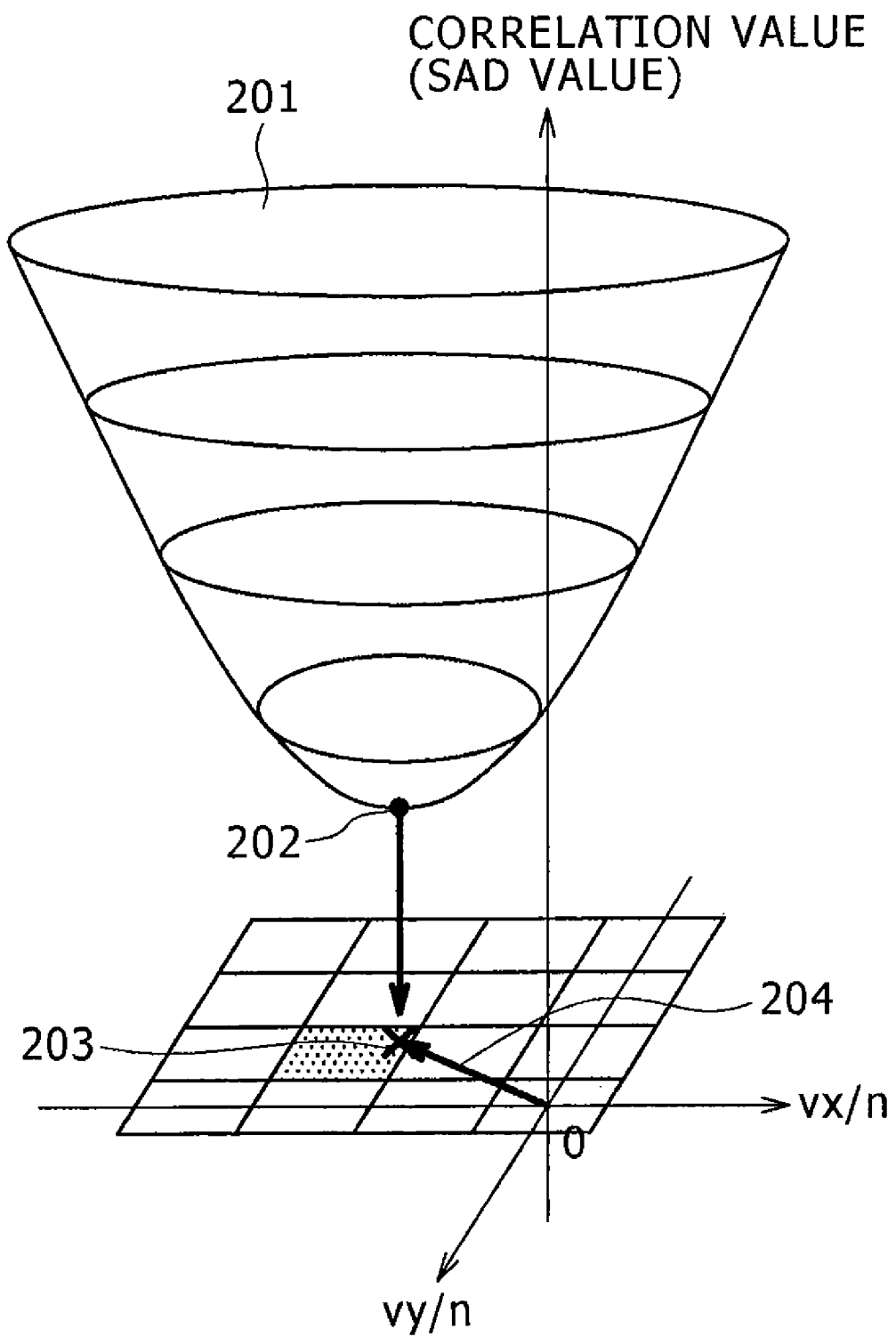
FIG. 15 is an explanatory diagram to be referred to in description of a typical process to detect an accurate movement vector by adoption of an image processing method according to an embodiment.

Then, as shown in FIG. 15, a coordinate space is assumed in the range of contracted reference vectors (or the range of the shrunk correlation-value table). The range of contracted reference vectors corresponds to the search range of the reference frame. The position of the target frame (or, strictly speaking, the position of the target-block projected image block 104 shown in FIG. 8) is taken as the origin position (0, 0, 0) of the coordinate space, which has the following 3 axes. The vertical Z axis (or the correlation-value axis) is taken as an axis representing the correlation value, which decreases in inverse proportion to the correlation between the reference and target blocks. In this embodiment, the correlation value is a SAD value. The horizontal X axis (or a vx/n axis) is taken as an axis representing the shift of the reference block from the target block in the X direction or an axis representing the value vx/n of the contracted reference vector. By the same token, the horizontal Y axis (or a vy/n axis) is taken as an axis representing the shift of the reference block from the target block in the Y direction perpendicular to the X direction or an axis representing the value vy/n of the contracted reference vector. The vertical Z axis is perpendicular to a plane on which the horizontal X an Y axes are laid.

Then, from the correlation value of the minimum-value table element tm identified at the precision of the integer level as well as the correlation values of the two table elements t1 and t3 identified also at the precision of the integer level as table elements sandwiching the minimum-value table element tm in a specific direction, a quadratic curve is created in the coordinate space shown in FIG. 15. By the same token, from the correlation value of the minimum-value table element tm as well as the correlation values of the two table elements t2 and t4 identified also at the precision of the integer level as table elements sandwiching the minimum-value table element tm in another direction perpendicular to the specific direction, another quadratic curve is created in the coordinate space. Then, an approximation quadratic surface 201 including these 2 quadratic curves is found in the coordinate space shown in FIG. 15 by adopting the method of least squares.

Figure 16:
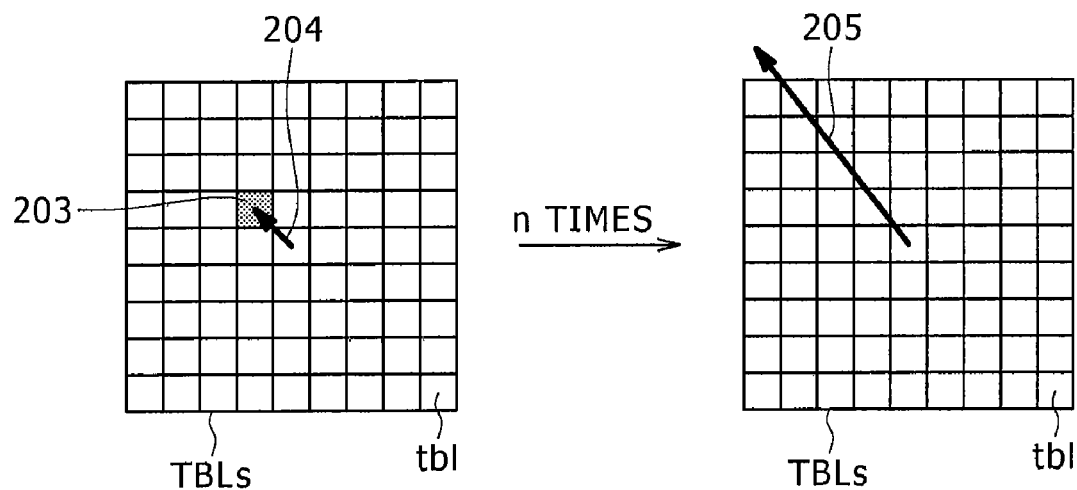
FIG. 16 is an explanatory diagram to be referred to in describing an outline of a process to detect a movement vector in accordance with an embodiment.

Subsequently, a minimum-value point 202 of the approximation quadratic surface 201 is detected at a position 203 existing on the X-Y plane as a position with coordinates of (vx/n, vy/n) as shown in FIG. 15. The position (vx/n, vy/n) is a position identified at the precision of the fraction level as the position of a table element (or a table-element address) with the smallest correlation value in the shrunk correlation-value table. Finally, a minimum-value vector 204 pointing to the position (vx/n, vy/n) identified at the precision of the fraction level is determined, and the movement vector 205 with the original magnitude and the original direction is computed by multiplying the minimum-value vector 204 by the reciprocal value n of the contraction factor as shown in FIG. 16.

Figure 17:
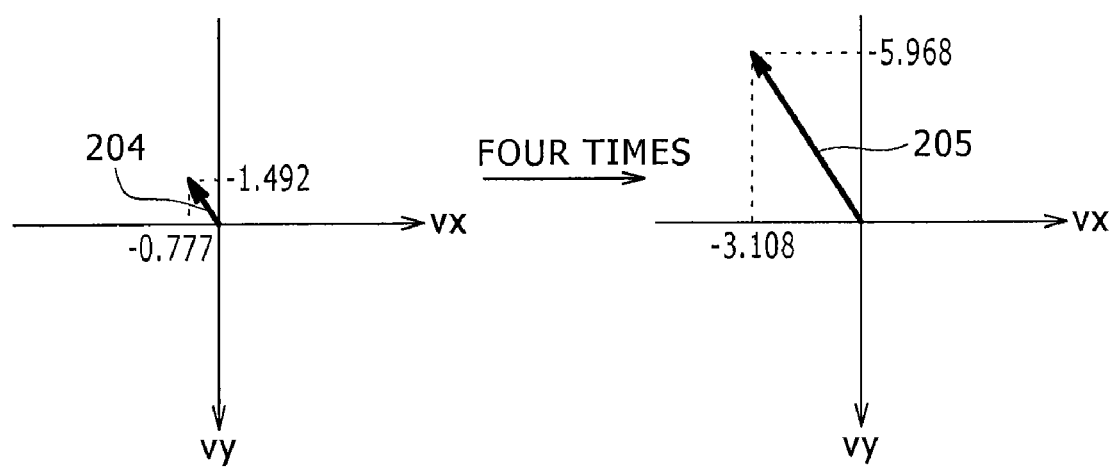
FIG. 17 is an explanatory diagram to be referred to in describing an outline of a process to detect a movement vector in accordance with an embodiment.

For example, a shrunk correlation-value table TBLs shown in FIG. 17 is obtained by shrinking the original correlation-value table to accompany a process of contracting reference vectors at a contraction factor of ¼, and a movement vector (−0.777, −1.492) denoted by reference numeral 204 is found from the address of the minimum-value table element identified at the precision of the fraction level. In this case, the minimum-value vector 204 is multiplied by four to obtain the original movement vector (−3.108, −5.968) denoted by reference numeral 205. The movement vector 205 is a movement vector at the scale of the original image.

The shrunk correlation-value table is searched for a specific table element tm used for storing a minimum correlation value indicating a strongest correlation and four neighborhood table elements in a table area centered at the specific table element tm. In order to set an approximation quadratic surface of correlation values, however, it is better to find a larger number of neighborhood table elements in such a table area. For this reason, in general, neighborhood table elements in a rectangular table area centered at the specific table element tm detected at the precision of the integer level as an area including m×m table elements (where notation m denotes an integer at least equal to 3) in the horizontal and vertical directions are found.

However, a larger number of neighborhood table elements is not necessarily better. This is because neighborhood table elements in such a large table area leads to an increased amount of processing. In addition, if the number of neighborhood table elements is increased, it will be more likely within the bounds of possibility that a false local minimum value dependent on the image pattern is inevitably detected. Thus, table elements in a rectangular table area including a proper number of neighborhood table elements are selected.

The following description explains 2 examples of the rectangular table area included in the shrunk correlation-value table as an area containing a proper number of neighborhood table elements. One of the examples according to this embodiment is a rectangular table area centered at the minimum-value table element tm found at the precision of the integer level as an area containing 3×3 neighborhood table elements surrounding the minimum-value table element tm in the horizontal and vertical directions. The other example according to this embodiment is a rectangular table area centered at the minimum-value table element tm found at the precision of the integer level as an area containing 4×4 neighborhood table elements surrounding the minimum-value table element tm in the horizontal and vertical directions.

Rectangular Table Area Including 3×3 Table Elements

Figure 18B:
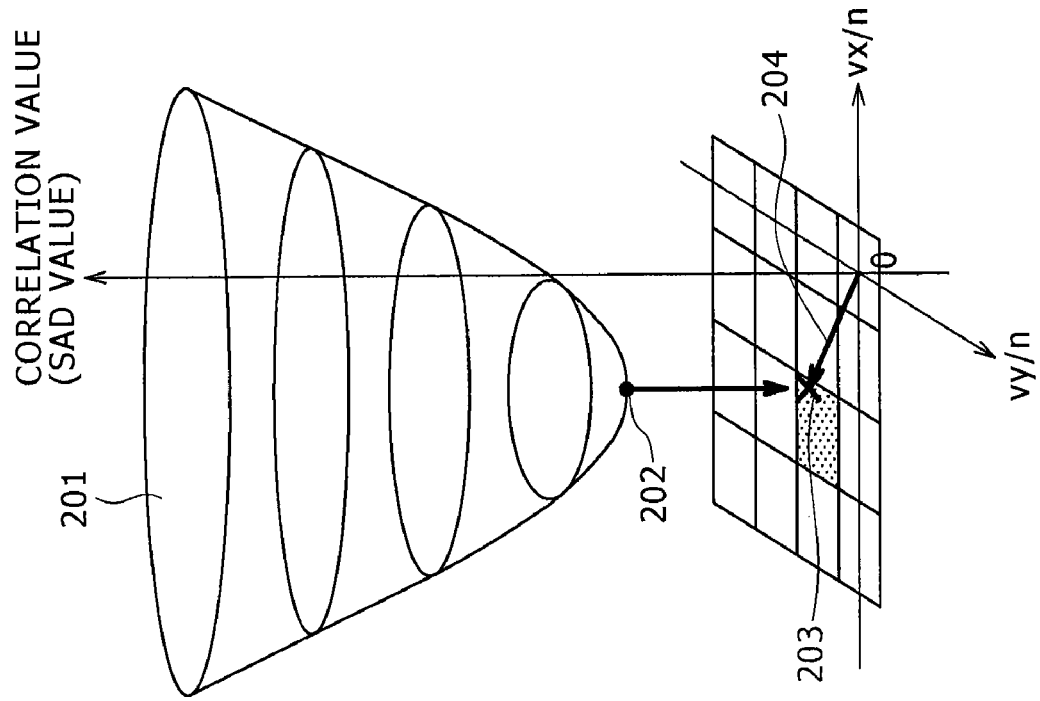
FIGS. 18A and 18B are each an explanatory diagram to be referred to in description of a typical process to detect an accurate movement vector in accordance with a first typical implementation of the movement-vector detection method according to the embodiment.
Figure 18A:
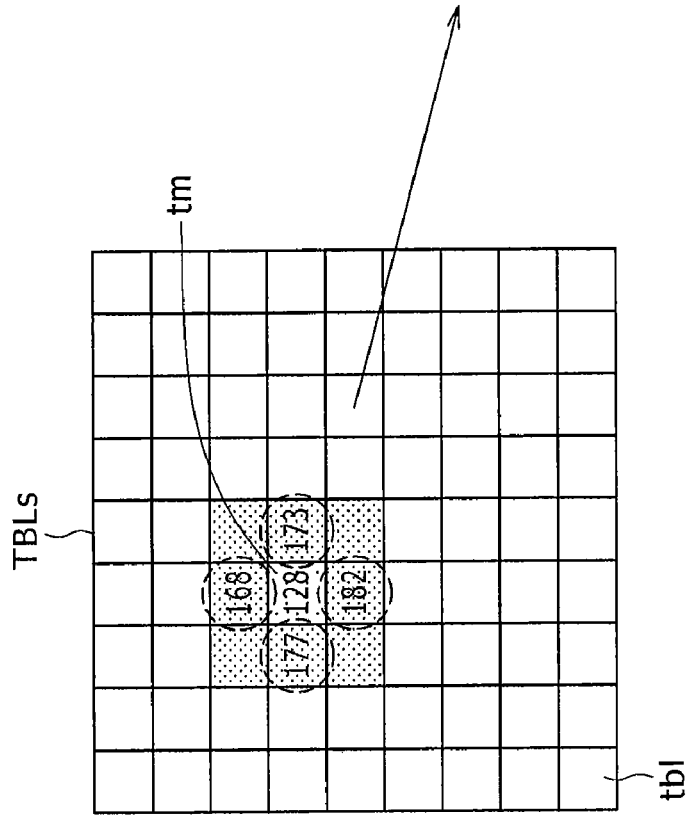

FIG. 18 is a diagram showing a technique to find a movement vector by making use of a rectangular table area centered at the minimum-value table element tm found at the precision of the integer level as an area including 3×3 neighborhood table elements surrounding the minimum-value table element tm in the horizontal and vertical directions. In FIG. 18A, the table area is shown as a dotted block.

In accordance with the technique shown in FIG. 18, an approximation quadratic surface 201 shown in FIG. 18B is set by adopting the method of least squares on the basis of correlation values of the minimum-value table element tm found at the precision of the integer level and eight neighborhood table elements surrounding the minimum-value table element tm as shown in FIG. 18A. Subsequently, a minimum-value point 202 of the approximation quadratic surface 201 is detected at a position 203 existing on the X-Y plane as a position with coordinates of (vx/n, vy/n) as shown in FIG. 18B. The position (vx/n, vy/n) is a position identified at the precision of the fraction level as the position corresponding to a table element (or a table-element address) with the smallest correlation value in the shrunk correlation-value table.

Finally, a minimum-value vector 204 pointing to the position 203 identified at the precision of the fraction level as a position of the table element is determined, and the movement vector 205 (or the minimum-value vector) with the original magnitude and the original direction is computed by multiplying the minimum-value vector 204 by the reciprocal value n of the contraction factor as shown in FIG. 16.

Figures 19, 20:
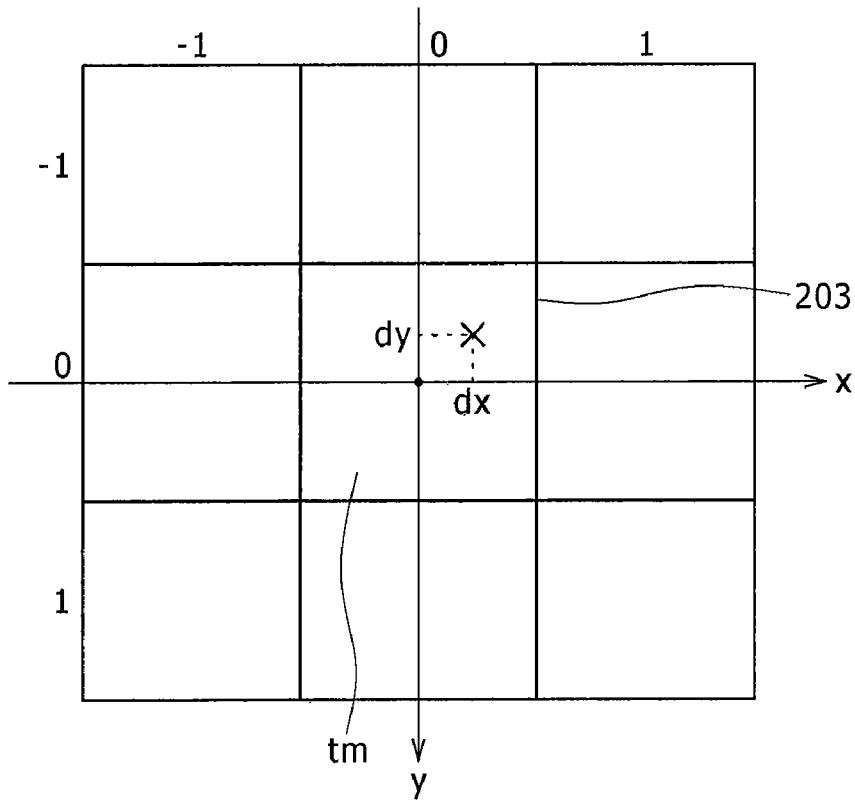
FIG. 19 is an explanatory diagram to be referred to in description of a process to detect an accurate movement vector in accordance with the first typical implementation of the movement-vector detection method according to the embodiment.
FIG. 20 is an explanatory diagram to be referred to in description of a process to detect an accurate movement vector in accordance with the first typical implementation of the movement-vector detection method according to the embodiment.

A process to find the position 203 corresponding to the minimum-value point 202 on the approximation quadratic surface 201 is carried out by adoption of a method described as follows. As shown in FIG. 19, a coordinate (x, y) system is devised as a system in which the position of the center of the minimum-value table element tm found at the precision of the integer level is taken as the origin point (0, 0). In this case, eight neighborhood table elements surrounding the minimum-value table element tm found at the precision of the integer level are located at positions with x-axis coordinates represented by x=−1, x=0 and x=1 in the horizontal direction and y-axis coordinates represented by y=−1, y=0 and y=1 in the vertical direction except the position at a coordinate of (x=0 and y=0). That is to say, the eight neighborhood table elements surrounding the minimum-value table element tm found at the precision of the integer level are located at coordinates of (−1, −1), (0, −1), (1, −1), (−1, 0), (0, 1), (−1, 1), (0, 1) and (1, 1).

Let us have notation Sxy denote the correlation value of a table element in the coordinate system shown in FIG. 19. For example, the correlation value of the minimum-value table element tm found at the origin position (0, 0) at the precision of the integer level is denoted by symbol $S_{00}$ whereas the correlation value of the neighborhood table element at the position (1, 1) on the right side of the minimum-value table element tm and below the minimum-value table element tm is denoted by symbol $S_{11}$.

Thus, the coordinates (dx, dy) of the position 203 observed in the (x, y) coordinate system at the precision of the fraction level with the minimum-value table element tm found at the origin position (0, 0) of the (x, y) coordinate system at the precision of the integer level can be found in accordance with Eqs. (A) and (B) shown in FIG. 20.

In Eqs. (A) and (B) shown in FIG. 20, the values of Kx and Ky are given as follows:

For x=−1, Kx=−1;

for x=0, Kx=0;

for x=1, Kx=1;

for y=−1, Ky=−1;

for y=0, Ky=0; and for y=1, Ky=1.

The coordinates of (dx, dy) are the coordinates of a position observed in the (x, y) coordinate system at the precision of the fraction level with the minimum-value table element tm found at the origin position (0, 0) of the (x, y) coordinate system at the precision of the integer level. From the position (dx, dy) observed in the (x, y) coordinate system at the precision of the fraction level and the position of the minimum-value table element tm found at the origin position (0, 0) of the (x, y) coordinate system at the precision of the integer level, the position 203 can be detected as a position separated away from the center of the identified minimum-value table element tm.

Rectangular Table Area Including 4×4 Table Elements

FIG. 21 is a diagram showing a technique to find a movement vector by making use of a rectangular table area centered at the minimum-value table element tm found at the precision of the integer level as an area including 4×4 neighborhood table elements surrounding the minimum-value table element tm in the horizontal and vertical directions. In FIG. 21A, the table area is shown as a dotted block.

In the case of an m×m table area (including m×m neighborhood table elements where m is an odd integer) such as a table area including nine (=3×3) neighborhood table elements described above and a table area including twenty-five (=5×5) neighborhood table elements, the minimum-value table element tm found at the precision of the integer level is typically located as the center table element of the neighborhood table elements. Thus, the rectangular table area used for determining a movement vector can be set with ease.

In the case of an m×m table area (including m×m neighborhood table elements where m is an even integer) such as a table area including 4×4 table elements composing the minimum-value table element tm found at the precision of the integer level and the fifteen neighborhood table elements, on the other hand, the minimum-value table element tm is located not as the center table element of the neighborhood table elements. Thus, the rectangular table area used for determining a movement vector may not be set with ease so that some devised endeavors described below have to be made.

In this case, the correlation values (which are each a final component SAD value in this embodiment) of neighborhood table elements including the minimum-value table element tm found at the precision of the integer level on the same row of the shrunk correlation-value table as the minimum-value table element tm are compared with each other. As a result of the comparison, such a rectangular table area is set that the minimum-value table element tm serves as the second table element of the row while the table element having the smallest correlation value among four adjacent neighborhood table elements including the minimum-value table element tm serves as the fourth neighborhood table element of the row. By the same token, the correlation values of neighborhood table elements including the minimum-value table element tm found at the precision of the integer level on the same column of the shrunk correlation-value table as the minimum-value table element tm are compared with each other. As a result of the comparison, such a rectangular table area is set that the minimum-value table element tm serves as the second table element of the column while and the table element having the smallest correlation value among four adjacent neighborhood table elements including the minimum-value table element tm serves as the fourth neighborhood table element of the column.

In the example shown in FIG. 21, the minimum-value table element tm found at the precision of the integer level is sandwiched by two adjacent neighborhood table elements having correlation values of 177 and 173 respectively on the same row. In this case, the minimum-value table element tm is taken as the second table element of the row while a neighborhood table element on the right side of the neighborhood table element having the smaller correlation value of 173 is taken as the fourth neighborhood table element of the row. By the same token, the minimum-value table element tm found at the precision of the integer level is sandwiched by the two adjacent neighborhood table elements having SAD values of 168 and 182 respectively on the same column. In this case, the minimum-value table element tm is taken as the second table element of the column while a neighborhood table element above the neighborhood table element having the smaller correlation value of 168 is taken as the fourth neighborhood table element of the column.

Then, in the example shown in FIG. 21, an approximation quadratic surface 201 shown in FIG. 21B is set by adopting the method of least squares on the basis of correlation values of the minimum-value table element tm found at the precision of the integer level and fifteen neighborhood table elements surrounding the minimum-value table element tm as shown in FIG. 21A. Subsequently, a minimum-value point 202 of the approximation quadratic surface 201 is detected at a position 203 existing on the X-Y plane as a position with coordinates of (vx/n, vy/n) as shown in FIG. 21B. The position (vx/n, vy/n) is a position identified at the precision of the fraction level as the position corresponding to a table element (or a table-element address) with the smallest correlation value in the shrunk correlation-value table.

Finally, a minimum-value vector 204 pointing to the position 203 identified at the precision of the fraction level as a position of the table element is determined, and the movement vector 205 (or the minimum-value vector) with the original magnitude and the original direction is computed by multiplying the minimum-value vector 204 by the reciprocal value n of the contraction factor as shown in FIG. 16.

A process to find the position 203 corresponding to the minimum-value point 202 on the approximation quadratic surface 201 is carried out by adoption of a method described as follows. As shown in FIG. 22, a coordinate (x, y) system is devised as a system in which the position of the center of the minimum-value table element tm found at the precision of the integer level is taken as the origin point (0, 0).

In the case of the example shown in FIG. 22, as shown in FIGS. 22A, 22B, 22C and 22D, there are four rectangular table areas including the sixteen table elements laid out in different ways resulting in different positions of the minimum-value table element tm found at the precision of the integer level. The position of the minimum-value table element tm found at the precision of the integer level in the rectangular table area depends on whether the aforementioned fourth table element of the row including the minimum-value table element tm is a neighborhood table element on the right side or the left side of the minimum-value table element tm. The position of the minimum-value table element tm found at the precision of the integer level also depends on whether the aforementioned fourth table element of the column including the minimum-value table element tm is a neighborhood table element above or below the minimum-value table element tm.

In this case, from FIGS. 22A, 22B, 22C and 22D, while the position the minimum-value table element tm is fixed at the position (0, 0) in the coordinate system, the positions of the fifteen neighborhood table elements located in the neighborhood of the minimum-value table element tm have x-axis coordinates represented by x=−2 or x=−1, x=0, and x=1 or x=2 in the horizontal direction, and y-axis coordinates represented by y=−2 or y=−1, y=0 and y=1 or y=2 in the vertical direction.

Let us have notation Sxy denote the correlation value of a table element in the coordinate system shown in FIG. 22. For example, the correlation value of the minimum-value table element tm found at the origin position (0, 0) at the precision of the integer level is denoted by symbol $S_{00}$ whereas the correlation value of the table element at the position (1, 1) on the right side of the minimum-value table element tm and below the minimum-value table element tm is denoted by symbol S11.

Thus, the coordinates (dx, dy) of the position 203 observed in the (x, y) coordinate system at the precision of the fraction level with the minimum-value table element tm found at the origin position (0, 0) of the (x, y) coordinate system at the precision of the integer level can be found in accordance with Eqs. (C) and (D) shown in FIG. 23. The origin position (0, 0) of the (x, y) coordinate system coincides with the center of a rectangular area covering sixteen table elements including the minimum-value table element tm found at the origin position (0, 0) of the (x, y) coordinate system at the precision of the integer level.

In Eqs. (C) and (D) shown in FIG. 23, the values of Kx and Ky are the values, which includes the minimum-value table element tm found at the precision of the integer level and the sixteen neighborhood table elements located in the neighborhood of the minimum-value table element tm, in such a way that the center of the rectangular area coincides with the origin point (0, 0) of the (Kx, Ky) coordinate system. The values of Kx and Ky are values dependent on four different layouts shown in FIGS. 22A, 22B, 22C and 22D respectively as layouts of the table elements.

Figure 22B:
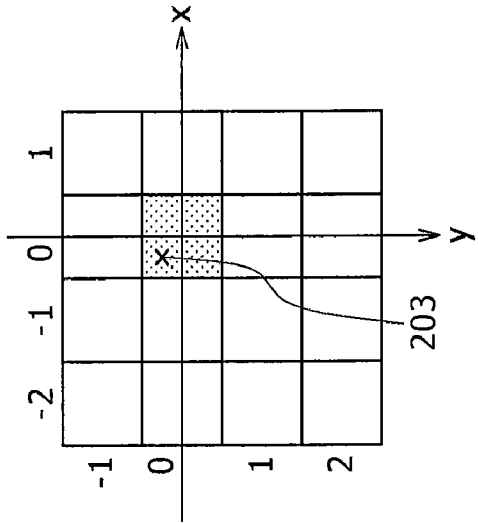
FIGS. 22A, 22B, 22C and 22D are each an explanatory diagram to be referred to in description of a process to detect an accurate movement vector in accordance with the first typical implementation of the movement-vector detection method according to the embodiment.
Figure 22D:
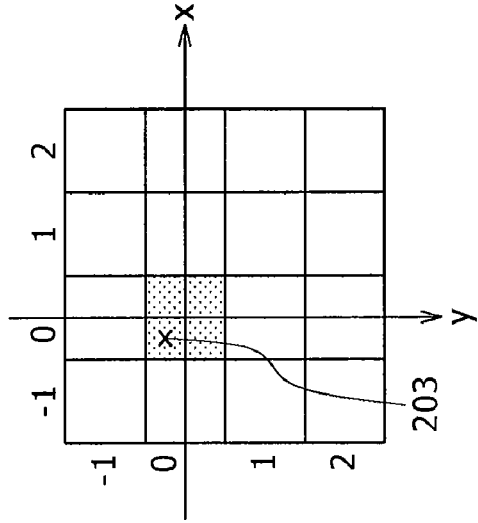
Figure 22A:
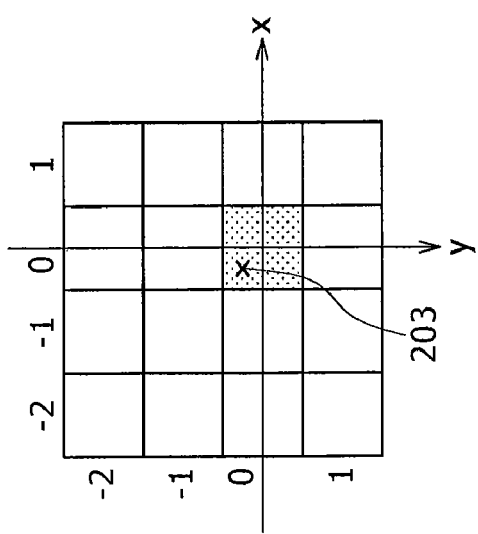
Figures 23, 24:
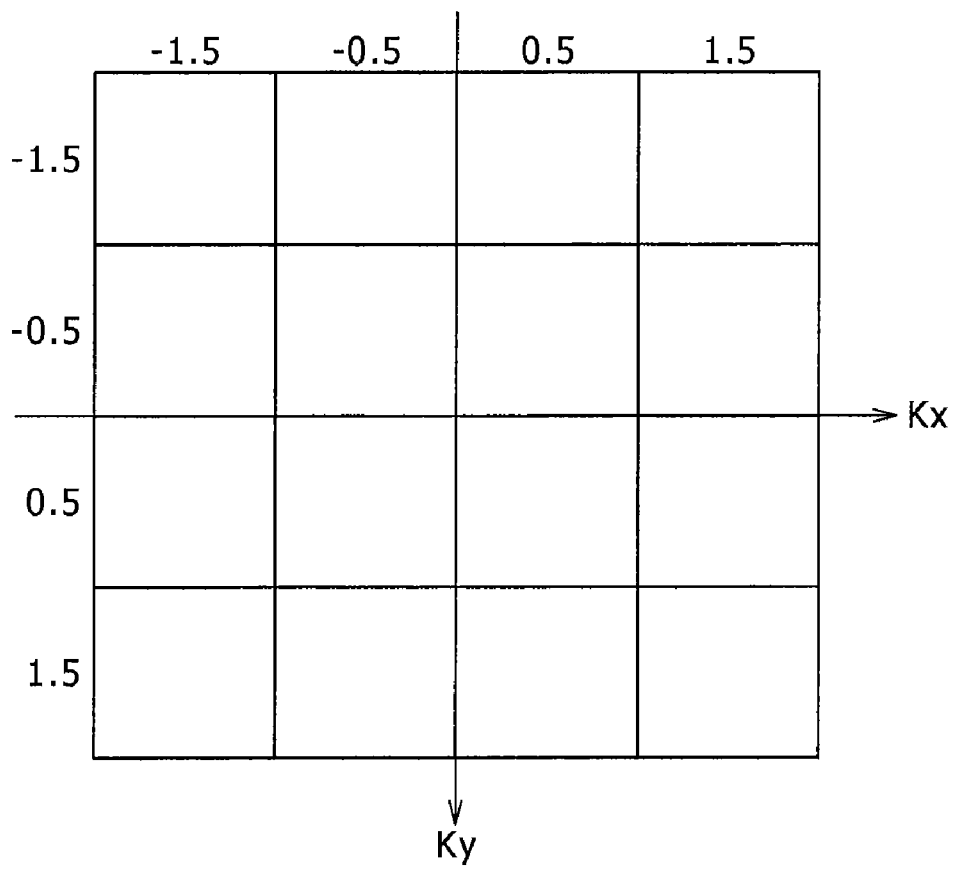
FIG. 23 is an explanatory diagram to be referred to in description of a process to detect an accurate movement vector in accordance with the first typical implementation of the movement-vector detection method according to the embodiment.
FIG. 24 is an explanatory diagram to be referred to in description of a process to detect an accurate movement vector in accordance with the first typical implementation of the movement-vector detection method according to the embodiment.

To put it in detail, in the case of the coordinate system shown in FIG. 22A, the coordinates Kx and Ky of the (Kx, Ky) coordinate system shown in FIG. 24 have the following values:
For x=−2, Kx=−1.5;
for x=−1, Kx=−0.5;
for x=0, Kx=0.5;
for x=1, Kx=1.5;
for y=−2, Ky=−1.5;
for y=−1, Ky=−0.5;
for y=0, Ky=0.5; and
for y=1, Ky=1.5.

In the case of the coordinate system shown in FIG. 22B, the coordinates Kx and Ky of the (Kx, Ky) coordinate system shown in FIG. 24 have the following values:
For x=−2, Kx=−1.5;
for x=−1, Kx=−0.5;
for x=0, Kx=0.5;
for x=1, Kx=1.5;
for y=−1, Ky=−1.5;
for y=0, Ky=−0.5;
for y=1, Ky=0.5; and
for y=2, Ky=1.5.

Figure 22C:
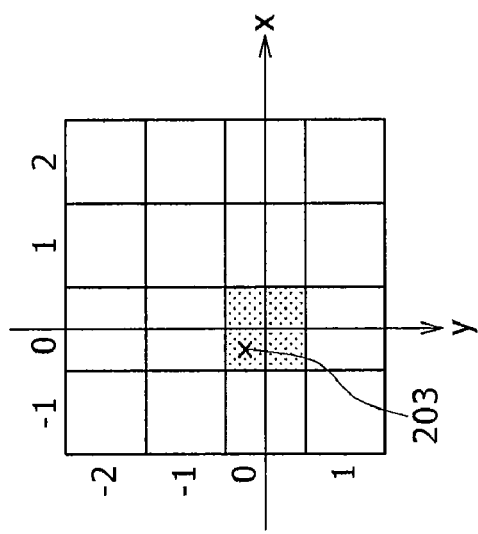

In the case of the coordinate system shown in FIG. 22C, the coordinates Kx and Ky of the (Kx, Ky) coordinate system shown in FIG. 24 have the following values:
For x=−1, Kx=−1.5;
for x=0, Kx=−0.5;
for x=1, Kx=0.5;
for x=2, Kx=1.5;
for y=−2, Ky=−1.5;
for y=−1, Ky=−0.5;
for y=0, Ky=0.5; and
for y=1, Ky=1.5.

In the case of the coordinate system shown in FIG. 22D, the coordinates Kx and Ky of the (Kx, Ky) coordinate system shown in FIG. 24 have the following values:
For x=−1, Kx=−1.5;
for x=0, Kx=−0.5;
for x=1, Kx=0.5;
for x=2, Kx=1.5;
for y=−1, Ky=−1.5;
for y=0, Ky=−0.5;
for y=1, Ky=0.5; and
for y=2, Ky=1.5.

Notation $\Delta x$ used in Eqs. (C) shown in FIG. 23 is a shift of the coordinate x of the position of a table element in the (x, y) coordinate system shown in FIG. 22A, 22B, 22C or 22D for the coordinate Kx in the (Kx, Ky) coordinate system shown in FIG. 24. By the same token, notation $\Delta y$ used in Eqs. (D) shown in FIG. 23 is a shift of the coordinate y of the position of a table element in the (x, y) coordinate system shown in FIG. 22A, 22B, 22C or 22D for the coordinate Ky in the (Kx, Ky) coordinate system shown in FIG. 24. The shifts $\Delta x$ and $\Delta y$ have the following values:
In the case of FIG. 22A, $\Delta x$=−0.5 and $\Delta y$=−0.5;
in the case of FIG. 22B, $\Delta x$=−0.5 and $\Delta y$=0.5;
in the case of FIG. 22C, $\Delta x$=0.5 and $\Delta y$=−0.5; and
in the case of FIG. 22D, $\Delta x$=0.5 and $\Delta y$=0.5.

The coordinates (dx, dy) are the coordinates of a position observed in the (x, y) coordinate system at the precision of the fraction level with the minimum-value table element tm found at the origin position (0, 0) of the (x, y) coordinate system at the precision of the integer level. From the position (dx, dy) observed in the (x, y) coordinate system at the precision of the fraction level and the position of the minimum-value table element tm found at the origin position (0, 0) of the (x, y) coordinate system at the precision of the integer level, the position 203 can be detected as a position separated away from the center of the identified minimum-value table element tm.

Second Typical Interpolation Process to Detect a Movement Vector with a Higher Degree of Accuracy A second typical interpolation process to detect a movement vector with a higher degree of accuracy adopts a technique whereby a plurality of correlation values (which are each a final component SAD value in this embodiment) stored in elements arranged in the horizontal direction on a row including the minimum-value table element tm found at the precision of the integer level in the shrunk correlation-value table are used to create a cubic curve laid on a plane oriented in the horizontal direction. On the other hand, a plurality of correlation values stored in elements arranged in the vertical direction on a column including the minimum-value table element tm in the shrunk correlation-value table as are used to create a cubic curve laid on a plane oriented in the vertical direction. Then, a position (vx, vy) of the minimum values of the cubic curves is detected and taken as a minimum-value address having the precision of the fraction level.

Figure 25B:
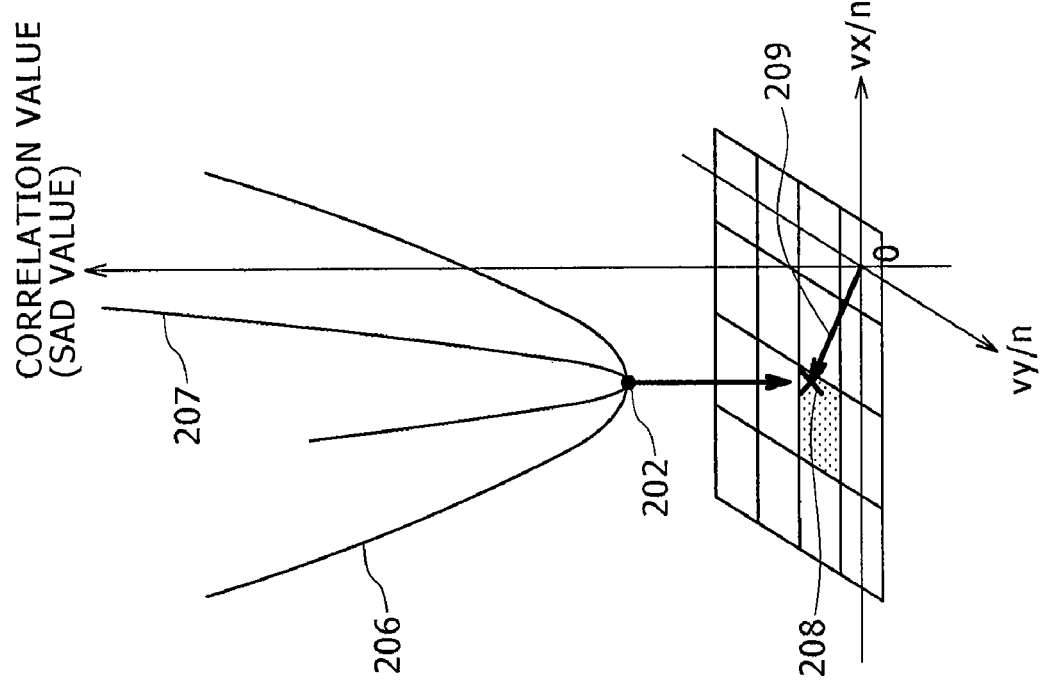
FIGS. 25A and 25B are each an explanatory diagram to be referred to in description of a process to detect an accurate movement vector in accordance with a second typical implementation of the movement-vector detection method according to the embodiment.
Figure 25A:
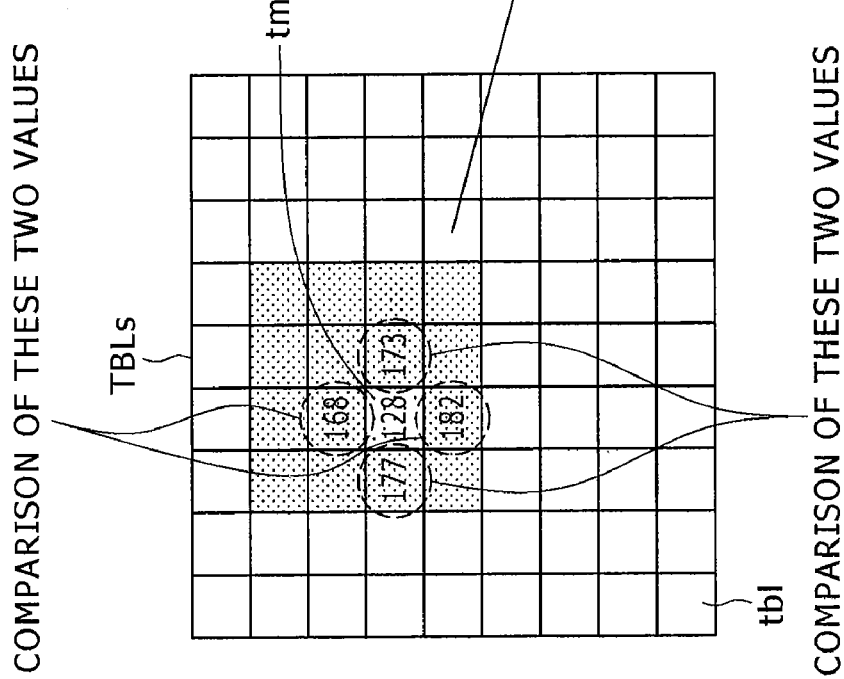

FIG. 25 is an explanatory diagram referred to in the following description of the second typical interpolation process to detect a movement vector with a higher degree of accuracy. Much like the first typical interpolation process to detect a movement vector with a higher degree of accuracy, the second typical interpolation process is carried out to find a movement vector by making use of a rectangular table area centered at the minimum-value table element tm found at the precision of the integer level as an area including neighborhood table elements surrounding the minimum-value table element tm in the horizontal and vertical directions. In the example shown in FIG. 25, the number of neighborhood table elements is set at sixteen (=4×4). In FIG. 25A, the table area is shown as a dotted block.

Next, much like the first typical interpolation process to detect a movement vector with a higher degree of accuracy, as shown in FIG. 25B, a coordinate space is assumed in the range of contracted reference vectors (or the range of the shrunk correlation-value table). The range of contracted reference vectors corresponds to the search range of the reference frame. The position of the target frame (or, strictly speaking, the position of the target-block projected image block 104 shown in FIG. 8) is taken as the origin position (0, 0, 0) of the coordinate space, which has 3 axes as follows. The vertical Z axis (or the correlation-value axis) is taken as an axis representing the correlation value, which decreases in inverse proportion to the correlation between the reference and target blocks. In this embodiment, the correlation value is a final component SAD value. The horizontal X axis (or a vx/n axis) is taken as an axis representing the shift of the reference block from the target block in the X direction or an axis representing the value vx/n of the contracted reference vector. By the same token, the horizontal Y axis (or a vy/n axis) is taken as an axis representing the shift of the reference block from the target block in the Y direction perpendicular to the X direction or an axis representing the value vy/n of the contracted reference vector. The vertical Z axis is perpendicular to a plane on which the horizontal X an Y axes are laid.

Then, four table elements on a horizontal-direction row including the minimum-value table element tm found at the precision of the integer level are selected among the sixteen table elements in the neighborhood of the table minimum-value element tm. Subsequently, the correlation values (which are each a final component SAD value) of the four selected table elements are used to create a horizontal cubic curve 206 laid on a plane oriented in the horizontal direction in the coordinate system. Then, the horizontal-direction position vx/n of the minimum value on the horizontal cubic curve 206 is selected in the area of a table element at the precision of the fraction level.

By the same token, four table elements on a vertical-direction column including the minimum-value table element tm found at the precision of the integer level are selected among the sixteen table elements in the neighborhood of the table minimum-value element tm. Subsequently, the correlation values (which are each a final component SAD value) of the four selected table elements are used to create a vertical cubic curve 207 laid on a plane oriented in the vertical direction in the coordinate system. Then, the vertical-direction position vy/n of the minimum value on the vertical cubic curve 207 is selected in the area of a table element at the precision of the fraction level.

From the horizontal-direction position vx/n selected at the precision of the fraction level and the vertical-direction position vy/n selected at the precision of the fraction level, a minimum-value table address 208 is then found at the precision of the fraction level. The fraction-precision minimum-value table address 208 is a table-element address corresponding to the minimum value on the horizontal cubic curve 206 and the vertical cubic curve 207. Finally, a minimum-value vector 209 pointing to the fraction-precision minimum-value table address 208 identified at the precision of the fraction level as a position in a the table element is determined, and the movement vector (or the minimum-value vector) with the original magnitude and the original direction is computed by multiplying the minimum-value vector 209 by the reciprocal value n of the contraction factor as shown in FIG. 16.

That is to say, the second typical interpolation process adopts a technique whereby four table elements are selected in each of a row oriented in the horizontal direction and a column is oriented in the vertical direction by adoption of the same technique as the first typical interpolation process. Then, a cubic curve laid on a plane oriented in the horizontal direction is created on the basis of the four table elements selected on the row whereas a cubic curve laid on a plane oriented in the vertical direction is created on the basis of the four table elements selected on the column as shown in FIG. 25B.

Figure 26:
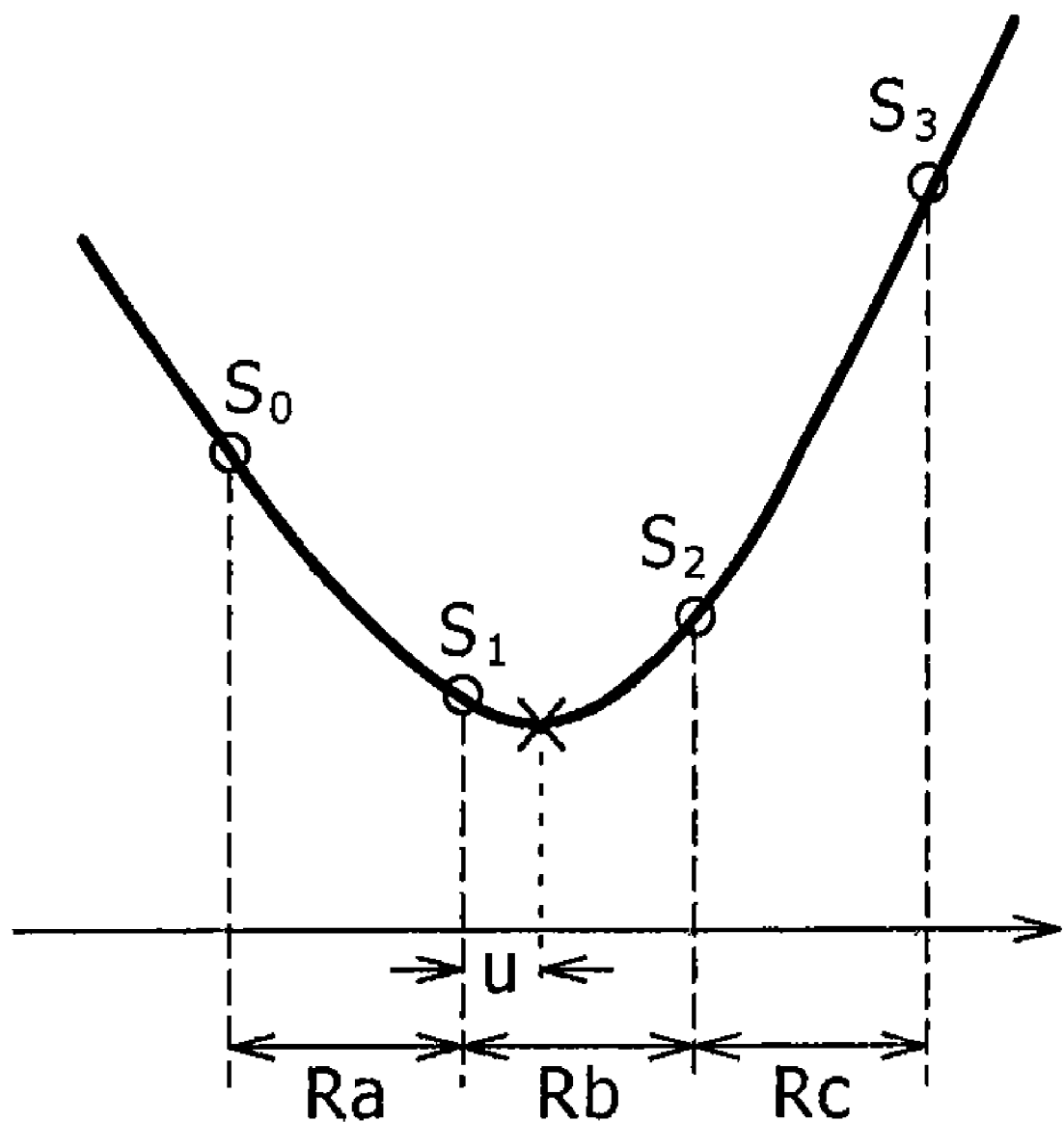
FIG. 26 is an explanatory diagram to be referred to in description of a process to detect an accurate movement vector in accordance with the second typical implementation of the movement-vector detection method according to the embodiment.

A process to find the fraction-precision minimum-value table address 208 corresponding to the minimum-value point 202 on the horizontal cubic curve 206 and the vertical cubic curve 207 is carried out by adoption of a method described as follows. Let us have notations $S_0$, $S_1$, $S_2$ and $S_3$ denote correlation values of the four table elements selected on a row oriented in the horizontal direction or a column oriented in the vertical direction. As described above, in this embodiment, a correlation value is a final component SAD value. The correlation values $S_0$, $S_1$, $S_2$ and $S_3$ correspond to four adjacent points laid out consecutively along the horizontal cubic curve 206 in the horizontal direction or the vertical cubic curve 207 in the vertical direction. As shown in FIG. 26, notations Ra, Rb and Rc respectively denote a segment representing the axis-direction distance between the points $S_0$ and $S_1$, a segment representing the axis-direction distance between the points $S_1$ and $S_2$ and a segment representing the axis-direction distance between the points $S_2$ and S3. A segment portion u is a fraction part included the coordinate value of the position of the minimum correlation value. The segment portion u is found in accordance with an equation dependent on which of the three segments Ra, Rb and Rc shown in FIG. 26 includes the segment portion u serving as the fraction part included in the coordinate value of the position of the minimum correlation value.

As described above, the segment Ra is a segment between the position corresponding to the correlation value (or SAD value) $S_0$ and the position corresponding to the correlation value $S_1$. The segment Rb is a segment between the position corresponding to the correlation value $S_1$ and the position corresponding to the correlation value $S_2$. The segment Rc is a segment between the position corresponding to the correlation value $S_2$ and the position corresponding to the correlation value $S_3$. As described above, in this embodiment, a correlation value is a final component SAD value.

If the fraction-precision position of the minimum correlation value exists in the segment Ra shown in FIG. 26, the segment portion u representing the distance from the beginning of the segment Ra to the position is found as a fraction by making use of Eq. (E) shown in FIG. 27.

By the same token, if the fraction-precision position of the minimum correlation value exists in the segment Rb shown in FIG. 26, the segment portion u representing the distance from the beginning of the segment Rb to the position is found as a fraction by making use of Eq. (F) shown in FIG. 27.

In the same way, if the fraction-precision position of the minimum correlation value exists in the segment Rc shown in FIG. 26, the segment portion u representing the distance from the beginning of the segment Rc to the position is found as a fraction by making use of Eq. (G) shown in FIG. 27.

The following description explains a technique to determine which of the three segments Ra, Rb and Rc shown in FIG. 26 includes the fraction part u.

FIG. 28 is an explanatory diagram referred to in description of the technique to determine which of the three segments Ra, Rb and Rc shown in FIG. 26 includes the fraction part u. First of all, notation 5 min denotes the minimum correlation value at a position detected at the precision of the integer level whereas notation Sn2 denotes a correlation value located at an integer-precision position as a correlation value having a smallest difference from the minimum correlation value 5 min among the correlation values at the integer-precision positions of all the four table elements. The true minimum correlation value denoted by symbol x in FIGS. 28A, 28B and 28C has to exist at a position detected at the precision of the fraction level as a position between the position of the minimum correlation value 5 min and the position of the correlation value $Sn_2$. Then, by recognizing which of the correlation values $S_0$, $S_1$, $S_2$ and $S_3$ shown in FIG. 28 serve as the minimum correlation value 5 min and the correlation value Sn2, it is possible to determine which of the three segments Ra, Rb and Rc includes the fraction part u.

Figure 28A:
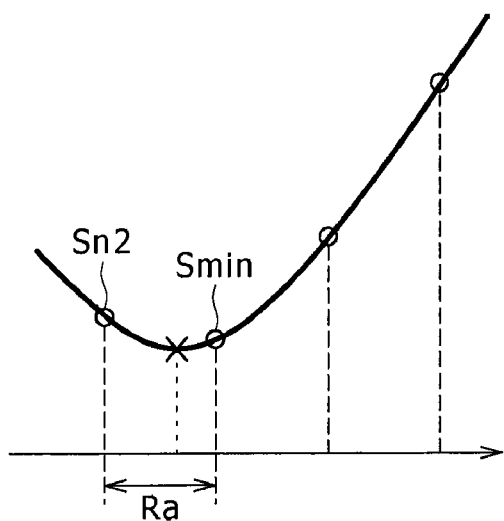
FIGS. 28A, 28B, 28C and 28D are each an explanatory diagram to be referred to in description of a process to detect an accurate movement vector in accordance with the second typical implementation of the movement-vector detection method according to the embodiment.
Figure 28B:
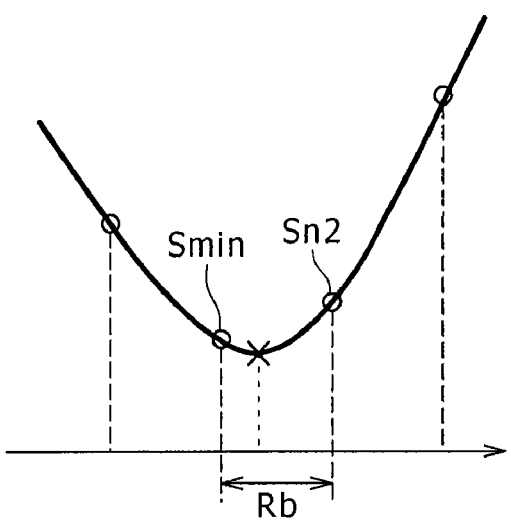
Figure 28C:
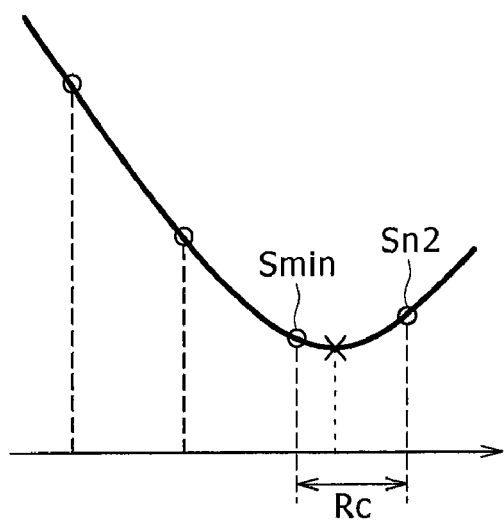
Figure 28D:
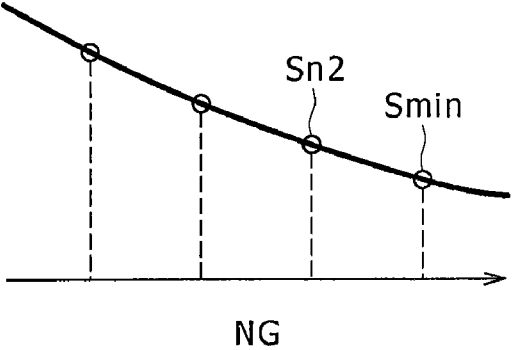

It is to be noted that there is also a case in which the integer-precision position of the minimum correlation value 5 min is an edge of a range including the positions of the correlation values of the four table elements as shown in FIG. 28D. In this case, the position of the true minimum correlation value x may not be determined, and the embodiment does not find the position of the true minimum correlation value x, handling this case as an error. Nevertheless, the position of the true minimum correlation value x can also be found even in the case like the one shown in FIG. 28D.

Figure 29:
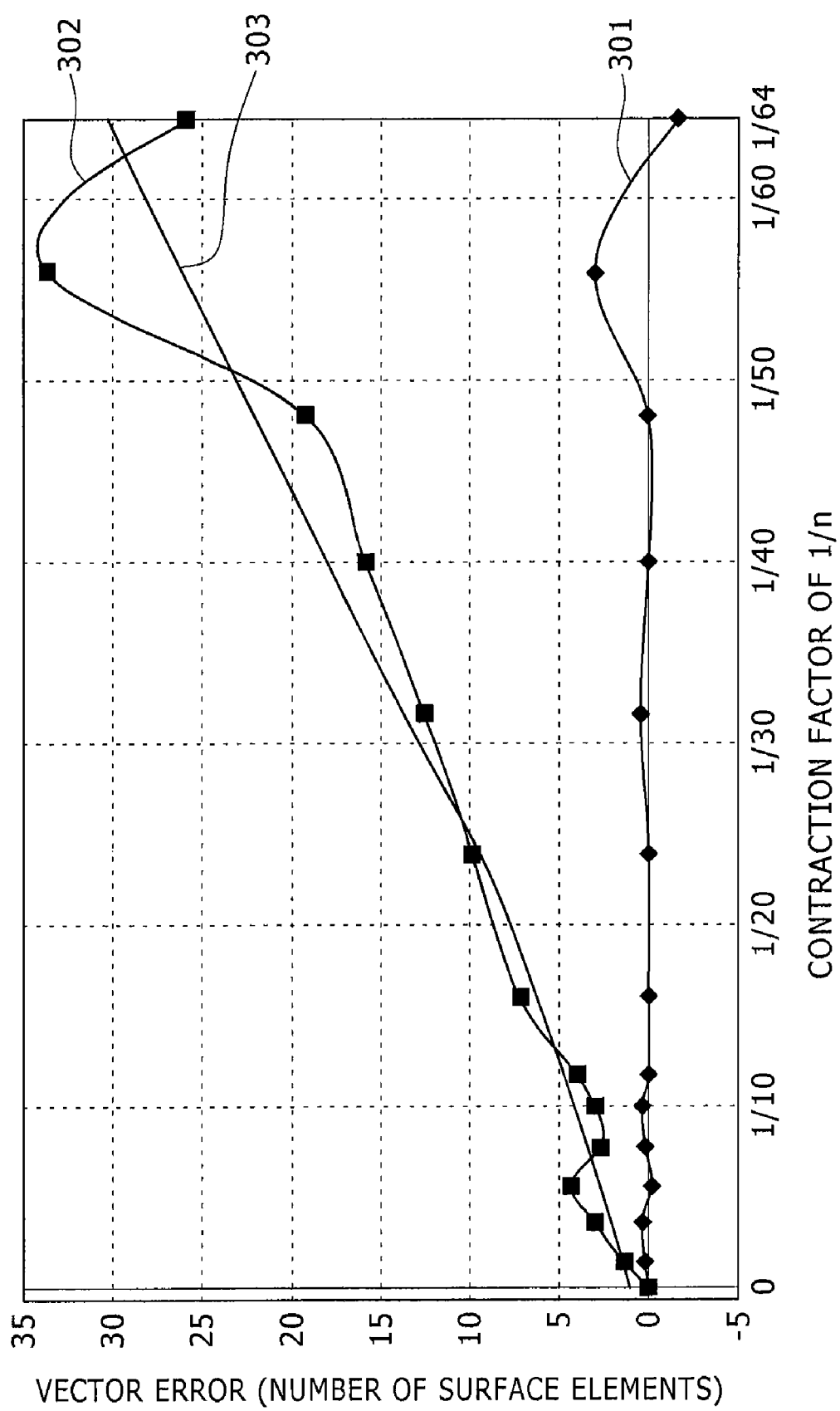
FIG. 29 is an explanatory diagram to be referred to in describing the performance of the movement-vector detection method according to an embodiment.

As described above, in accordance with the embodiments described above, by making use of a shrunk correlation-value table with a size scaled down by a down-sizing factor of $1/n^2$, the movement vector at the original image scale can be detected. FIG. 29 is a diagram showing the fact that all but the same vector detection results as the image-processing apparatus in the related art can be obtained in spite of the use of a shrunk correlation-value table with a size scaled down by a down-sizing factor of $1/n^2$.

The horizontal axis of FIG. 29 represents the one-dimensional contraction factor of 1/n used in contracting the correlation-value table in the horizontal or vertical direction. On the other hand, the vertical axis represents the vector error, which is an error of a detected movement vector. The value of the vector error shown in FIG. 29 is expressed in terms of pixels.

In FIG. 29, a curve 301 represents the average value of vector errors detected for different contraction factors. A curve 302 represents the three-time value (3σ(99.7%) value) of the variance σ of the vector errors detected for different contraction factors. A curve 303 is an approximation curve of the curve 302.

The curves shown in FIG. 29 represent the vector error detected at different one-dimensional contraction factors 1/n. Since the correlation-value table is a two-dimensional table, however, the size of the table (that is, the number of elements composing the correlation-value table) is reduced at a rate equal to the square of the one-dimensional contraction factor of 1/n used in FIG. 29. Nevertheless, the usefulness of the technique according to the embodiments is obvious from the curves indicating that the average of vector errors does not change and the variance of the vector errors only increases linearly with changes in contraction factor.

In addition, even for n=64 (or a contraction factor of 1/64), the average of vector errors is small, proving that there is not a failure caused by detection of an incorrect movement vector. Thus, we can say that the size of the correlation-value table can be reduced essentially by a down-sizing factor of 1/4,096.

On top of that, as described earlier, in a process to compensate a moving picture for distortions caused by a hand movement, a real-time response and reduction of the time delay are strongly demanded. However, errors of the detected movement vector can be tolerated to a certain degree as long as the error is not a failure caused by detection of an incompletely incorrect movement vector. Thus, the size of the correlation-value table can be reduced substantially without causing a failure. As a result, the embodiments can be said to be very useful.

As described earlier, in the case of an actual distortion compensation system according to the embodiment, a target frame 101 is divided into a plurality of target areas TGi each also referred to as a picture division, and a target block 103 is set in each of the target areas TGi. In a reference frame 102, on the other hand, a search range 105 is set for each of the target blocks 103. Then, a movement vector 205 is detected in the reference frame 102 for each of the search ranges 105 (that is, for each of the target blocks 103 associated with their respective target areas TGi). As described earlier, the movement vector 205 is denoted by reference notation MVi in FIG. 5A. A plurality of movement vectors MVi denoted by reference numeral 205 are detected because it is quite within the bounds of possibility that the frame includes a moving member of the photographing object. In the case of an example shown in FIG. 30, 16 movement vectors 205 are detected in a reference frame 102. Then, a statistical process is carried out on the movement vectors MVi while considering transitions each indicated by one of movement vectors 205 on a frame observed in the past in order to produce a global hand-movement displacement vector Gvec for the reference frame 102, which is the currently observed frame.

In addition, in the case of this embodiment, as will be described later, a plurality of target blocks 103 are set in the target frame 101 in order to find the global hand-movement displacement vector Gvec by subtracting an optical-zoom portion vector from a detected movement vector.

Figure 30:
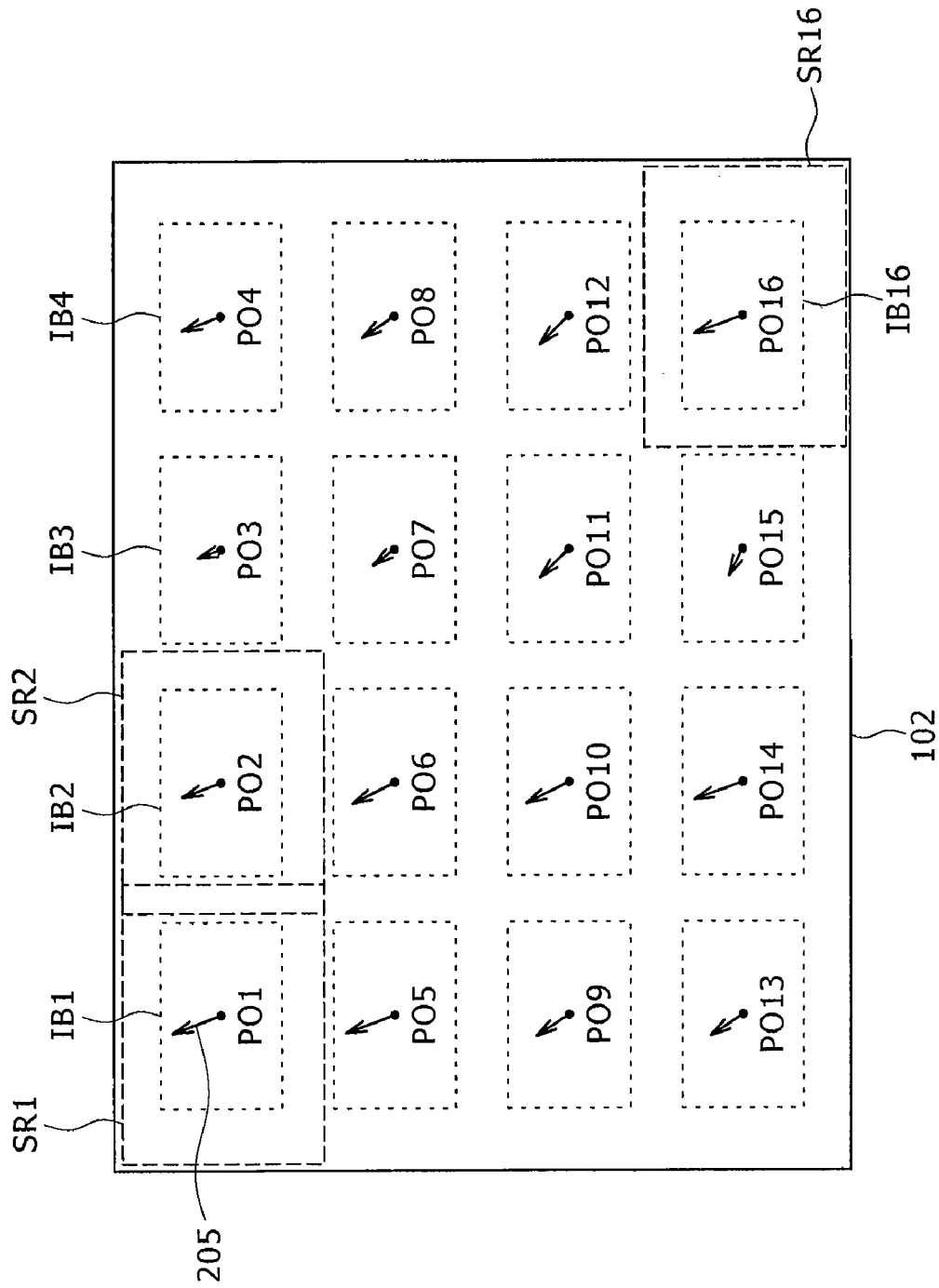
FIG. 30 is an explanatory diagram to be referred to in describing an outline of a method to detect movement vectors in accordance with an embodiment.

In this case, as shown in FIG. 30, 16 search ranges SR1, SR2, - - - and SR16 centered at the origin positions PO1, PO2, - - - and PO16 of respectively the 16 movement vectors 205 to be detected are set in advance in the reference frame 102 and target-block projected image blocks IB1, IB2, - - - and IB16 are assumed to exist at the centers of the search ranges SR1, SR2, - - - and SR16 respectively.

Then, in each of the search ranges SR1, SR2, - - - and SR16, a reference block having the same size as each of the target-block projected image blocks IB1, IB2, - - - and IB16 is set as a block to be moved from position to position over the search range SR1, SR2, - - - or SR16 respectively. A shrunk SAD table is then generated for finding the movement vector 205 in each of the search ranges SR1, SR2, - - - and SR16 in the same way as the technique provided by the present application as described earlier.

Subsequently, a statistical process is carried out on a plurality of the movement vectors 205 each detected on the reference frame 102 for one of the target blocks 103 on the target frame 101 while considering transitions each indicated by one of the movement vectors 205 on a frame observed in the past in order to produce a global hand-movement displacement vector Gvec for the reference frame 102.

In comparison with the method in the related art disclosed in Patent Document 4 as a method for detecting a movement vector for an image with a reduced size, the image processing method according to the embodiments described above has the following big merits different from those of the method in the related art.

In the first place, unlike the method in the related art disclosed in Patent Document 4, in the image processing method according to the embodiments, a process to contract an image is unnecessary. This is because, in accordance with the image processing method provided by the embodiments, in a process to store a component correlation value computed for a reference block in a shrunk correlation-value table (or a shrunk SAD table) as an element of the table, a process to translate the address of the element is carried out at the same time. As described above, the correlation value computed for a reference block is actually a final component SAD value computed for the reference block.

Thus, in comparison with the method in the related art disclosed in Patent Document 4, the image processing method according to the embodiments offers merits such as elimination of logic to contract an image, the time it takes to store a contracted image in a memory, the bandwidth of a process to store a contracted image in the memory and the memory for storing a contracted image.

In the second place, the method in the related art disclosed in Patent Document 4 raises another serious problem that, as described earlier, the method demands a low-pass filter for getting rid of aliasing and low-illumination noises generated in the process to shrink an image. That is to say, in the process to shrink an image, image data has to be supplied to a proper low-pass filter before being re-sampled. Otherwise, aliasing will occur and the precision of a movement vector detected by using a shrunk image will deteriorate substantially.

A function exhibited by a low-pass filter used in the process to shrink an image as a function resembling the sinc function has been proven theoretically to be an ideal characteristic of a low-pass filter. The sinc function itself is the function of an infinite-tap FIR (Finite Impulse Response) filter having a cut-off frequency f/2 expressed by $\sin(x\Pi)/(x\Pi)$. In the case of a low-pass filter having an ideal cut-off frequency of $f/(2n)$ for a contraction factor of $1/n$, the cut-off frequency is represented by $\sin(x\Pi/n)/(x\Pi/n)$, which can also be used as a form of the sinc function though.

Figure 31:
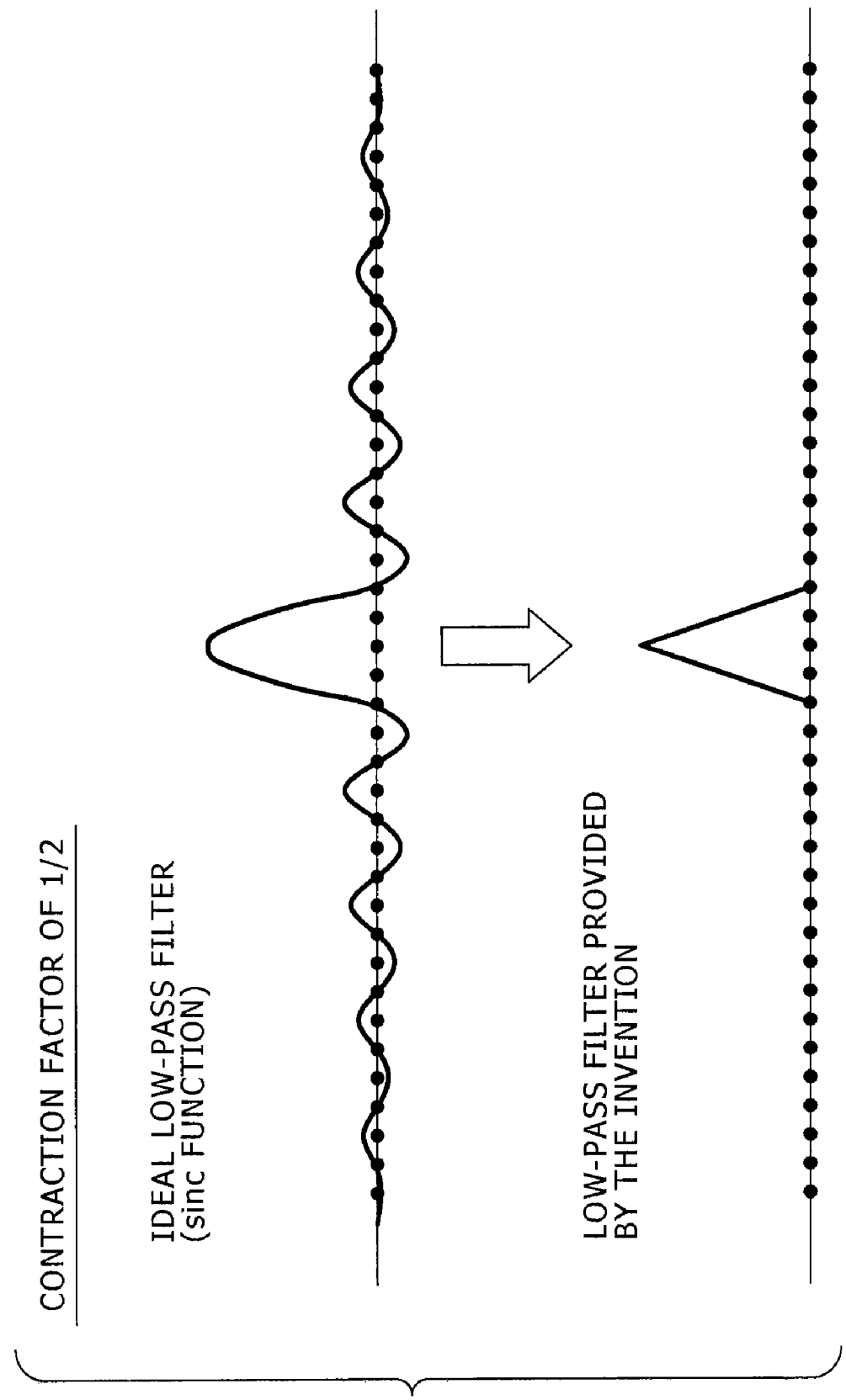
FIG. 31 is an explanatory diagram comparing the characteristic of the movement-vector detection method according to the embodiment with that of the method in the related art.
Figure 32:
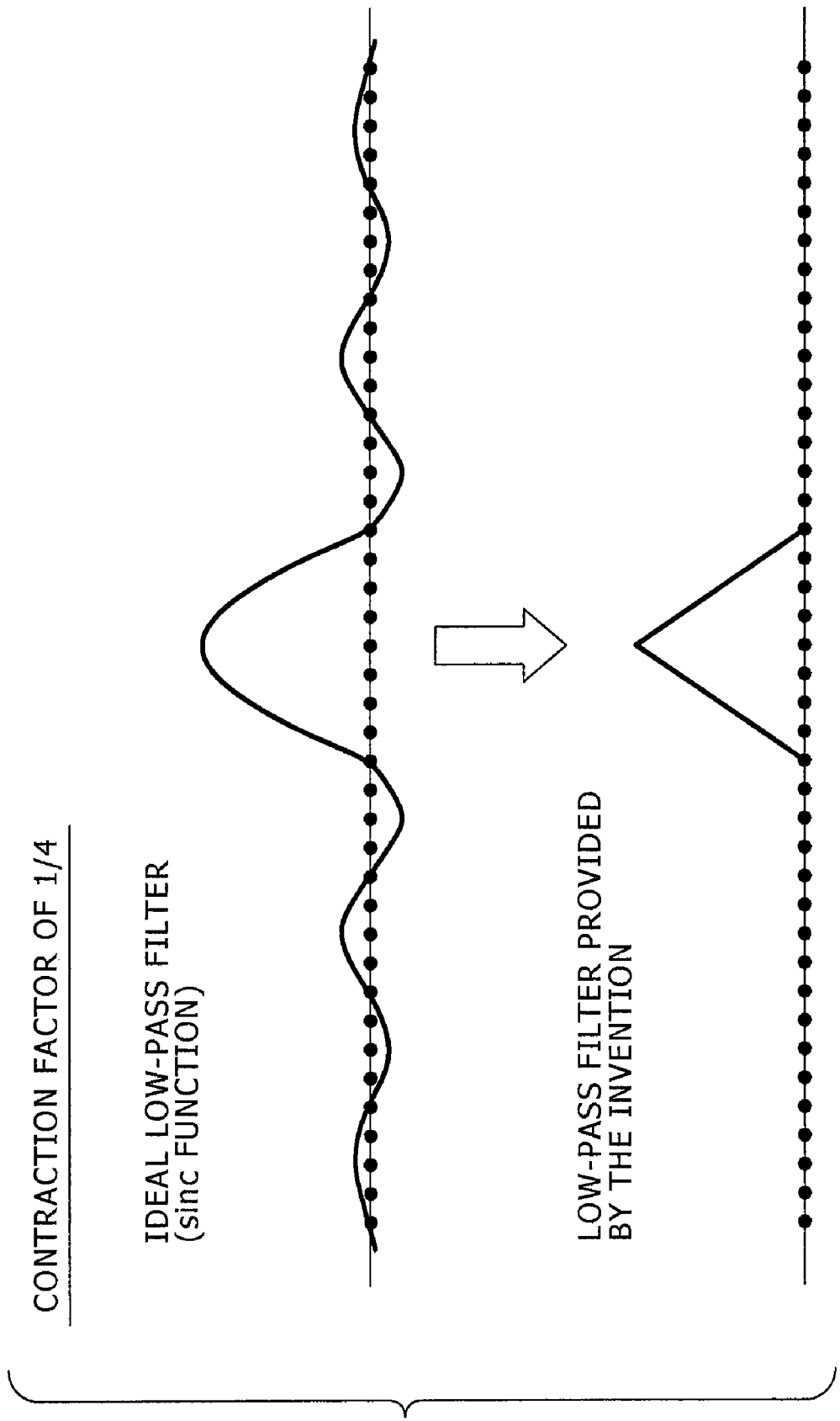
FIG. 32 is an explanatory diagram comparing the characteristic of the movement-vector detection method according to the embodiment with that of the method in the related art.
Figure 33:
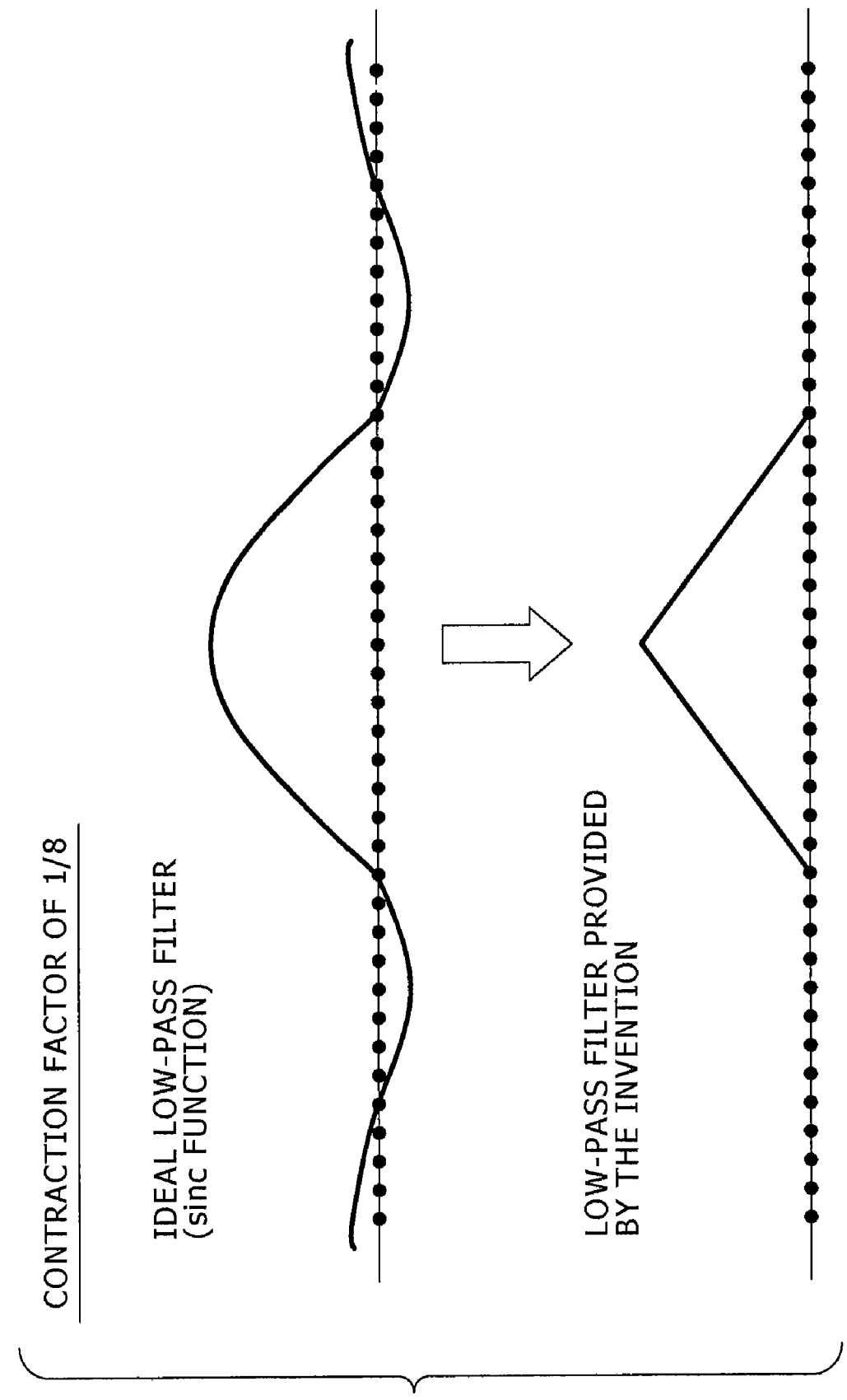
FIG. 33 is an explanatory diagram comparing the characteristic of the movement-vector detection method according to the embodiment with that of the method in the related art.

Diagrams on the upper side of FIGS. 31, 32 and 33 show the shapes of the sinc function (or the ideal characteristic of a low-pass filter) for contraction factors of ½, ¼ and ⅛ respectively. It is obvious from FIGS. 31, 32 and 33 that, the larger the contraction factor, the larger the factor at which the function is expanded in the tap-axis direction. In other words, even for a case in which the infinite-tap sinc function is approximated by only principal coefficients, it can be said that it is necessary to increase the number of taps of the FIR filter.

In addition, it is known in general that, the lower the cut-off frequency in the frequency band, the more predominant the number of taps in the performance of the low-pass filter in comparison with the dominance of the filter shape.

Thus, a movement-vector identification method using a shrunk image generated in accordance with the method in the related art disclosed in Patent Document 4 generally shows a contradiction that, in spite of the fact that, the larger the contraction factor of an image, the bigger the effect of reducing the size of the correlation-value table (or the SAD table), we encounter the fact that the cost increases in proportional to the increase in contraction factor.

In general, in implementation of a high-order tap FIR filter, the cost of the processing logic increases in proportion to the square of the number of taps, raising a big problem. However, an even bigger problem is caused by an increased number of line memories used to realize a vertical filter. In digital still cameras manufactured in recent years, in order to reduce the size of the line memory to keep up with the increasing number of pixels, the so-called strap processing is carried out. However, even if the size per memory line is reduced for example, the number of line memories themselves increases, raising the total cost substantially if a physical layout area is translated into the cost.

As described above, the approach based on image contraction according to the method in the related art disclosed in Patent Document 4 is known to have a big barrier encountered particularly in implementation of a vertical low-pass filter. On the other hand, the image processing method according to the embodiments has solved this problem effectively in a completely different way.

Diagrams on the lower side of FIGS. 31 to 33 each show an image of the low-pass filters according to the image-processing method provided by the present application. In accordance with the image-processing method provided by the present application, the processing to shrink an image is not carried out. However, the process to generate a shrunk correlation-value (SAD) table includes the processing of a low-pass filter, the image of which is shown in any of the figures.

In the diagrams on the lower side of FIGS. 31 to 33, the characteristic of this low-pass filter is a simple filter characteristic in which the principal-coefficient portions of the sinc function can be approximated linearly, but the number of taps increases in a manner interlocked with the contraction factor. The simple filter characteristic and the increasing manner of the tap count are suitable for the fact that the lower the cut-off frequency, the more predominant the number of taps in the performance of the low-pass filter. That is to say, the process to find component correlation values (which are each a component SAD value) in accordance with the present application is equivalent to implementation of a low-pass filter exhibiting high performance in a manner interlocked with the contraction factor as a simple circuit. As described earlier, the process to find component correlation values is processing carried out in accordance with the embodiments as a process based on the linear weighted distribution technique to find component correlation values.

The simple circuit implementing a low-pass filter offers another merit in comparison with the method in the related art disclosed in Patent Document 4. That is to say, in accordance with the method in the related art disclosed in Patent Document 4, an image is shrunk in a sampling process after the image passes through a low-pass filter. In this shrinking process, much image information is lost. To be more specific, in the processing carried out by the low-pass filter, the word length of the luminance value of the image information is rounded considerably before the image information is stored in a memory. Thus, most of low-order bits of the pixel information have no effect on the shrunk image.

In accordance with the image processing technique according to the embodiments, on the other hand, the luminance values of all pixels in the target block are used equally in a process to compute a final component correlation value stored in a shrunk correlation-value table as an element of the table. That is to say, the final component correlation is a cumulative sum of correlation values each found for one of the pixels in the target block. Thus, by merely increasing the word length of every element of the shrunk correlation-value table, it is possible to carry out such a correlation-value computation process that even the eventually computed final correlation value does not include a rounding-process error at all. Since the size of the shrunk correlation-value table is small in comparison with the size of the frame memory, the extension of the word length of every element composing the shrunk correlation-value table does not raise a big problem. As a result, the shrunk correlation-value table and the processing to determine a movement vector can be implemented with a high degree of precision.

Operations of the Movement-Vector Detection Processing Unit 151

First Typical Implementation

The processing flow of a first typical implementation realizing operations of the hand-movement displacement-vector detection unit 15 is explained by referring to a flowchart shown in FIGS. 34 and 35 as follows.

The flowchart begins with a step S101 at which a reference block Ii denoted by reference numeral 106 in FIG. 8 or 30 is specified at a position having coordinates of (vx, vy) in the search range 105 or search ranges SR1, SR2 - - - and SR16. An operation to specify a reference block Ii in the search range 105 is also an operation to specify a reference vector (vx, vy) corresponding to the reference block Ii. As described earlier, the coordinates of (vx, vy) are the coordinates of the position pointed to by the specified reference vector 107 with coordinates of (0, 0) taken as the coordinates of an origin position. The coordinates of (0, 0) are the coordinates of the position of the target block 103 on the original frame 101 or the coordinates of the position of the target-block projected image block 104 on the reference frame 102. The coordinate vx represents the horizontal-direction shift of the position pointed to by the specified reference vector 107 from the origin position having the coordinates of (0, 0) whereas the coordinate vy represents the vertical-direction shift of the position pointed to by the specified reference vector 107 from the origin position. Much like the method in the related art described earlier, the shifts vx and vy are expressed in terms of pixels.

As described earlier, the center position of the search range 105 is taken as the center position of the target-block projected image block 104 or the origin position (0, 0). The reference block 106 is moved from position to position over the search range 105 in the horizontal directions by distances in the range ±Rx defining the horizontal limits of the search range 105 and the vertical directions by distances in the range ±Ry defining the vertical limits of the search range 105. In this case, the quantities (vx, vy) satisfy the following relation:

$$-Rx \geq vx \geq +Rx \text{ and } -Ry \geq vy \geq +Ry$$

At the next step S102, a point (or a pixel) with coordinates (x, y) is specified as a point in the target block Io denoted by reference numeral 103 in FIG. 8. Let us have notation Io (x, y) denote a pixel value at the specified point (x, y) and notation Ii (x+vx, y+vy) denotes a pixel value at a point (x+vx, y+vy) in the reference block Ii set at the block position (vx, vy) at the step S10. In the following description, the point (x+vx, y+vy) in the reference block Ii is said to be a point corresponding the point (x, y) in the target block Io. Then, at the next step S103, the absolute value α of the difference between the pixel value Io (x, y) and the pixel value Ii (x+vx, y+vy) is computed in accordance with Eq. (1) given earlier as follows:

$$\alpha = |Io(x,y) - Ii(x+vx, y+vy)| \quad (1)$$

The above difference absolute value α is to be computed for all points (x, y) in the target block Io and all their corresponding points (x+vx, y+vy) in the reference block Ii, and a SAD value representing the sum of the difference absolute values α computed for the target block Io and the reference block Ii is stored at a temporary memory location associated with the reference vector (vx, vy) pointing to the current location of the reference block Ii. In order to compute such a SAD value, at the next step S104, the difference absolute value α found at the step S103 is cumulatively added to a temporary SAD value already stored at the temporary memory location as a SAD value computed so far. The final SAD value SAD (vx, vy) is obtained as a result of a process to cumulatively sum up all difference absolute values α, which are computed for all points (x, y) in the target block Io and all their corresponding points (x+vx, y+vy) in the reference block Ii as described above. Thus, the final SAD value SAD (vx, vy) can be expressed by Eq. (2) as follows:

$$SAD(vx, vy) = \Sigma\alpha = \Sigma |Io(x,y) - Ii(x+vx, y+vy)| \quad (2)$$

Then, the flow of the processing according to the first typical implementation goes on to the next step S105 to produce a result of determination as to whether or not the processes of the steps S103 and S104 have been carried out for all pixels (x, y) in the target block Io and all their corresponding pixels (x+vx, y+vy) in the reference block Ii. If the result of the determination indicates that the processes of the steps S103 and S104 have not been carried out yet for all pixels (x, y) in the target block Io and all their corresponding pixels (x+vx, y+vy) in the reference block Ii, the flow of the processing according to the first typical implementation goes back to the step S102 at which another pixel with coordinates (x, y) is specified as another pixel in the target block Io. Then, the processes of the steps S103 and S104 following the step S102 are repeated.

The processes of the steps S101 to S105 are exactly the same as respectively the processes of the steps S1 to S5 of the flowchart shown in FIG. 10 except that, in the case of the steps S103 and S104, the SAD value is stored at a temporary memory location.

If the determination result produced at the step S105 indicates that the processes of the steps S103 and S104 have been carried out for all pixels (x, y) in the target block Io and all their corresponding points (x+vx, y+vy) in the reference block Ii, that is, if the final SAD value SAD (vx, vy) for the current reference vector (vx, vy) has been found, on the other hand, the flow of the processing according to the first typical implementation goes on to a step S106 at which a contracted reference vector (vx/n, vy/n) is computed by contracting the reference vector (vx, vy). To put it concretely, the contracted reference vector (vx/n, vy/n) is computed by multiplying the reference vector (vx, vy) by a contraction factor of 1/n. In general, the x-direction and y-direction values (vx/n, vy/n) of the contracted reference vector (vx/n, vy/n) each have a fraction part.

Then, at the next step S107, a plurality of neighborhood reference vectors located in the neighborhood of the contracted reference vector (vx/n, vy/n) are identified. The neighborhood reference vectors are each a contracted reference vector having an integer vx/n value and an integer vy/n value, which are closest to respectively the x-direction and y-direction values (vx/n, vy/n) of the contracted reference vector (vx/n, vy/n). In this embodiment, the number of neighborhood reference vectors is set at four. Then, at the next step S108, the SAD value stored at the temporary location at the step S104 is split into four component SAD values by adoption of a linear weighted distribution technique based on relations between positions pointed to by the neighborhood reference vectors and a position pointed to by the contracted reference vector (vx/n, vy/n) as described earlier. Subsequently, at the next step S109, the four component SAD values are distributed among four table elements included in the contracted correlation-value table as four table elements associated with the four neighborhood reference vectors respectively.

Figure 35:
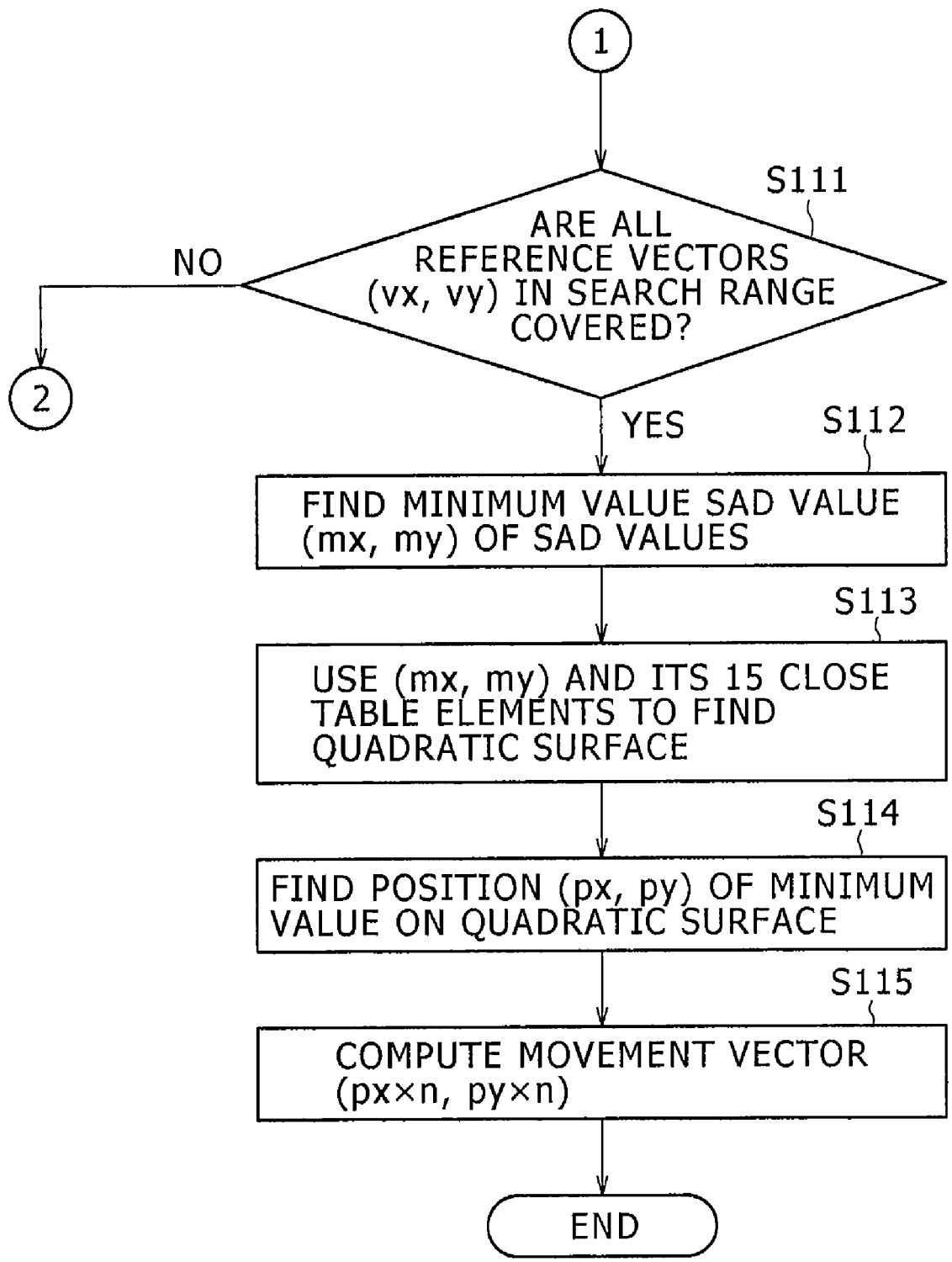
FIG. 35 shows the continuation of the flowchart to be referred to in explanation of the processing carried out to detect a movement vector in accordance with the first typical implementation in the image taking apparatus according to the first embodiment.

After the process of the step S109 is completed, the flow of the processing according to the first typical implementation goes on to a step S111 of the flowchart shown in FIG. 35 to produce a result of determination as to whether or not the processes of the steps S102 to S109 have been carried out for all reference-block locations in the search range 105, that is, for all reference vectors (vx, vy).

If the determination result produced at the step S111 indicates that the processes of the steps S102 to S109 have not been carried out yet for all reference blocks in the search range 105, that is, for all reference vectors (vx, vy), the flow of the processing according to the first typical implementation goes back to the step S101 at which another reference block Ii pointed to by another reference vector (vx, vy) is set at another block position (vx, vy) in the search range 105. Then, the processes of the step S102 and the subsequent steps are repeated.

If the determination result produced at the step S111 indicates that the processes of the steps S102 to S109 have been carried out for all reference-block positions in the search range 105 or for all reference vectors (vx, vy), that is, if all elements of the contracted correlation-value table have each been filled with a final component SAD value, on the other hand, the flow of the processing according to the first typical implementation goes on to a step S112 at which the smallest value among all the component final SAD values stored in all the elements of the contracted correlation-value table is detected at a table-element address (mx, my).

Then, at the next step S113, a quadratic surface is created as a surface approximating the minimum correlation value detected at the table-element address (mx, my) and a plurality of correlation values stored in the shrunk correlation-value table as table elements in the neighborhood of the table-element address (mx, my). As described above, the correlation values are each a SAD value. In the case of this embodiment, the number of correlation values stored in the shrunk correlation-value table as table elements in the neighborhood of the table-element address (mx, my) is set at 15. Then, at the next step S114, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S115, a movement vector (px X n, py X n) with the original magnitude and the original direction is computed by multiplying the minimum-value vector (px, py) by the reciprocal value n of the contraction factor.

Figure 34:
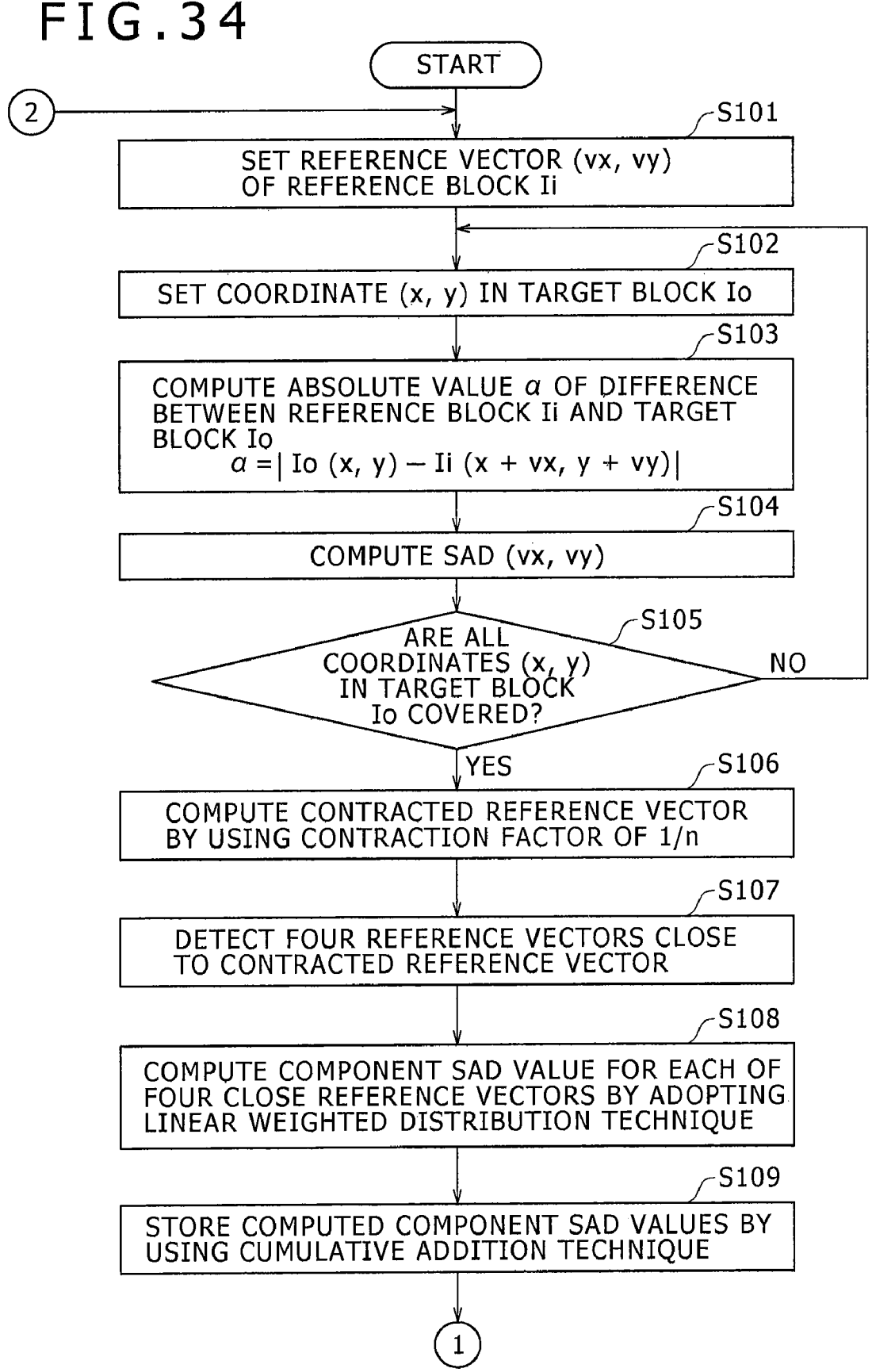
FIG. 34 shows a flowchart to be referred to in explanation of processing carried out to detect a movement vector in accordance with a first typical implementation in the image taking apparatus according to the first embodiment.

The flowchart shown in FIGS. 34 and 35 represents processing carried out in accordance with a block-matching technique according to the first typical implementation to detect a movement vector for one target block. For a segmented frame, a plurality of movement vectors need to be detected for frame segments as shown in FIG. 30. In this case, for each one of the movement vectors to be detected or each of the frame segments, a search range and a contraction factor of 1/n have to be set anew in order to carry out the processing represented by the flowchart shown in FIGS. 34 and 35.

Please keep in mind that it is needless to say that, in place of the quadratic-surface method described above, the method to make use of cubic curves laid on planes oriented the vertical and horizontal directions respectively as described above can also be adopted as a technique to find the minimum-value vector (px, py) pointing to a position detected on the search range with the precision of the fraction level.

Second Typical Implementation

In the case of the first typical implementation described above, a SAD value is found for a reference block or a reference vector and, by adoption of the linear weighted distribution technique, the SAD value is then split into a plurality of component SAD values for a plurality of neighborhood reference vectors each located in close proximity to a shrunk reference vector obtained as a result of contracting the reference vector. That is to say, since a SAD value represents a value of correlation between the target block and a reference block, in the case of the first typical implementation, a correlation value is found for a reference block associated with a reference vector and, by adoption of the linear weighted distribution technique, the correlation value is then split into a plurality of component correlation values for a plurality of neighborhood reference vectors each located in close proximity to a shrunk reference vector obtained as a result of contracting the reference vector.

In the case of a second typical implementation, on the other hand, a correlation value is computed as a difference in pixel value between a pixel on the target block and a corresponding pixel on a reference block. The computed correlation value is thus not a SAD value. Then, by adoption of the linear weighted distribution technique, the computed correlation value is split into a plurality of component correlation values for a plurality of neighborhood reference vectors each located in close proximity to a shrunk reference vector obtained as a result of contracting a reference vector pointing to the reference block. The process to compute a correlation value and the process to split the computed correlation value into a plurality of component correlation values are repeated for all pixels in the target block (or all corresponding pixels in the reference blocks) to find a plurality of final component correlation values by adoption of the cumulative addition technique. When the process to compute a correlation value and the process to split the computed correlation value into a plurality of component correlation values are completed for all pixels in the reference block, the state of a resulting contracted correlation-value table (or a resulting contracted SAD table) is the same as the contracted correlation-value table (or the contracted SAD table) generated by the first typical implementation.

The processing flow of the second typical implementation realizing operations of the hand-movement displacement-vector detection unit 15 is explained by referring to a flowchart shown in FIGS. 36 and 37 as follows.

Figure 36:
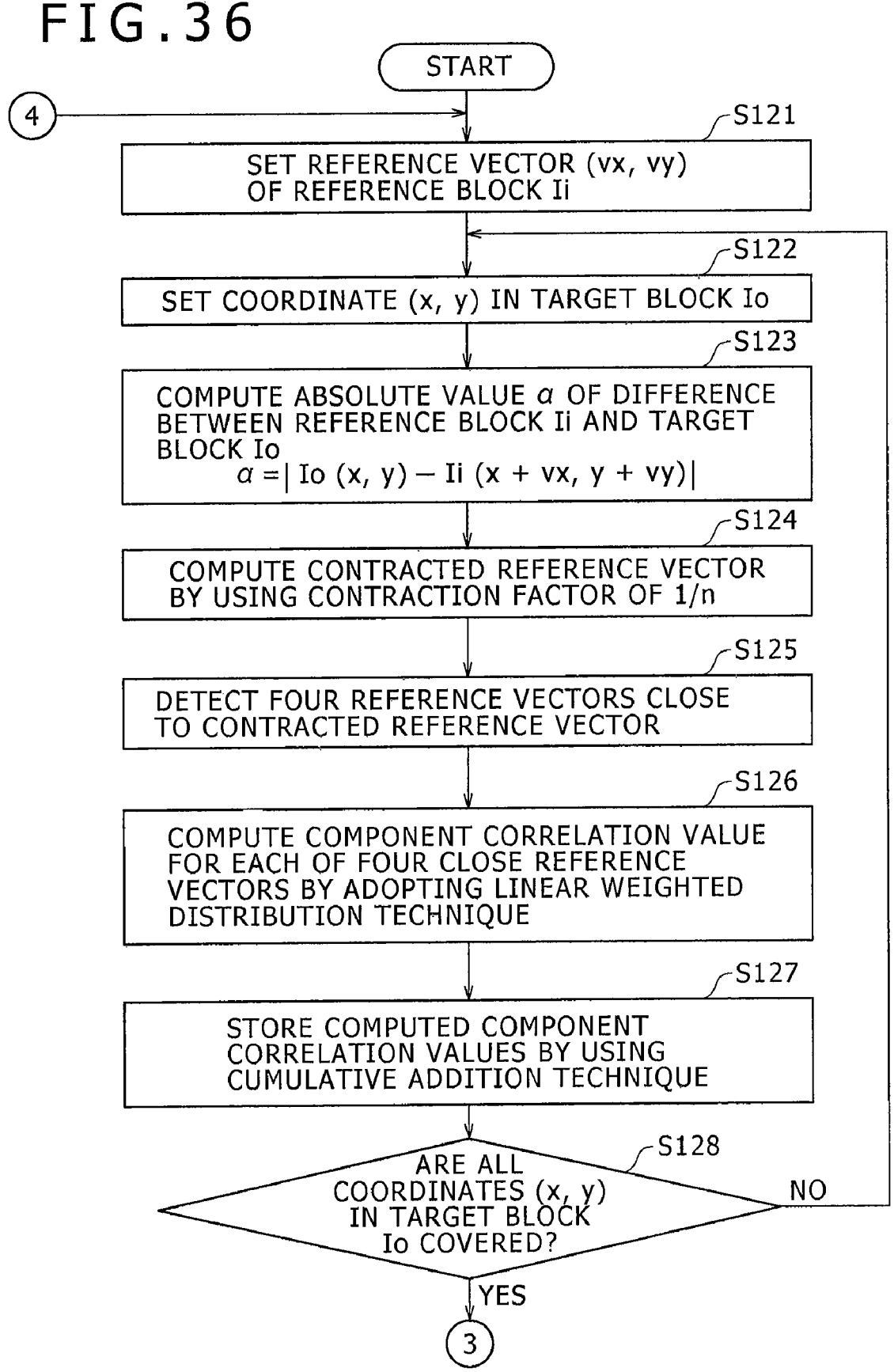
FIG. 36 shows a flowchart to be referred to in explanation of processing carried out to detect a movement vector in accordance with a second typical implementation in the image taking apparatus according to the first embodiment.

Since the processes of steps S121 to S123 of the flowchart shown in FIG. 36 are the same as respectively those of the steps S101 to S103 of the flowchart shown in FIG. 34, the processes of steps S121 to S123 are not explained in detail.

At the next step S123 of the flowchart for the second typical implementation, the absolute value α of the difference between the pixel value Io (x, y) of a pixel (x, y) on the target block Io and the pixel value Ii (x+vx, y+vy) of the corresponding pixel on the reference block Ii is computed in accordance with Eq. (1). Then, at the next step S124, a contracted reference vector (vx/n, vy/n) is computed by contracting the reference vector (vx, vy) pointing to the reference block Ii at a contraction factor of 1/n.

Subsequently, at the next step S125, a plurality of neighborhood reference vectors located in the neighborhood of the contracted reference vector (vx/n, vy/n) are identified. The neighborhood reference vectors are each a contracted reference vector having an integer vx/n value and an integer vy/n value, which are closest to respectively the x-direction and y-direction values (vx/n, vy/n) of the contracted reference vector (vx/n, vy/n). In this embodiment, the number of neighborhood reference vectors is set at four. Then, at the next step S126, the absolute value α found at the step S123 as the absolute value of the difference in pixel value is split into four component differences by adoption of the linear weighted distribution technique based on relations between positions pointed to by the neighborhood reference vectors and a position pointed to by the contracted reference vector (vx/n, vy/n) as described earlier.

Subsequently, at the next step S127, the four component differences are distributed among four table elements included in the contracted correlation-value table as four table elements associated with the four neighborhood reference vectors respectively.

After the process of the step S127 is completed, the flow of the processing according to the second typical implementation goes on to the next step S128 to produce a result of determination as to whether or not the processes of the steps S123 to S127 have been carried out for all points (x, y) in the target block Io and all their corresponding points (x+vx, y+vy) in the reference block Ii. If the result of the determination indicates that the processes of the steps S123 to S127 have not been carried out yet for all pixels (x, y) in the target block Io and all their corresponding pixels (x+vx, y+vy) in the reference block Ii, the flow of the processing according to the second typical implementation goes back to the step S122 at which another pixel with coordinates (x, y) is specified as another pixel in the target block Io. Then, the processes of the steps S123 to S127 following the step S122 are repeated.

Figure 37:
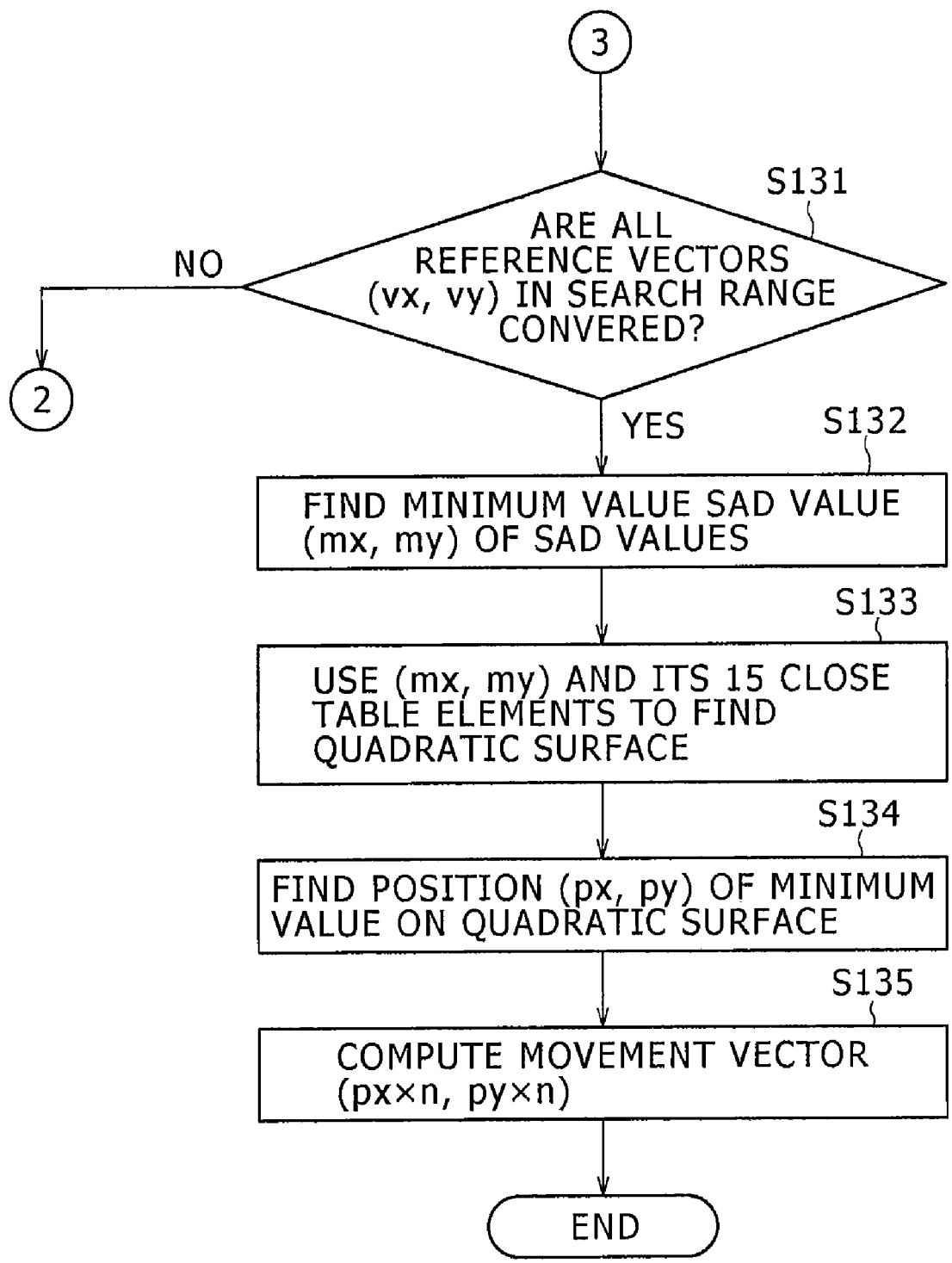
FIG. 37 shows the continuation of the flowchart to be referred to in explanation of the processing carried out to detect a movement vector in accordance with the second typical implementation in the image taking apparatus according to the first embodiment.

If the determination result produced at the step S128 indicates that the processes of the steps S123 to S127 have been carried out for all pixels (x, y) in the target block Io and all their corresponding points (x+vx, y+vy) in the reference block Ii, that is, if the final SAD value SAD (vx, vy) for the current reference vector (vx, vy) has been found, on the other hand, the flow of the processing according to the second typical implementation goes on to a step S131 of the flowchart shown in FIG. 37 to produce a result of determination as to whether or not the processes of the steps S122 to S128 have been carried out for all reference-block locations in the search range 105, that is, for all reference vectors (vx, vy).

If the determination result produced at the step S131 indicates that the processes of the steps S122 to S128 have not been carried out yet for all reference blocks in the search range 105, that is, for all reference vectors (vx, vy), the flow of the processing according to the second typical implementation goes back to the step S121 at which another reference block Ii pointed to by another reference vector (vx, vy) is set at another block position (vx, vy) in the search range 105. Then, the processes of the step S122 and the subsequent steps are repeated.

If the determination result produced at the step S131 indicates that the processes of the steps S122 to S128 have been carried out for all reference-block positions in the search range 105 or for all reference vectors (vx, vy), that is, if all elements of the contracted correlation-value table have each been filled with a final component SAD value, on the other hand, the flow of the processing according to the second typical implementation goes on to a step S132 at which the smallest value among all the component final SAD values stored in all the elements of the contracted correlation-value table or the contracted SAD table is detected at a table-element address (mx, my).

Then, at the next step S133, a quadratic surface is created as a surface approximating the minimum correlation value detected at the table-element address (mx, my) and a plurality of correlation values stored in the shrunk correlation-value table as table elements in the neighborhood of the table-element address (mx, my). As described above, the correlation values are each a SAD value. In the case of this embodiment, the number of correlation values stored in the shrunk correlation-value table as table elements in the neighborhood of the table-element address (mx, my) is set at 15. Then, at the next step S134, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S135, a movement vector (px X n, py X n) with the original magnitude and the original direction is computed by multiplying the minimum-value vector (px, py) by the reciprocal value n of the contraction factor.

The flowchart shown in FIGS. 36 and 37 represents processing carried out in accordance with a block-matching technique according to the second typical implementation to detect a movement vector for one target block. For a segmented frame, a plurality of movement vectors need to be detected for frame segments as shown in FIG. 30. In this case, for each one of the movement vectors to be detected or each of the frame segments, a search range and a contraction factor of 1/n have to be set anew in order to carry out the processing represented by the flowchart shown in FIGS. 36 and 37.

Please keep in mind that it is needless to say that, even in the case of the second typical implementation, in place of the quadratic-surface method described above, the cubic-curve method based on two cubic curves laid on planes oriented the vertical and horizontal directions respectively as described above can also be adopted as a technique to find the minimum-value vector (px, py) pointing to a position detected on the search range with the precision of the fraction level.

Third Typical Implementation

If any of the methods to determine a movement vector in accordance with the embodiment is adopted, the process to determine a movement vector does not end with a failure such as detection of a completely incorrect movement vector even for a one-dimensional contraction factor of 1/64 used for contracting reference vectors as is obvious from the effects exhibited by the method as shown in FIG. 29. Thus, the size of the SAD table used as a typical correlation-value table can be reduced substantially at a two-dimensional shrinking factor of 1/4096 (=1/64×1/64) successfully.

As a matter of fact, an attempt can be made to further reduce the size of a shrunk SAD table (used as a typical correlation-value table), which has been obtained as a result of a contraction process using the two-dimensional shrinking factor of 1/4096 or the one-dimensional contraction factor of 1/64. That is to say, first of all, a shrunk SAD table is obtained by carrying out a first process to detect a movement vector at the one-dimensional contraction factor 1/na of 1/64. Then, the size of the search range (which corresponds to the correlation-value table) is further reduced to result in a new search range with its center coinciding with the position pointed to by the detected movement vector before carrying out a second process to detect a movement vector at a one-dimensional contraction factor 1/nb of typically 1/8. Thus, processes to detect a movement vector are carried out by reducing the one-dimensional contraction factor (that is, increasing the magnitude of 1/n) in order to reduce the resulting vector error to a value within a range of tolerance. By properly setting the one-dimensional contraction factor for the second process to detect a movement vector at a proper value, the movement vector can be detected with a very high degree of precision.

The processing flow of the third typical implementation implementing operations of the hand-movement displacement-vector detection unit 15 is explained by referring to a flowchart shown in FIGS. 38 to 41 as follows.

Figure 38:
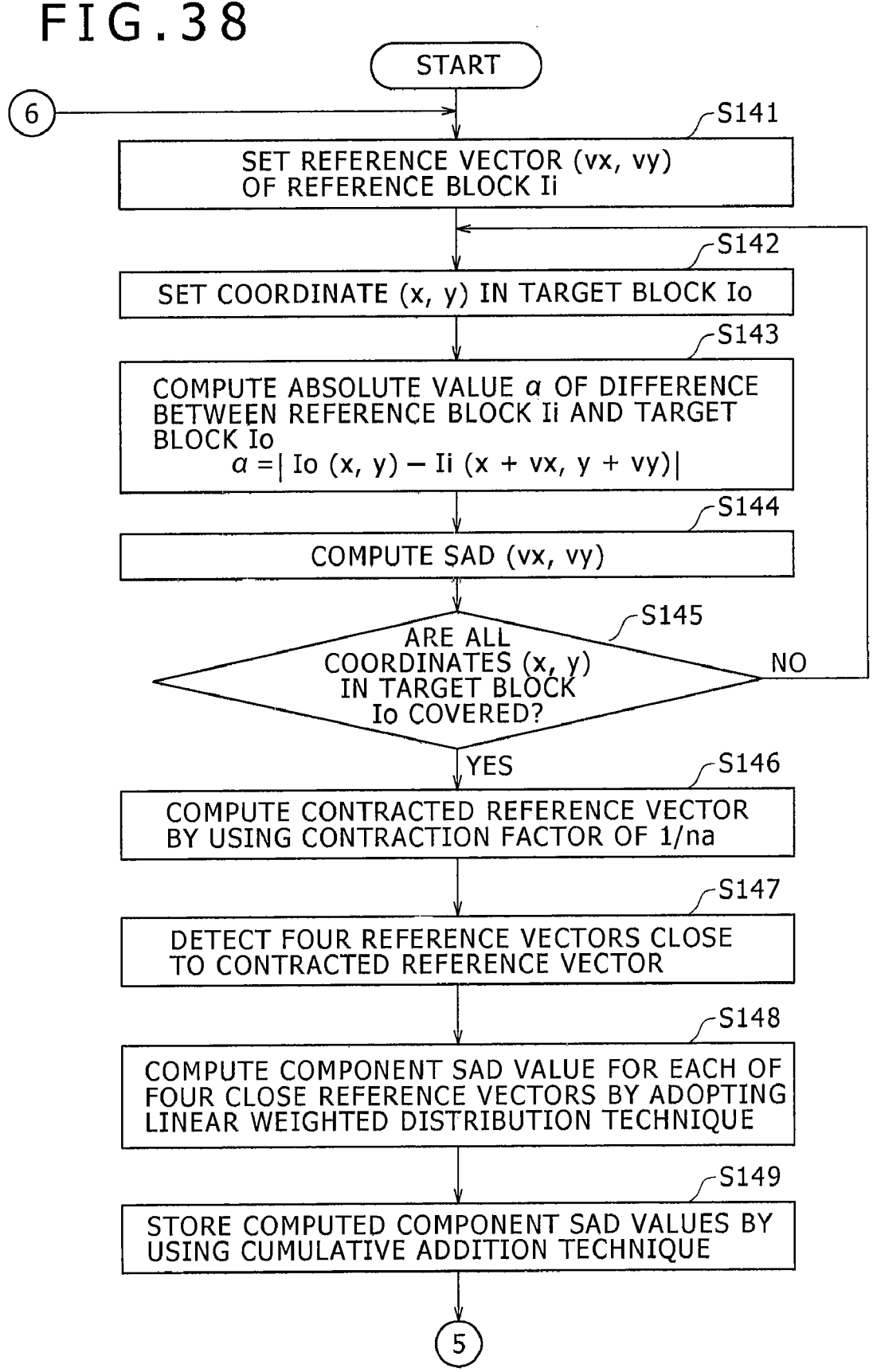
FIG. 38 shows a flowchart to be referred to in explanation of processing carried out to detect a movement vector in accordance with a third typical implementation in the image taking apparatus according to the first embodiment.
Figure 39:
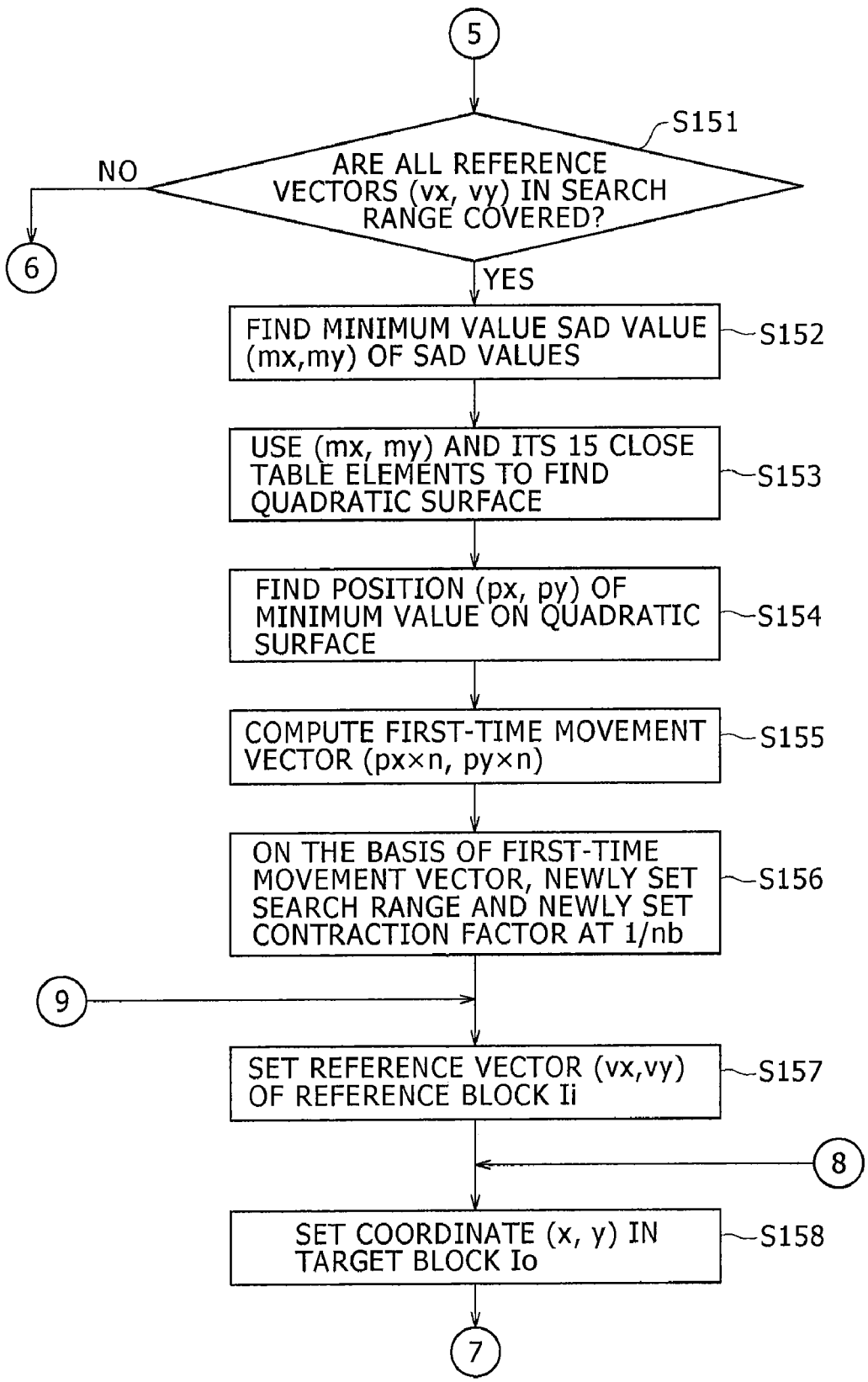
FIG. 39 shows a continuation of the flowchart to be referred to in explanation of the processing carried out to detect a movement vector in accordance with the third typical implementation in the image taking apparatus according to the first embodiment.

The processing represented by the flowchart shown in FIGS. 38 to 41 as processing according to the third typical implementation is basically based on the processing to detect a movement vector in accordance with the first typical implementation. Thus, the processes of steps S141 to S149 of the flowchart shown in FIG. 38 are exactly the same as respectively the processes of the steps S101 to S109 of the flowchart shown in FIG. 34 whereas the processes of steps S151 to S155 of the flowchart shown in FIG. 39 are exactly the same as respectively the processes of the steps S111 to S115 of the flowchart shown in FIG. 35.

In the case of the third typical implementation, however, the processing to detect a movement vector is not ended at the step S155 of the flowchart shown in FIG. 39. Instead, the movement vector detected at the step S155 is used as a first movement vector. Then, at the next step S156, the size of the search range in the same reference frame is further reduced to result in a new search range by using the position pointed to by the detected first movement vector as the center of the new search range with a reduced size and by reducing the one-dimensional contraction factor from 1/na used in the first processing to detect a movement vector to 1/nb used in the second processing where na>nb.

To put it in detail, a movement vector detected in the first movement-vector detection processing points to an approximate block range including a reference block having correlation with the target block to a certain degree. Then, it is possible to newly set a narrower search range centered at the approximate block range including the reference block having correlation with the target block to a certain degree as a new block range to be used in the second processing to detect another movement vector. By using a smaller contraction vector, it can be expected that a second movement vector with a smaller error can be detected.

Figure 40:
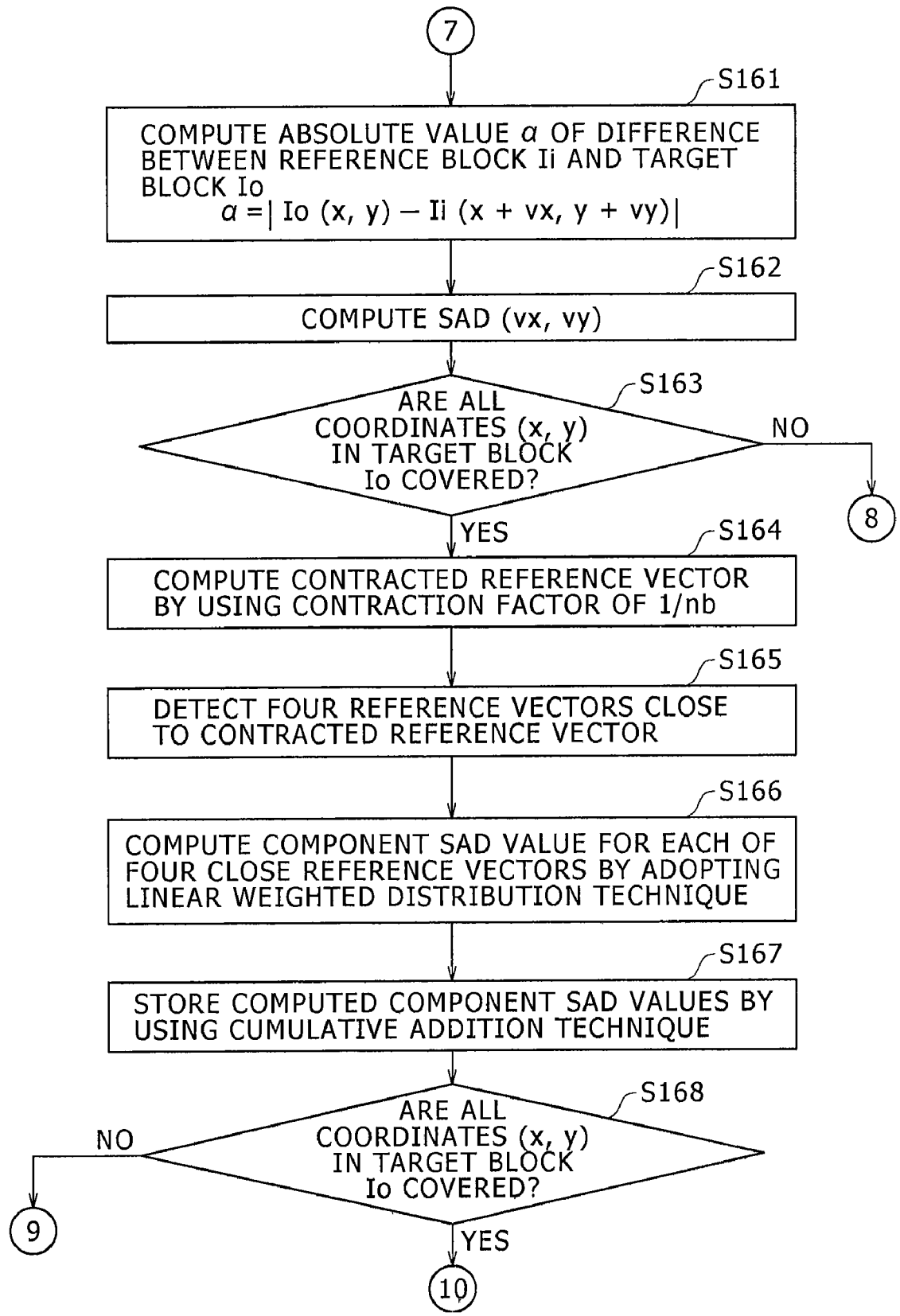
FIG. 40 shows another continuation of the flowchart to be referred to in explanation of the processing carried out to detect a movement vector in accordance with the third typical implementation in the image taking apparatus according to the first embodiment.
Figure 41:
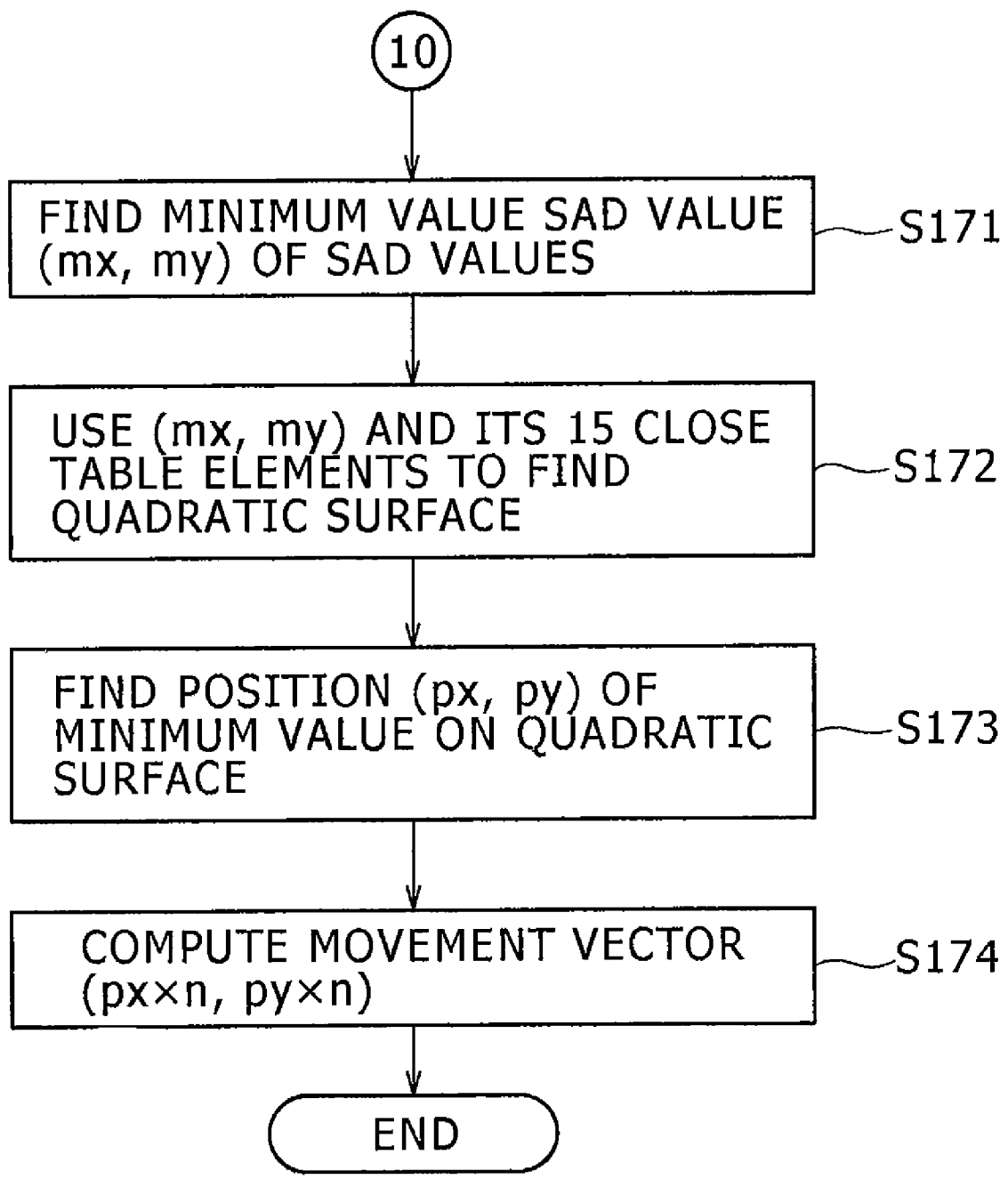
FIG. 41 shows a further continuation of the flowchart to be referred to in explanation of the processing carried out to detect a movement vector in accordance with the third typical implementation in the image taking apparatus according to the first embodiment.

Thus, as described above, at the step S156, a narrower search range and a reduced one-dimensional contraction factor are used to carry out the second processing to detect another movement vector in entirely the same way as the first movement-vector detection processing at steps S157 and S158 of the flowchart shown in FIG. 39, steps S161 to S168 of the flowchart shown in FIG. 40 and steps S171 to S174 of the flowchart shown in FIG. 41. The processes of these steps are entirely the same way as the processes of the steps S101 to S109 of the flowchart shown in FIG. 34 and the processes of the steps S111 to S115 of the flowchart shown in FIG. 35.

By carrying out the second movement-vector detection processing as described above, eventually, a second movement vector is detected at the step S174 as the desired final movement vector.

The method to detect a movement vector in accordance with the third typical implementation is implemented by executing the method to detect a movement vector in accordance with the first typical implementation repeatedly two times. It is needless to say, however, that the method to detect a movement vector in accordance with the first typical implementation can be executed repeatedly more than two times with gradually decreased search ranges and, if necessary, gradually decreased contraction factors.

In addition, it is also needless to say that, in realization of the method to detect a movement vector (px, py) in accordance with the third typical implementation, the method to detect a movement vector (px, py) in accordance with the second typical implementation can be executed in place of the method to detect a movement vector (px, py) in accordance with the first typical implementation. On top of that, in place of the quadratic-surface method described above, the cubic-curve method based on two cubic curves laid on planes oriented in the vertical and horizontal directions respectively can also be adopted as a method to detect a movement vector (px, py) pointing to a position with the precision of the fraction level as is the case the first and second typical implementations described earlier.

Figure 42:
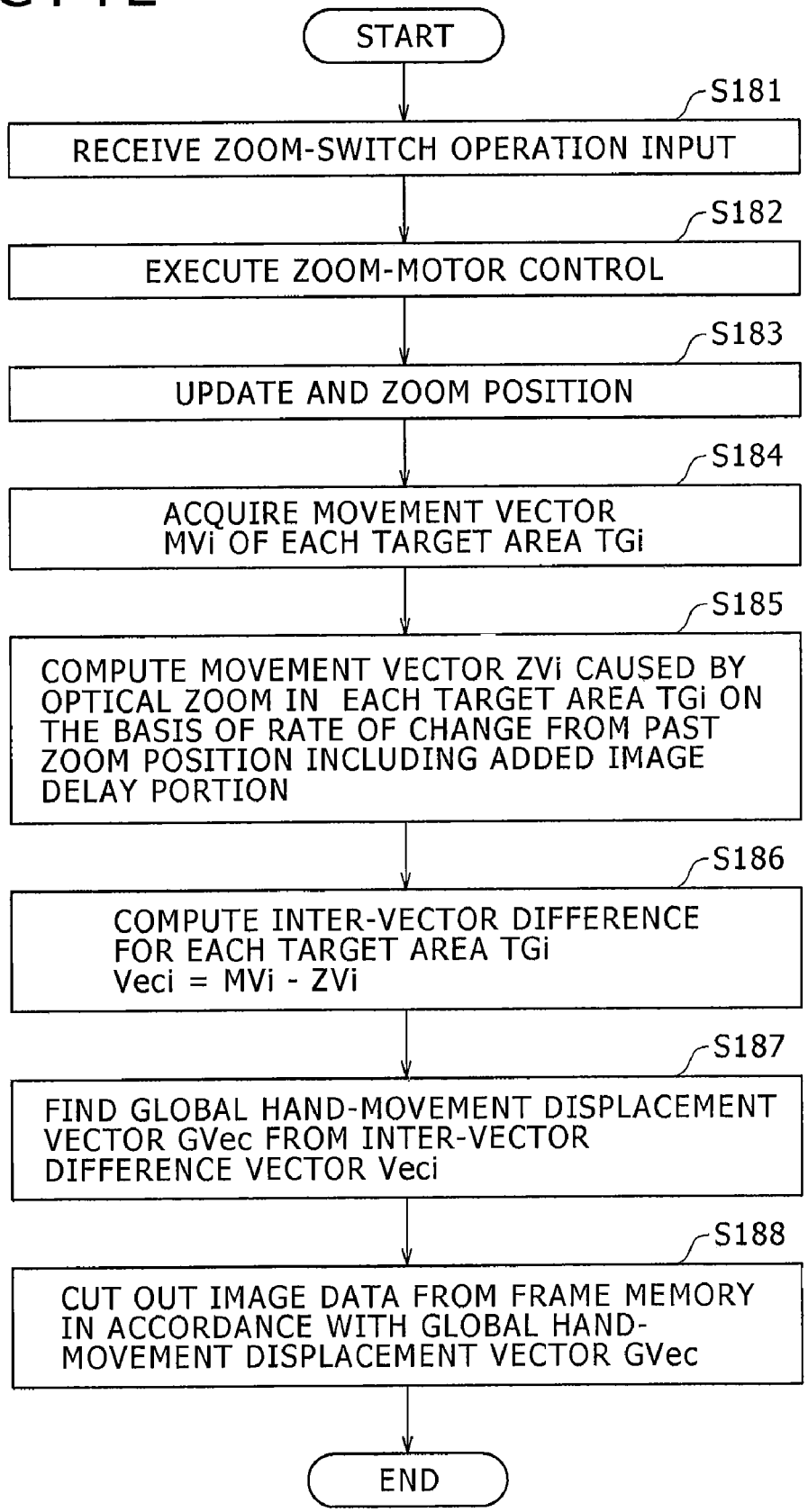
FIG. 42 shows a flowchart to be referred to in explanation of entire processing operations carried out by an image taking apparatus according to the first embodiment.

Flow of the Entire Processing in an Image Taking Process Including a Zoom Operation Next, by referring to a flowchart shown in FIG. 42, the following description explains the flow of processing, which is carried out by the image taking apparatus according to this embodiment when the user operates the zoom switch 7 to carry out a zoom operation as a part of a photographing process. The processing represented by the flowchart shown in FIG. 42 is started when the user operates the zoom switch 7 to carry out a zoom operation as a part of a process to take a moving picture.

As shown in the figure, the flowchart begins with a step S181 at which the CPU 1 receives a zoom operation input entered by the user by operating the zoom switch 7. Then, at the next step S1182, on the basis of the zoom operation input, the CPU 1 generates a zoom control signal CTL for controlling a zoom motor employed in the zoom mechanism unit 8 to serve as a zoom actuator and supplies the signal to the zoom mechanism unit 8.

Subsequently, at the next step S183, the CPU 1 updates the zoom position in frame units of the imager-created image and saves the updated zoom position. Then, at the next step S184, the CPU 1 acquires a movement vector MVi detected for every target area TGi as shown in FIG. 5A from the movement-vector detection processing unit 151.

Subsequently, at the next step S185, an optical-zoom portion vector ZVi caused by an optical zoom operation is computed as a component of the movement vector MVi detected for each target area TGi on the basis of a change in zoom velocity and a rate of change such as a time transition from a past zoom position by including an added movement-delay (or an image-delay) portion on the imager-created image based on a delay of a zoom control process in the zoom mechanism unit 8. The process carried out at the step S185 is the processing performed by the optical-zoom portion vector computation unit 152 employed in the hand-movement displacement-vector detection unit 15 explained earlier by referring to FIG. 1.

Then, at the next step S186, for each target area TGi, a difference vector Veci is computed by subtracting the optical-zoom portion vector ZVi computed at the step S185 from the movement vector MVi detected at the step S184. The process carried out at the step S186 is the processing performed by the optical-zoom portion vector subtraction unit 153 employed in the hand-movement displacement-vector detection unit 15 explained earlier by referring to FIG. 1.

Subsequently, at the next step S187, a global hand-movement displacement vector Gvec is found from the difference vectors Veci computed at the step S186. The process carried out at the step S186 is the processing performed by the global hand-movement displacement-vector computation unit 155 employed in the hand-movement displacement-vector detection unit 15 explained earlier by referring to FIG. 1.

Then, at the next step S188, the resolution conversion unit 16 employed in the image taking apparatus shown in FIG. 2 receives the global hand-movement displacement vector Gvec from the hand-movement displacement-vector detection unit 15 and cuts out image data stored in the frame memory 42 employed in the image memory unit 4 from an address according to the global hand-movement displacement vector Gvec.

Second Embodiment of the Image-Signal Distortion Compensation Apparatus

In the case of the first embodiment shown in FIG. 2, the movement-vector detection processing unit 151 employed in the hand-movement displacement-vector detection unit 15 detects a movement vector between two images stored in the image memory unit 4, which includes two frame memories 41 and 42 for holding the two images respectively. First of all, the digital imager-created image signal received from the data conversion unit 14 is stored as an original frame in the frame memory 41. Then, after the lapse of time corresponding to one frame, the original frame stored in the frame memory 41 is transferred to the frame memory 42 and a new digital imager-created image signal received from the data conversion unit 14 is stored as a reference frame in the frame memory 41. That is to say, the original frame is stored in the frame memory 42 and the reference frame is stored in the frame memory 41. Thus, the timing adopted by the hand-movement displacement-vector detection unit 15 as a timing to detect a movement vector between the original and reference frames is lagging behind the original frame by a period corresponding to one frame.

In the case of a second embodiment, on the other hand, image data being output by the image taking device 11 is observed and processed as the image data of a reference frame in a configuration allowing SAD values to be computed for stream data of a luster scan in a real-time manner. The second embodiment of the present application is exactly identical with the first embodiment described so far except that the configurations of the hand-movement displacement-vector detection unit 15 and the image memory unit 4, which are employed in the second embodiment, are different from those in the first embodiment.

It is to be noted that the configuration of the hand-movement displacement-vector detection unit 15 employed in the second embodiment is also basically identical with that of the first embodiment except that processing carried out by the movement-vector detection processing unit 151 employed in the second embodiment is different from the processing carried out by the movement-vector detection processing unit 151 employed in the first embodiment.

Figure 43:
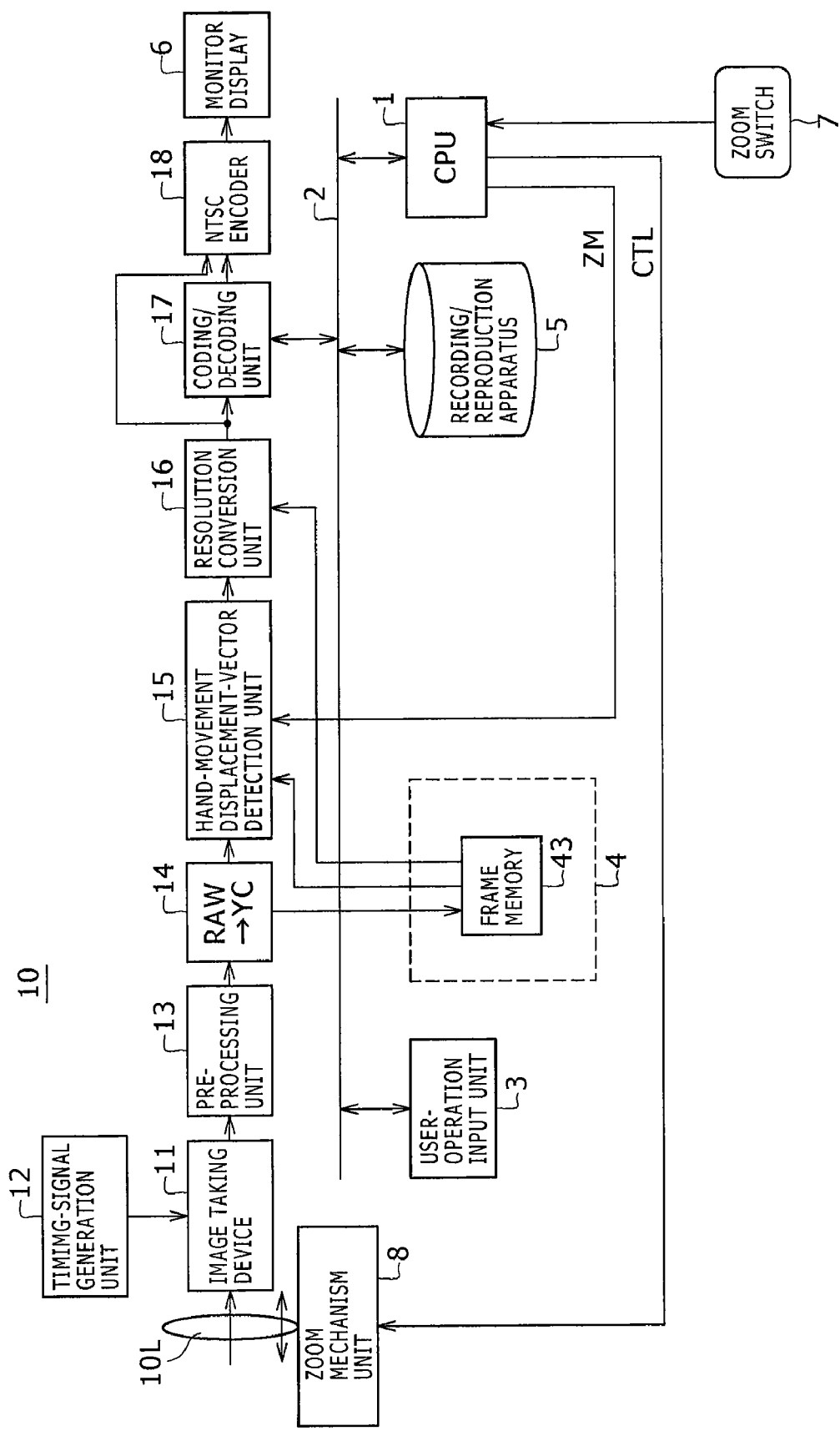
FIG. 43 is a block diagram showing a typical configuration of an image taking apparatus adopting a method to compensate an image signal for distortions in accordance with a second embodiment.

FIG. 43 is a block diagram showing a second embodiment implementing an image taking apparatus. As is obvious from FIG. 43, the configuration of the image signal processing system 10 is exactly identical to the configuration of the image signal processing system 10 implemented by the first embodiment shown in FIG. 2 except that, in the case of this second embodiment, the image memory unit 4 includes one frame memory 43.

In the second embodiment, the original frame serving as the target frame is stored in a frame memory 43 and a frame output by the data conversion unit 14 as a stream is taken as a reference frame. The hand-movement displacement-vector detection unit 15 employed in the first embodiment explained before carries out a process to compute a SAD value as a typical correlation value representing correlation between the target block and a reference block on the basis of image data of two frames stored in the frame memories 41 and 42 respectively. In the case of this second embodiment shown in FIG. 43, on the other hand, image data stored in the frame memory 43 is taken as the image of an original frame serving as a target frame whereas stream image data coming from the data conversion unit 14 is used as the image data of the reference frame, and the hand-movement displacement-vector detection unit 15 carries out a process to compute a SAD value as a typical correlation value representing correlation between the target block on the target frame and a reference block on the reference frame on the basis of image data of these two frames. As the SAD value, typically, a luminance signal component Y is computed as is the case with the first embodiment. However, the SAD value is by no means limited to the luminance signal component Y. For example, a chrominance signal component can also be taken as a SAD value.

As described above, in the case of this second embodiment, stream image data coming from the data conversion unit 14 is used as the image data of a reference frame. In consequence, for a certain pixel on the coming reference frame, a plurality of reference blocks including a pixel serving as a copy of the certain pixel exist at the same time on the reference frame. The existence of such reference blocks is explained by referring to FIG. 44.

Figure 44:
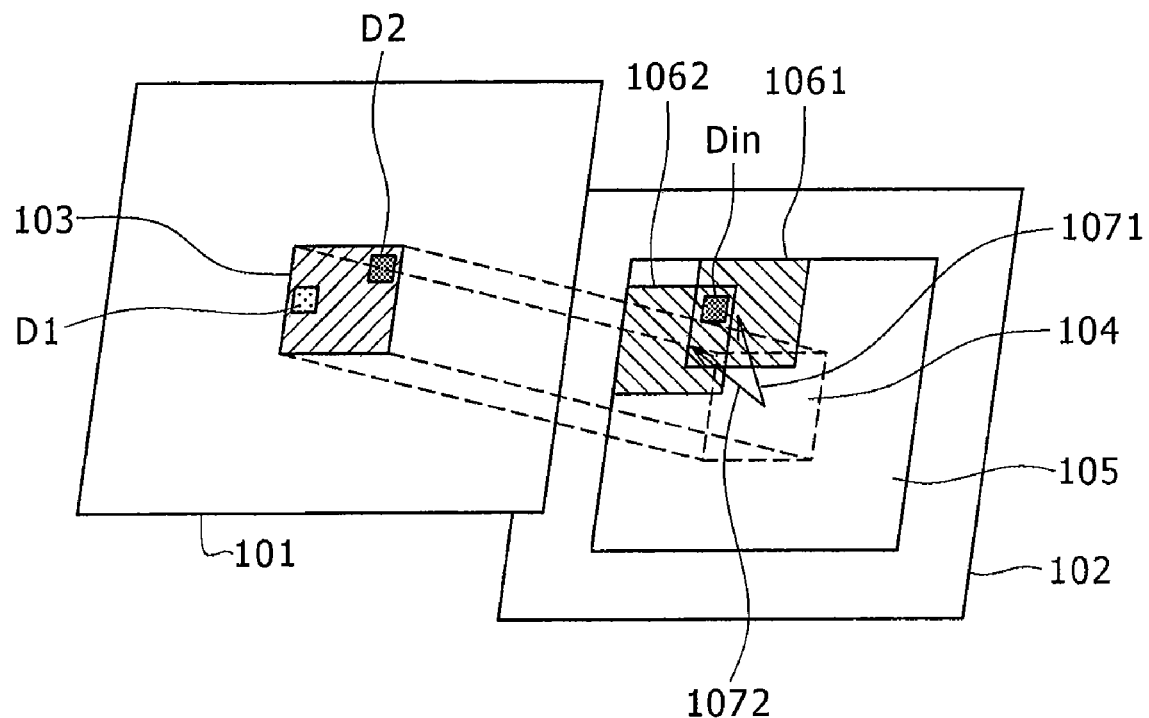
FIG. 44 is an explanatory diagram to be referred to in description of processing to detect a movement vector in the image taking apparatus according to the second embodiment.

As is obvious from FIG. 44, the search range 105 on the reference frame 102 includes an input pixel Din, which is a copy pixel of a pixel D2 on the target block 103 on the original frame 101. The input pixel Din is a pixel included on the left side of a reference block 1061 pointed to by a reference vector 1071 as well as a pixel included at the right upper corner of a reference block 1062 pointed to by a reference vector 1072.

Thus, in processing the reference block 1061 during a process to compute a difference in pixel value between pixels, the pixel value of the input pixel Din has to be compared with a pixel D1 on the target block 103. In processing the reference block 1062 during a process to compute a difference in pixel value between pixels, on the other hand, the pixel value of the input pixel Din has to be compared with a pixel D2 on the target block 103.

In order to make explanation easy to understand, FIGS. 44 and 45 to be described later each show only two reference frames. In actuality, however, a number of reference blocks including the input pixel Din exist.

In the process to compute a SAD value between the target block and a reference block in accordance with this second embodiment, a difference in pixel value is computed by finding the absolute value of the difference between the luminance value Y of the input pixel Din on the reference block 106 being processed and the luminance value Y of a pixel at a point existing on the target block 103 as a point corresponding to the point of the input pixel Din. Each time the absolute value of such a difference is computed, the absolute value of the difference is cumulatively added to a temporary sum stored previously in a table element, which is included in a SAD table 108 as a table element according to a reference vector 107 associated with the reference block 106, as a sum of the absolute values of such differences. The process to compute the absolute value of a difference in pixel value and the process to store the absolute value in a table element are carried out for every reference vector 107 associated with the reference frame 106 including the input pixel Din.

Let us assume for example that the reference block 1061 is a reference block currently being processed. In this case, a difference in pixel value is computed by finding the absolute value of the difference between the luminance value Y of the input pixel Din on the reference block 1061 and the luminance value Y of a pixel D1 at a point existing on the target block 103 as a point corresponding to the point of the input pixel Din. Then, the computed absolute value of the difference is cumulatively added to a temporary sum stored previously in a correlation-value table element (or a SAD table element) 1091, which is included in a correlation-value table (or a SAD table) 108 shown in FIG. 45 as a table element according to a reference vector 1071 associated with the reference block 1061, as a sum of the absolute values of such differences. The process to compute the absolute value of a difference in pixel value and the process to cumulatively add the computed absolute value to a temporary sum computed and stored previously in the SAD table element 1091 are carried out for every reference vector 107 associated with the reference frame 106 including the input pixel Din. For example, the reference vector 1072 is associated with the reference block 1062 also including the input pixel Din. In this case, the process to compute the absolute value of a difference in pixel value and the process to cumulatively add the computed absolute value to a temporary sum computed and stored previously in the SAD table element 1092, which is included in the correlation-value table (or the SAD table) 108 shown in FIG. 45 as a table element according to a reference vector 1072 associated with the reference block 1062, are carried out for the reference vector 1072 as follows. When the reference block 1062 is processed, a difference in pixel value is computed by finding the absolute value of the difference between the luminance value Y of the input pixel Din on the reference block 1062 and the luminance value Y of a pixel D2 at a point existing on the target block 103 as a point corresponding to the point of the pixel Din. Then, the computed absolute value of the difference is cumulatively added to a temporary sum stored previously in a SAD table element 1092, which is included in the SAD table 108 shown in FIG. 45 as a table element according to the reference vector 1072 associated with the reference block 1062, as a sum of the absolute values of such differences.

The processing carried out on all reference blocks 106 (such as the reference blocks 1061 and 1062) each including the input pixel Din as described above is carried out on for all input pixels Din in the search range 105 and, as the processing is done for all the input pixels Din in the search range 105, each table element 109 of the SAD table 108 contains a final SAD value and the creation of the SAD table 108 is completed. That is to say, the SAD table 108 is created in a real-time manner.

The first frame of a digital imager-created image signal received from the data conversion unit 14 is merely stored in the frame memory 43 and not subjected to any other processing such as processing to compute a SAD value in the hand-movement displacement-vector detection unit 15.

After the first frame of a digital imager-created image signal received from the data conversion unit 14 is stored in the frame memory 43, the hand-movement displacement-vector detection unit 15 receives the second frame and computes SAD values between the first and second frames for every reference block in the first frame. In this case, the hand-movement displacement-vector detection unit 15 reads out image data of all reference blocks, which are considered to be reference blocks included in the first frame as reference blocks to be compared with a target block in the second frame being received from the data conversion unit 14, from the frame memory 43 through the system bus 2 and computes SAD values for each of the reference blocks with respect to the target block as explained earlier by referring to FIGS. 44 and 45. Then, the hand-movement displacement-vector detection unit 15 cumulatively adds a SAD value computed for each particular one of the reference blocks to a SAD value stored earlier in the SAD table at an address associated with the particular reference block.

Also in the case of the second embodiment, the movement-vector detection processing unit 151 creates a SAD table for each of a plurality of search ranges set in the first frame serving as a reference frame as shown for example in FIG. 30. Then, for each specific one of the SAD tables, the minimum of SAD value is found and a reference vector corresponding to the minimum SAD value is identified as a movement vector for the specific SAD table.

Then, by also considering transitions for movement vectors detected in the past, the hand-movement displacement-vector detection unit 15 finds a global hand-movement displacement vector for the frame from the movement vectors each identified for one of all the search ranges on the frame. Finally, the hand-movement displacement-vector detection unit 15 supplies the detected global hand-movement displacement vector as a control signal to the resolution conversion unit 16 provided at the succeeding stage.

In accordance with the global hand-movement displacement vector received from the hand-movement displacement-vector detection unit 15, the resolution conversion unit 16 carries out a process to cut out image data of the delayed frame represented by the digital imager-created image signal stored in the frame memory 43 and convert the frame into a frame having a necessary resolution and a necessary size. By cutting out image data of the frame represented by the digital imager-created image signal stored in the frame memory 43 in accordance with the global hand-movement displacement vector received from the hand-movement displacement-vector detection unit 15, the image obtained as a result of the conversion process is an image free of distortions caused by a hand movement and a focal plane phenomenon.

Figure 45:
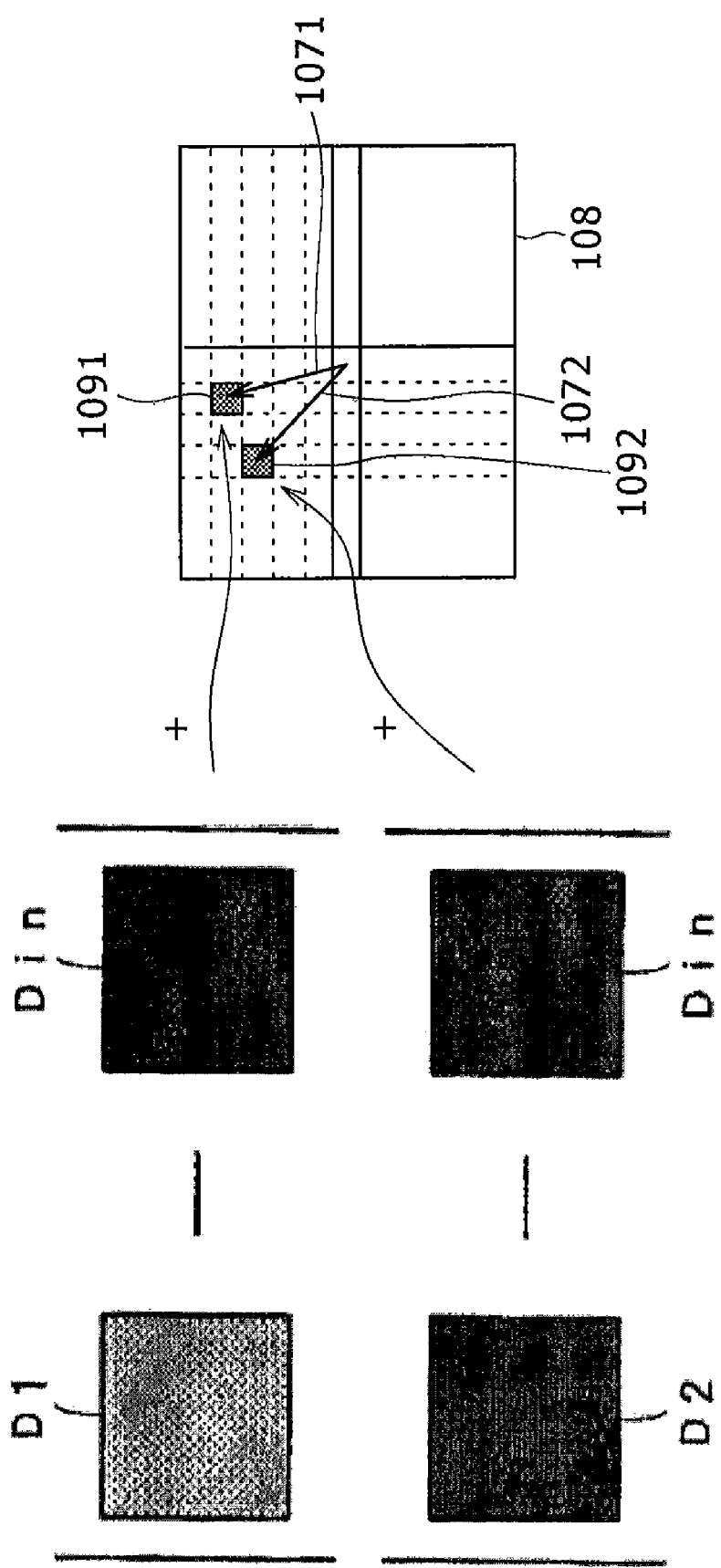
FIG. 45 is an explanatory diagram to be referred to in description of processing to detect a movement vector in the image taking apparatus according to the second embodiment.

The explanation with reference to FIG. 45 holds true for a case of applying the technique in the related art to a process to compute SAD values in a real-time manner. As described before by referring to FIG. 45, the SAD table elements 1091 and 1092 are each a typical SAD table element 109 included in the SAD table 108 as elements associated with the reference vectors 1071 and 1072 respectively. In the case of this second embodiment, on the other hand, each table element 109 of the correlation-value table (or the SAD table) 108 is not a final SAD value, which is a cumulative sum of the absolute values of differences in pixel value as described above. Instead, much like the first embodiment described before, the SAD table 108 is shrunk into a contracted correlation-value table (or a contracted SAD table) and each table element of the contracted correlation-value table (or the contracted SAD table) is a value obtained by executions the steps of:

computing the absolute difference of a difference in pixel value between an input pixel in the search range on a reference frame 106 and the corresponding pixel on the target frame;

contracting a reference vector 107 pointing to a reference block 106 at a contraction factor of 1/n;

splitting the computed absolute difference into a plurality of component absolute differences by adoption of the linear weighted distribution technique; and cumulatively adding the component absolute differences to temporary sums previously computed and stored in a plurality of table elements associated with a plurality of respective neighborhood contracted reference vectors existing in close proximity to a contracted vector obtained as a result of contracting the reference vector 107.

After the contracted SAD table is completed, a process to detect an accurate movable vector in accordance with the second embodiment can be carried out by adoption of entirely the same techniques as the first embodiment. As explained earlier, the typical techniques adopted by the first embodiment are the quadratic-surface technique and the technique based on cube curves laid on planes oriented in the vertical and horizontal directions.

Typical Processing Operations of the Movement-Vector Detection Processing Unit 151

Figure 46:
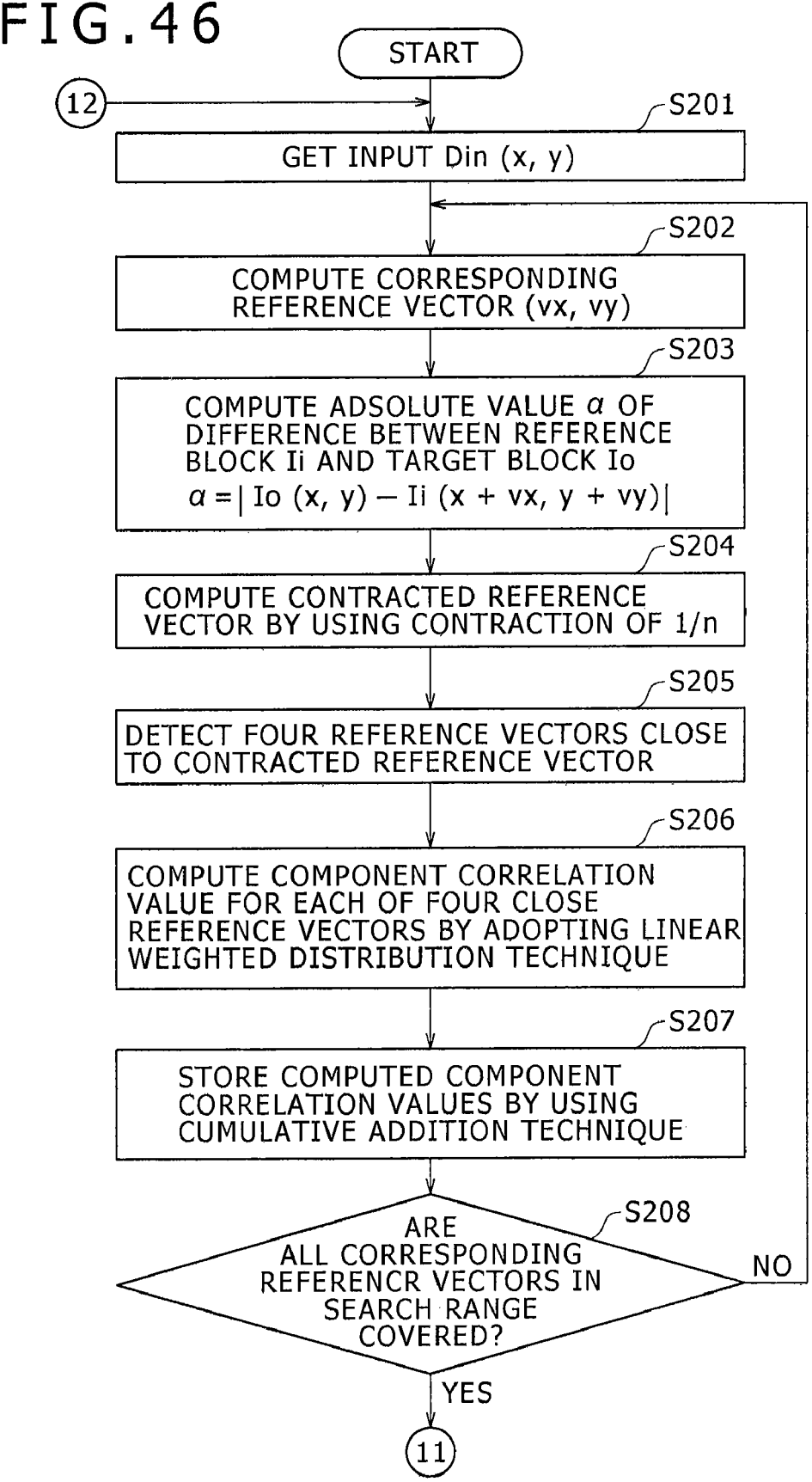
FIG. 46 shows a flowchart to be referred to in explanation of the processing carried out to detect a movement vector in the image taking apparatus according to the second embodiment.
Figure 47:
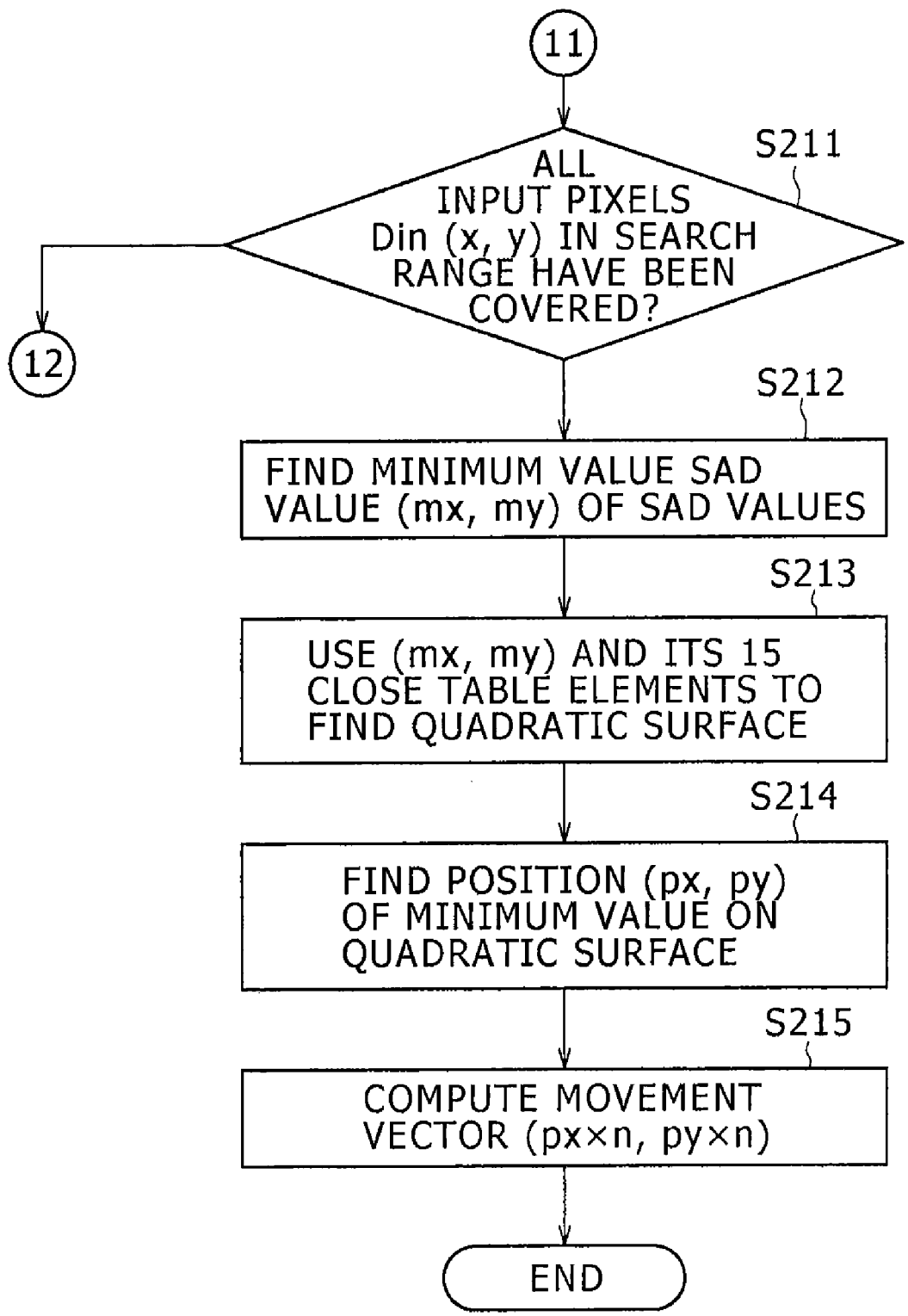
FIG. 47 shows the continuation of the flowchart to be referred to in explanation of the processing carried out to detect a movement vector in the image taking apparatus according to the second embodiment.
Figure 48A:
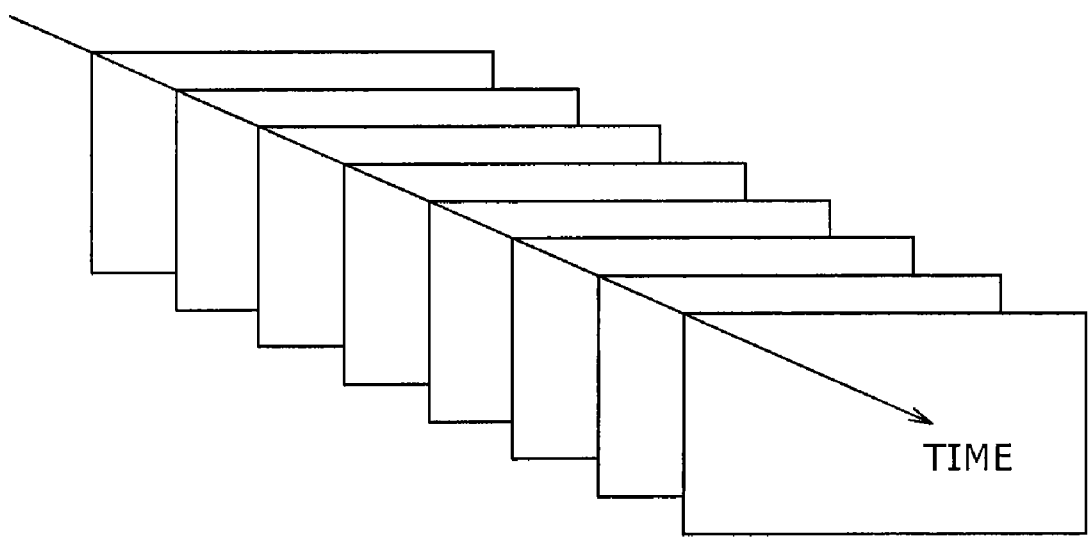
FIGS. 48A and 48B are each an explanatory diagram to be referred to in description of an effect caused by a hand movement as an effect on an imager-created image.
Figure 48B:
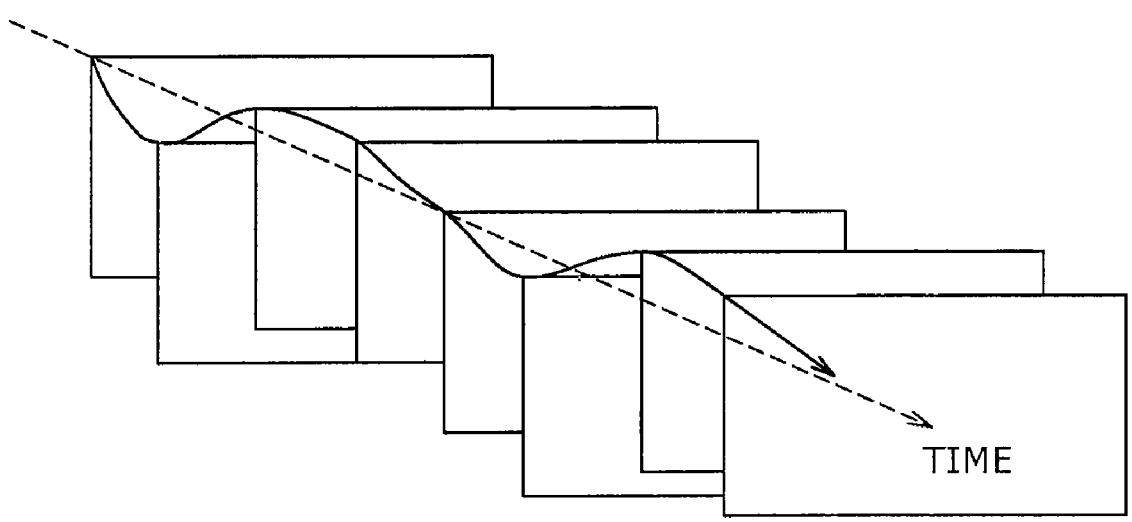
Figure 49:
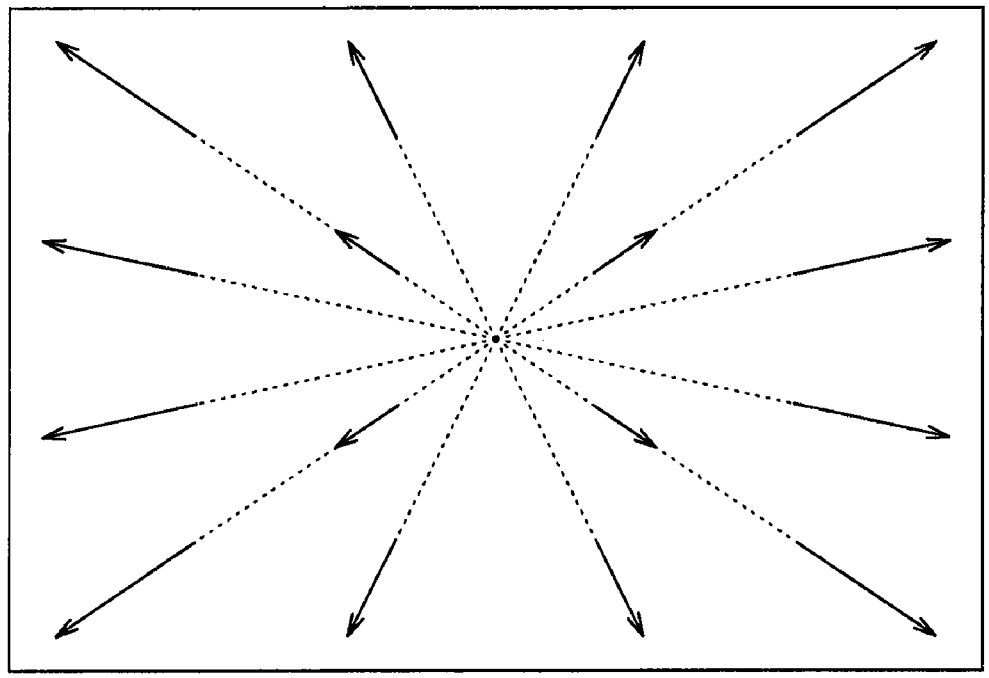
FIG. 49 is an explanatory diagram to be referred to in describing a movement of an imager-created image obtained as a result of an optical zoom operation.
Figure 50:
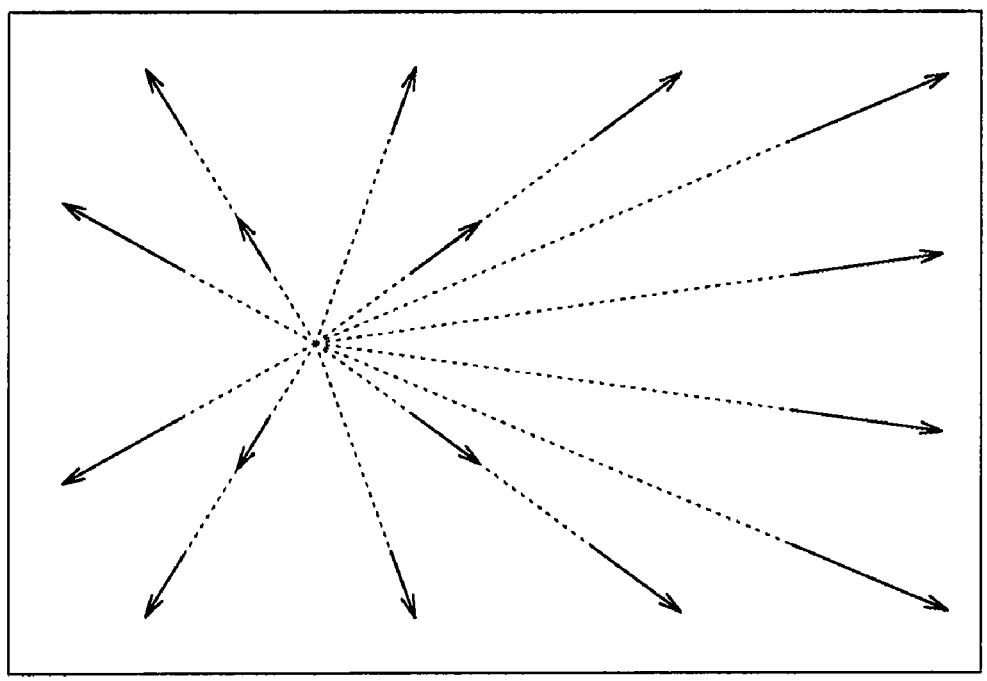
FIG. 50 is an explanatory diagram to be referred to in describing a movement of an imager-created image obtained as a result of an optical zoom operation accompanied by a hand movement.

FIGS. 46 and 47 show a flowchart representing processing carried out by the movement-vector detection processing unit 151 employed in the hand-movement displacement-vector detection unit 15 according to the second embodiment to detect a movement vector. It is to be noted that in order to make the explanation easy to understand, the flowchart shown in FIGS. 46 and 47 represents processing carried out on data of an imager-created image of one frame.

As shown in the figure, the flowchart begins with a step S201 at which the hand-movement displacement-vector detection unit 15 receives pixel data Din (x, y) of a pixel at any point (x, y) on a frame included in an input image as a reference frame. Then, at the next step S202, a reference vector (vx, vy) pointing to one of a plurality of reference blocks Ii each including the input pixel Din (x, y) at the position (x, y) is specified.

Let us have notation Ii (x, y) denote the pixel value of the pixel at the point (x, y) on the reference block Ii pointed to by the reference vector (vx, vy) and notation Io (x−vx, y−vy) denotes the pixel value of a pixel at a point (x−vx, y−vy) on the target block Io. In the following description, the point (x−vx, y−vy) in the target block Io is said to be a point corresponding the point (x, y) in the reference block Ii. Then, at the next step S203, the absolute value α of the difference between the pixel value Ii (x, y) and the pixel value Io (x−vx, y−vy) is computed in accordance with Eq. (3) as follows:

$$\alpha = |Io(x-vx, y-vy) - Ii(x,y)| \quad (3)$$

Then, at the next step S204, a contracted reference vector (vx/n, vy/n) is computed by contracting the reference vector (vx, vy) pointing to the reference block Ii at a contraction factor of 1/n. In general, the x-direction and y-direction values (vx/n, vy/n) of the resulting contracted reference vector each include a fraction part.

Subsequently, at the next step S205, a plurality of neighborhood reference vectors located at in the neighborhood of the contracted reference vector (vx/n, vy/n) are identified. As described earlier, the neighborhood reference vectors are each a contracted reference vector having an integer vx/n value and an integer vy/n value. In this embodiment, the number of neighborhood reference vectors is set at four. Then, at the next step S206, the absolute value α found at the step S203 as the difference in pixel value is split into four component differences by adoption of the linear weighted distribution technique based on relations between positions pointed to by the neighborhood reference vectors and a position pointed to by the contracted reference vector (vx/n, vy/n) as described earlier. Subsequently, at the next step S207, the four component differences are distributed among four table elements included in the contracted correlation-value table as four table elements associated with the four neighborhood reference vectors respectively.

After the process of the step S207 is completed, the flow of the processing according to the second embodiment goes on to the next step S208 to produce a result of determination as to whether or not the processes of the steps S203 to S207 have been carried out for all reference vectors (vx, vy) each pointing to a reference block Ii including the input pixel Din (x, y). If the result of the determination indicates that the processes of the steps S203 to S207 have not been carried out yet for all reference vectors (vx, vy) each pointing to a reference block Ii including the input pixel Din (x, y), the flow of the processing goes back to the step S202 at which another reference vector (vx, vy) pointing to one of a plurality of reference blocks Ii each including the input pixel Din (x, y) is specified. Then, the processes of the steps S203 to S207 following the step S202 are repeated.

If the determination result produced at the step S208 indicates that the processes of the steps S203 to S207 have been carried out for all reference vectors (vx, vy) each pointing to a reference block Ii including the input pixel Din (x, y), on the other hand, the flow of the processing according to the second embodiment goes on to a step S211 of the flowchart shown in FIG. 37 to produce a result of determination as to whether or not the processes of the steps S202 to S208 have been carried out for all input pixels Din (x, y) in the search range 105. If the result of the determination indicates that the processes of the steps S202 to S208 have not been carried out yet for all input pixels Din (x, y) in the search range 105, the flow of the processing according to the second embodiment goes back to the step S201 at which pixel data Din (x, y) of another pixel at another point (x, y) on a frame is received. Then, the processes of the subsequent steps are carried out.

If the determination result produced at the step S211 indicates that the processes of the steps S202 to S208 have been carried out for all input pixels Din (x, y) in the search range 105, on the other hand, the flow of the processing according to the second embodiment goes on to a step S212 at which the smallest value among all the component final SAD values stored in all the elements of the contracted correlation-value table or the contracted SAD table is detected at a table-element address (mx, my).

Then, at the next step S213, a quadratic surface is created as a surface approximating the minimum correlation value detected at the table-element address (mx, my) and a plurality of correlation values stored in the shrunk correlation-value table as table elements in the neighborhood of the table-element address (mx, my). As described above, the correlation values are each a SAD value. In the case of this second embodiment, the number of correlation values stored in the shrunk correlation-value table as table elements in the neighborhood of the table-element address (mx, my) is set at 15. Then, at the next step S214, a minimum-value vector (px, py) pointing to a position on the X-Y plane at precision of the fraction level is detected as a vector corresponding to the minimum SAD value on the quadratic surface. The position pointed to by the minimum-value vector (px, py) is a position corresponding to the minimum SAD value on the quadratic surface.

Then, at the last step S215, a movement vector (px X n, py X n) with the original magnitude and the original direction is computed by multiplying the minimum-value vector (px, py) by the reciprocal value n of the contraction factor as shown in FIG. 6.

It is to be noted that, also in the case of the second embodiment, in place of the quadratic-surface method described above, the cubic-curve method based on two cubic curves laid on planes oriented the vertical and horizontal directions respectively can also be adopted as a method to detect a movement vector (px, py) pointing to a position with the precision of the fraction level as is the case with the first to third typical implementations of the first embodiment described earlier.

In addition, it is needless to say that, also in the case of the second embodiment, the processing to detect a movement table by using a contracted SAD table can be carried out repeatedly at two or more stages while narrowing the search range and, if necessary, changing the contraction factor as is the case with the third typical implementation of the first embodiment described earlier.

The second embodiment offers merits that the size of the frame memory can be reduced by one frame in comparison with the first embodiment and, hence, the time it takes to store an input image in the frame memory can be shortened. It is needless to say that the effect of the memory-size reduction can be demonstrated. However, the short time it takes to store an input image in the frame memory is also regarded as an important feature in recent years. In a system for handling a moving picture, particularly, the short time it takes to store an input image in the frame memory by itself leads to reduction of the system delay. Thus, elimination of the sense of incompatibility caused by discrepancies between the actual object of photographing and its image appearing on a display panel has a big effect on efforts to solicit the user for its interest in the product.

Other Embodiments and Other Implementations

The hand-movement displacement-vector detection unit 15 can be implemented as hardware or a DSP (Digital Signal Processor). As an alternative, the hand-movement displacement-vector detection unit 15 can also implemented as software executed by the CPU 1. By the same token, the resolution conversion unit 16 can be implemented as hardware or a DSP (Digital Signal Processor). As an alternative, the resolution conversion unit 16 can also implemented as software executed by the CPU 1.

In addition, in the case of the first and second embodiments described above, it is assumed that the movement-vector detection processing unit 151 takes the horizontal-direction contraction factor equal to the vertical-direction contraction factor. However, it is also possible to provide a configuration in which the horizontal-direction contraction factor and the vertical-direction contraction factor can also be set independently of each other at values different from each other.

Moreover, in the case of the embodiments described above, a SAD value is computed for every pixel of a reference block and every corresponding pixel of the target block. It is also possible, however, to provide a configuration in which a SAD value is computed only for k pixels as is the case of an embodiment described above where notation k denotes an integer.

In the movement-vector detection processing unit 151 explained as the second embodiment for carrying out processing in a real-time manner, for the purposes of reducing the processing cost and the processing time, in many cases, a SAD value is computed only for representative points of the target block and corresponding points in each of reference blocks so that a frame memory provided by the present application is demanded to have only a storage capacity for holding data of only the representative points of each target block in the frame. Thus, the size of the frame memory can be decreased substantially. On top of that, in addition to the frame memory, a representative-point memory with a small size can also be provided locally as a local memory for storing image data of target blocks on an original frame used a target frame. In this way, the bandwidth of accesses to the image memory unit implemented as a global DRAM can be reduced.

In addition, in the case of the first and second embodiments described above, the absolute value of a difference in pixel value and a SAD value are each calculated as a correlation value by processing only luminance values Y. In order to detect a movement vector, however, the processed pixel value is not limited to the luminance value Y. That is to say, the chrominance value Cb/Cr can also be taken as the processed pixel value as well. Moreover, raw data before being converted into a luminance value Y and a chrominance value Cb/Cr can also be taken as the processed pixel value in the processing to detect a movement vector.

It is to be noted that, in accordance with the present application, the process to compute a SAD value is carried out by adoption of a new method by which the reference vectors are contracted. However, a SAD value can also be computed by carrying out the SAD computation processing in the related art explained earlier by referring to FIGS. 8 to 10.

Furthermore, in the case of the embodiments described above, the number of target areas set in one frame is 4×4=16 where four is the number of target-area rows arranged in the vertical direction of the frame and also the number of target-area columns arranged in the horizontal direction. It is needless to say, however, that the number of target areas set in one frame is by no means limited to 16.

Moreover, in the case of the embodiments described above, an image is compensated for a distortion caused by a movement of a hand of the user who operates the image taking apparatus. It is needless to say, however, that in place of a movement of a hand of the user, an image can also be compensated for a distortion caused by a bias force of vibration resulting in a positional displacement relative to the image taking device in the horizontal and/or vertical directions of the imager-created image.

In addition, in the case of the embodiments described above, a CMOS imager is employed as a solid-state image taking device of an X-Y address type. It is needless to say, however, the image taking device is by no means limited to the CMOS imager.

On top of that, the present application can be applied to not only a camera but also another image taking apparatus such as a hand phone and a portable information terminal, which are each provided with an image taking device. In addition, the present application can be applied to not only an apparatus operated by a hand of the user as an apparatus for taking a picture of a photographing object, but also an apparatus installed at a fixed location possibly affected by an external force such as vibration or the like and an apparatus installed in a vehicle or the like as an apparatus for taking a picture of a photographing object by making use of an image taking device. Examples of the apparatus installed at a fixed location are a personal computer and a TV phone.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of compensating an imager-created image received from an image taking device for distortion, said method comprising:
 (a) causing a movement-vector detection unit to:
  (i) receive data of said imager-created image; and
  (ii) detect a movement vector for at least one screen of said imager-created image;
 (b) in response to an input for an optical zoom operation being received from a user:
  (i) causing an optical-zoom portion vector computation unit to determine an optical-zoom portion vector based on zoom information associated with the optical zoom operation, the determined optical-zoom portion vector corresponding to an image movement of said imager-created image resulting from the optical zoom operation;
  (ii) causing an optical-zoom portion vector subtraction unit to determine a difference vector by subtracting said determined optical-zoom portion vector from said detected movement vector; and
  (iii) causing a global hand-movement displacement vector computation unit to determine a global hand-movement displacement vector for said imager-created image based on the determined difference vector;
 (c) in response to no input for the optical zoom operation being received from the user, causing the global hand-movement displacement vector computation unit to determine the global hand-movement displacement vector for said imager-created image based on detected movement vector; and
 (d) causing a hand-movement compensation unit to compensate said imager-created image for any distortion caused by a hand movement of the user based on said determined global hand-movement displacement vector.

2. The method of claim 1, which includes:
 (a) causing said movement-vector detection unit to divide said imager-created image in at least one of a horizontal direction and a vertical direction to form a plurality of picture divisions for the at least one screen; and
 (b) for each of the plurality of picture divisions:
  (i) causing the movement-vector detection unit to detect the movement vector for said picture division;
  (ii) causing said optical-zoom portion vector computation unit to determine the optical-zoom portion vector for said picture division; and
  (iii) causing said optical-zoom portion vector subtraction unit to subtract the determined optical-zoom portion vector of said picture division from said detected movement vector of said picture division.

3. The method of claim 2, wherein for a designated one of the picture divisions, said determined optical-zoom portion vector is based on: (i) a length of time from a start of said optical zoom operation to an end of said optical zoom operation, (ii) a zoom velocity, and (ii) a distance between a center position of said designated picture division and a corresponding position of said imager-created image.

4. The method of claim 2, which includes causing said movement-vector detection unit to:
 (a) detect information on an image difference between a designated one of said picture divisions on an observed screen and said designated picture division on an original screen leading ahead of said observed screen;
 (b) provide at least one target block having a plurality of pixels arranged in the horizontal and vertical directions at predetermined locations in each picture division on the original screen, the at least one target block having a predetermined size;
 (c) provide a plurality of reference blocks at locations corresponding to a search range on the observed screen, each reference block having a size equal to said predetermined size of said at least one target block;
 (d) search said search range of the observed screen for a designated one of the reference blocks, the designated reference block having a positional correlation with said at least one target block; and
 (e) detect said movement vector, the detected movement vector representing a magnitude and a direction of any shift between: (i) a position on the observed screen corresponding to said at least one target block on the original screen; and (ii) a position on the observed screen of said designated reference block.

5. The method of claim 4, which includes causing said movement-vector detection unit to detect said movement vector for each of said picture divisions by:
 (a) causing a difference absolute value sum computation unit, for each one of said reference blocks, to determine a sum of the absolute values of differences in pixel value between each pixel in said reference block and each pixel at a corresponding position on said at least one target block;
 (b) causing a contracted reference-vector setting unit to:
  (i) determine a plurality of reference vectors, each reference vector representing a magnitude and a direction of any shift between: (A) a position on the observed screen corresponding to said at least one target block on the original screen; and (B) a position on the observed screen of one of said reference blocks; and
  (ii) contract each said reference vector by a predetermined contraction factor to result in a plurality of contracted reference vectors;
 (c) causing a sum-of-absolute-difference table creation unit to generate a shrunk sum-of-absolute-difference table including a plurality of table elements, the number of table elements being based on the number of said predetermined contracted reference vectors and said contraction factor, each of said table elements storing a value determined based on said determined sum of the absolute values of said differences in pixel value for one of said reference blocks; and
 (d) causing a movement-vector computation unit to determine said movement vector for each of said picture divisions between said observed screen and said original screen based on at least one of the contracted reference vectors, the at least one contracted reference vector corresponding to a smallest one of the values stored in said table elements of said shrunk sum-of-absolute-difference table; and (e) causing said sum-of-absolute-difference table creation unit to generate the shrunk sum-of-absolute-difference table:
  (i) causing a neighborhood reference vector detection unit to detect a plurality of neighborhood reference vectors, each neighborhood reference vector corresponding to one of said contracted reference vectors and having a vector quantity substantially similar to the vector quantity of said corresponding one of said contracted reference vectors;
  (ii) causing a sum-component computation unit to determine a plurality of sum components, each one of the sum components being associated with one of the detected neighborhood reference vectors and corresponding one of said contracted reference vectors, the determination based on the determined sum of the absolute values of said differences in pixel value for the reference block which corresponds to said contracted reference vector; and
  (iii) causing a component-total computation unit to determine, for one of the detected neighborhood reference vectors, a total of the determined sum components, by cumulatively adding each of said determined sum components to a cumulative total obtained for said detected neighborhood reference vector.

6. A method of compensating an imager-created image for a distortion in accordance with claim 4, whereby
  said step of detecting a movement vector in said movement-vector detection process for each of said picture divisions is executed by carrying out the sub-steps of:
  setting at least a target block having a predetermined size equal to the size of a plurality of pixels at predetermined locations in each of said picture divisions on said original screen;
  setting a plurality of reference blocks each having a size equal to said predetermined size of said target block in a search range set in said reference screen;
  searching said search range for a reference block having a strongest correlation with said specific target block; and
  detecting said movement vector representing the magnitude and direction of a shift over said reference screen from a position corresponding to said specific target block to the position of said detected reference block;
  said sub-step of detecting said movement vector is executed by carrying out
  a difference absolute value sum computation process for each specific one of said reference blocks as a process of finding a sum of the absolute values of differences in pixel value between all pixels in said specific reference block and all pixels at corresponding positions on said specific target block,
  a contracted reference-vector setting process of setting reference vectors each representing the magnitude and direction of a shift over said reference screen from a position corresponding to said specific target block to the position of one of said reference blocks and contracting said reference vectors at a predetermined contraction factor to result in contracted reference vectors,
  a sum-of-absolute-difference table creation process of creating a shrunk sum-of-absolute-difference table including table elements, the number of which is determined on the basis of the number of said contracted reference vectors and said contraction factor, and allocating each of said table elements as a location to be used for storing a value computed from sums each found for one of said reference blocks as said sum of the absolute values of said differences in pixel values, and
  a movement-vector computation process of computing said movement vector for each of said picture divisions as a movement vector between said reference screen and said original screen by making use of at least a contracted reference vector corresponding to a smallest one among values each stored in said shrunk sum-of-absolute-difference table as said sum of the absolute values of said differences in pixel values, and
  said sum-of-absolute-difference table creation process is carried out by execution of
  a neighborhood reference vector detection sub-process of detecting a plurality of neighborhood reference vectors each having a vector quantity close to the vector quantity of a corresponding one of said contracted reference vectors obtained in said contracted reference-vector setting process,
  a sum-component computation sub-process of computing a plurality of sum components each associated with one of neighborhood reference vectors determined in said neighborhood reference vector detection sub-process as said neighborhood reference vectors corresponding to a specific one of said contracted reference vectors from a sum computed in said difference absolute value sum computation process for a reference block pointed to by a reference vector, from which said specific contracted reference vector is contracted, as said sum of the absolute values of said differences in pixel values, and
  a component-total computation sub-process of computing a total of sum components, which have been computed in said sum-component computation sub-process as said sum components each associated with a specific one of said neighborhood reference vectors, by cumulatively adding each of said sum components to a cumulative total obtained so far for said specific neighborhood reference vector.

7. An image taking method for an image taking apparatus said method comprising:
  (a) causing a movement-vector detection unit of said image taking apparatus to:
    (i) receive data of an imager-created image from an image taking device of said apparatus; and
    (ii) detect a movement vector for at least one screen of said imager-created image;
  (b) causing a zoom-operation determination unit of said image taking apparatus to determine whether or not an input for an optical zoom operation has been received from a user, the input corresponding to operation of an optical zoom operation unit of said image taking apparatus;
  (c) in response to the input for the optical zoom operation being received from the user:
    (i) causing an optical-zoom portion vector computation unit of said image taking apparatus to determine an optical-zoom portion vector based on zoom information associated with the optical zoom operation, the determined optical-zoom portion vector corresponding to a positional change of said image taking device resulting from said optical zoom operation;
    (ii) causing an optical-zoom portion vector subtraction unit of said image taking apparatus to determine a difference vector by subtracting said determined optical-zoom portion vector from said detected movement vector; and (iii) causing a global hand-movement displacement vector computation unit of said image taking apparatus to determine a global hand-movement displacement vector for said imager-created image based on the determined difference vector;

(d) in response to no input for the optical zoom operation being received from the user, causing the global hand-movement displacement vector computation unit to determine the global hand-movement displacement vector for said imager-created image based on said detected movement vector;

(e) causing a hand-movement compensation unit of said image taking apparatus to compensate said imager-created image for any distortion caused by a hand movement of the user based on said determined global hand-movement displacement vector; and (g) causing an information recording unit of said image taking apparatus to record information corresponding to said compensated imager-created image onto a recording medium.

8. The method of claim 7, which includes:

(a) causing said movement-vector detection unit to divide said imager-created image in at least one of a horizontal direction and a vertical direction to form a plurality of picture divisions for the at least one screen; and (b) for each of the plurality of picture divisions:
  (i) causing the movement-vector detection unit to detect the movement vector for said picture division;
  (ii) causing said optical-zoom portion vector computation unit to determine the optical-zoom portion vector for said picture division; and
  (iii) causing said optical-zoom portion vector subtraction unit to subtract the determined optical-zoom portion vector of said picture division from said detected movement vector of said picture division.

9. The method of claim 8, wherein for a designated one of the picture divisions, said determined optical-zoom portion vector is based on: (i) length of time lapsing since the start of said optical zoom operation to an end of said optical zoom operation, (ii) a zoom velocity, and (iii) a distance between a center position of said designated picture division and a corresponding position of said imager-created image.

10. An apparatus for compensating an imager-created image for distortion, said apparatus comprising:

(a) a movement-vector detection unit configured to:
  receive data of said imager-created image from an image taking device; and
  (ii) detect a movement vector for at least one screen of said imager-created image;

(b) an optical-zoom portion vector computation unit configured to determine an optical-zoom portion vector in response to an input for an optical zoom operation being received from a user, the determination based on zoom information associated with the optical zoom operation, the determined optical-zoom portion vector corresponding to an image movement of said imager-created image resulting from the optical zoom operation;

(c) an optical-zoom portion vector subtraction unit configured to determine a difference vector in response to the input for the optical zoom operation being received from the user, the difference vector being determined by subtracting said determined optical-zoom portion vector from said detected movement vector;

(d) in response to no input for the optical zoom operation being received from the user, a global hand-movement displacement vector computation unit configured to determine a global hand-movement displacement vector for said imager-created image from said detected movement vector;

(e) in response to the input for the optical zoom operation being received from the user, the global hand-movement displacement vector computation unit configured to determine the global hand-movement displacement vector for said imager-created image based on the determined a difference vector; and (f) a hand-movement compensation unit configured to compensate said imager-created image for any distortion caused by a hand movement of the user based on said determined global hand-movement displacement vector.

11. The apparatus of claim 10, wherein:

(a) said movement-vector detection unit is configured to divide said imager-created image in at least one of a horizontal direction and a vertical direction to form a plurality of picture divisions for the at least one screen; and (b) for each of the plurality of picture divisions:
  (i) said movement-vector detection unit is configured to detect the movement vector for said picture division;
  (ii) said optical-zoom portion vector computation unit is configured to determine said optical-zoom portion vector for said picture division; and
  (iii) said optical-zoom portion vector subtraction unit is configured to subtract the determined optical-zoom portion vector of said picture division from said detected movement vector of said picture division.

12. The apparatus of claim 11, wherein for a designated one of the picture divisions, said determined optical-zoom portion vector is based on: (i) length of time lapsing since the start of said optical zoom operation to an end of said optical zoom operation, (ii) a zoom velocity, and (iii) a distance between a center position of said designated picture division and a corresponding position of said imager-created image.

13. An image taking apparatus comprising:

an image taking device configured to produce an imager-created image;

an optical zoom operation unit configured to operate an optical zoom operation to produce zoom information in response to an input for the optical zoom operation received from a user;

an optical-zoom driving unit configured to control an optical lens system in accordance with said optical zoom operation;

a movement-vector detection unit to: (i) receive data of said imager-created image from said image taking device; and (ii) detect a movement vector for at least one screen of said imager-created image;

a zoom-operation determination unit configured to determine whether or not the input for the optical zoom operation has been received from the user, the input corresponding to the operation of the optical zoom operation unit to produce zoom information;

an optical-zoom portion vector computation unit configured to determine an optical-zoom portion vector in response to the input for the optical zoom operation being received from the user, the determination based on zoom information produced by the optical zoom operation, the determined optical-zoom portion vector corresponding to a positional change of said image taking device resulting from said optical zoom operation;

an optical-zoom portion vector subtraction unit configured to determine a difference vector by subtracting said determined optical-zoom portion vector from said detected movement vector in response to the input for the optical zoom operation being received from the user;

in response to no input from the user being received for the optical zoom operation, a global hand-movement displacement vector computation unit being configured to determine a global hand-movement displacement vector for said imager-created image based on said detected movement vector;

in response to the input from the user being received for the optical zoom operation, said global hand-movement displacement vector computation unit being configured to determine the global hand-movement displacement vector for said imager-created image based on said determined difference vector;

a hand-movement compensation unit configured to compensate said imager-created image for any distortion caused by a hand movement of the user based on of said determined global hand-movement displacement vector; and an information recording unit configured to record information corresponding to imager-created image onto a recording medium.

14. The image taking apparatus of claim 13, wherein:
(a) said movement-vector detection unit is configured to divide said imager-created image in at least one of a horizontal direction and a vertical direction to form a plurality of picture divisions for the at least one screen; and
(b) for each of the plurality of picture divisions:
(i) causing the movement-vector detection unit to detect the movement vector for said picture division;
(ii) said optical-zoom portion vector computation unit is configured to determine said optical-zoom portion vector for said picture division; and
(ii) said optical-zoom portion vector subtraction unit is configured to subtract said determined optical-zoom portion vector of said picture division from said detected movement vector of said picture division.

15. The image taking apparatus of claim 14, wherein for a designated one of the picture divisions, said determined optical-zoom portion vector is based on: (i) length of time lapsing since the start of said optical zoom operation to an end of said optical zoom operation, (ii) a zoom velocity, and (iii) a distance between a center position of said designated picture division and a corresponding position of said imager-created image.

16. An apparatus for compensating an imager-created image for distortion, said apparatus comprising:
(a) a movement-vector detection unit configured to: (i) receive data of said imager-created image from an image taking device; and (ii) detect a movement vector for at least one screen of said imager-created image;
(b) an optical-zoom portion vector computation unit configured to determine an optical-zoom portion vector in response to an input for an optical zoom operation being received from a user, the determination based on zoom information associated with the optical zoom operation, the determined optical-zoom portion vector corresponding to an image movement of said imager-created image resulting from said optical zoom operation;
(c) an optical-zoom portion vector subtraction unit configured to determine a difference vector in response to the input for the optical zoom operation being received from the user, the difference vector being determined by subtracting said determined optical-zoom portion vector said detected movement vector;
(d) a global hand-movement displacement vector computation unit configured to determine a global hand-movement displacement vector for said imager-created image, wherein: (i) in response to the input for the optical zoom operation being received from the user, said determined global hand-movement displacement vector is based on the determined difference vector, and (ii) in response to no input for the optical zoom operation being received from the user, said determined global hand-movement displacement vector is based on said detected movement vector; and
(e) a hand-movement compensation unit configured to compensate said imager-created image for any distortion caused by a hand movement of the user based on said determined global hand-movement displacement vector.

* * * * *